(12) United States Patent
Valente et al.

(10) Patent No.: US 11,034,442 B2
(45) Date of Patent: Jun. 15, 2021

(54) UNIVERSAL VEHICLE WITH IMPROVED STABILITY FOR SAFE OPERATION IN AIR, WATER AND TERRAIN ENVIRONMENTS

(71) Applicant: UNIVERSITY OF MARYLAND, COLLEGE PARK, College Park, MD (US)

(72) Inventors: Evandro Gurgel Do Amaral Valente, Bowie, MD (US); Norman M. Wereley, Potomac, MD (US); Eduardo Gurgel Do Amaral Valente, Hyattsville, MD (US)

(73) Assignee: University of Maryland, College Park, College Park, MD (US)

( * ) Notice: Subject to any disclaimer, the term of this patent is extended or adjusted under 35 U.S.C. 154(b) by 448 days.

(21) Appl. No.: 15/755,187

(22) PCT Filed: Aug. 30, 2016

(86) PCT No.: PCT/US2016/049429
§ 371 (c)(1),
(2) Date: Feb. 26, 2018

(87) PCT Pub. No.: WO2017/040493
PCT Pub. Date: Mar. 9, 2017

(65) Prior Publication Data
US 2018/0244383 A1 Aug. 30, 2018

Related U.S. Application Data

(60) Provisional application No. 62/212,312, filed on Aug. 31, 2015.

(51) Int. Cl.
*B64C 37/00* (2006.01)
*B64C 15/12* (2006.01)
(Continued)

(52) U.S. Cl.
CPC ............... *B64C 37/00* (2013.01); *B64C 5/02* (2013.01); *B64C 11/46* (2013.01); *B64C 15/12* (2013.01);
(Continued)

(58) Field of Classification Search
CPC ........... B64C 37/00; B64C 5/02; B64C 11/46; B64C 15/12; B64C 17/02; B64C 19/00;
(Continued)

(56) References Cited

U.S. PATENT DOCUMENTS 1,981,700 A   11/1934   Hoffman
1,981,701 A   11/1934   Hoffman
(Continued)

FOREIGN PATENT DOCUMENTS

GB   2446589   8/2008
WO   WO 2014/081082 A1   5/2014

OTHER PUBLICATIONS

Brazil Office Action—BR112018004002 9—dated Jul. 14, 2020.
(Continued)

*Primary Examiner* — Justin M Benedik
(74) *Attorney, Agent, or Firm* — HEA Law, PLLC; Darrin A. Auito

(57) ABSTRACT

The universal vehicle system is designed with a lifting body which is composed of a plurality of interconnected modules which are configured to form an aerodynamically viable contour of the lifting body which including a front central module, a rear module, and thrust vectoring modules displaceably connected to the front central module and operatively coupled to respective propulsive mechanisms. The thrust vectoring modules are controlled for dynamical displacement relative to the lifting body (in tilting and/or translating fashion) to direct and actuate the propulsive mechanism(s) as needed for safe and stable operation in (Continued)

various modes of operation and transitioning therebetween in air, water and terrain environments.

29 Claims, 34 Drawing Sheets

(51) Int. Cl.
```
B64C 29/00     (2006.01)
B64C 39/02     (2006.01)
B64C 39/10     (2006.01)
B64C 17/02     (2006.01)
B64C 5/02      (2006.01)
B64C 11/46     (2006.01)
B64C 19/00     (2006.01)
B64C 29/02     (2006.01)
B64D 29/00     (2006.01)
```
(52) U.S. Cl.
CPC ............ *B64C 17/02* (2013.01); *B64C 19/00* (2013.01); *B64C 29/0033* (2013.01); *B64C 29/02* (2013.01); *B64C 39/024* (2013.01); *B64C 39/10* (2013.01); *B64C 2201/028* (2013.01); *B64C 2201/088* (2013.01); *B64C 2201/205* (2013.01); *B64C 2201/208* (2013.01); *B64C 2211/00* (2013.01); *B64D 29/00* (2013.01)

(58) Field of Classification Search
CPC ... B64C 29/0033; B64C 29/02; B64C 39/024; B64C 39/10
See application file for complete search history.

(56) References Cited

U.S. PATENT DOCUMENTS

| | | | |
|---|---|---|---|
| 2,062,148 A | 11/1936 | Snyder | |
| 2,108,093 A | 2/1938 | Zimmerman | |
| 2,430,820 A * | 11/1947 | Lightfoot | B64C 39/10 244/36 |
| 2,438,309 A | 3/1948 | Zimmerman | |
| 2,481,379 A * | 9/1949 | Zimmerman | B64C 29/0091 244/7 B |
| 2,926,869 A | 3/1960 | Sullivan | |
| 2,989,269 A | 6/1961 | Le Bel | |
| 4,676,545 A | 6/1987 | Bonfilio et al. | |
| 5,799,900 A | 9/1998 | McDonnell | |
| 5,823,468 A * | 10/1998 | Bothe | B64B 1/18 244/2 |
| 6,315,242 B1 * | 11/2001 | Eichstedt | B64B 1/02 244/125 |
| 8,167,234 B1 | 5/2012 | Moore | |
| 8,646,720 B2 * | 2/2014 | Shaw | B64C 29/0025 244/17.23 |
| 9,682,772 B2 | 6/2017 | Yoon | |
| 2010/0006695 A1 | 1/2010 | Aguilar | |
| 2011/0315806 A1 * | 12/2011 | Piasecki | B64C 39/00 244/2 |
| 2013/0175390 A1 | 7/2013 | Woodworth et al. | |
| 2014/0231593 A1 * | 8/2014 | Karem | B64C 1/061 244/45 R |
| 2016/0009391 A1 * | 1/2016 | Friesel | B64C 3/10 244/36 |
| 2016/0137290 A1 * | 5/2016 | Emerick | B64C 21/02 244/36 |

OTHER PUBLICATIONS

Australia Examination Report for Application No. 2016316954, dated May 5, 2020.

European Search Opinion for Application No. 16 842 803.5, dated Mar. 22, 2019.

China Office Action for App. No. 201680061226X, dated Jan. 29, 2021.

* cited by examiner

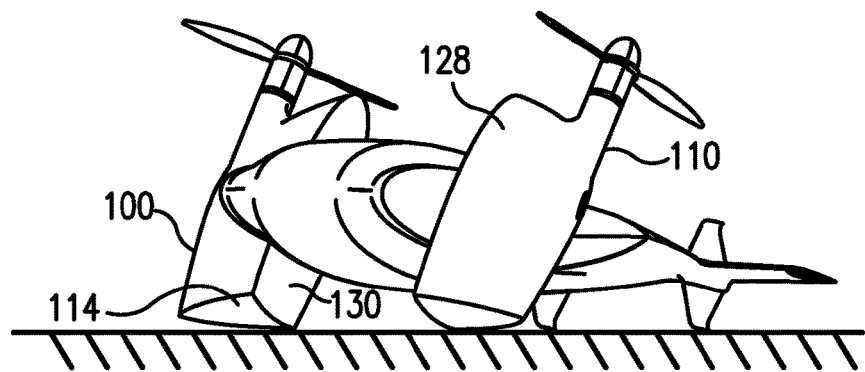
FIG. 7A
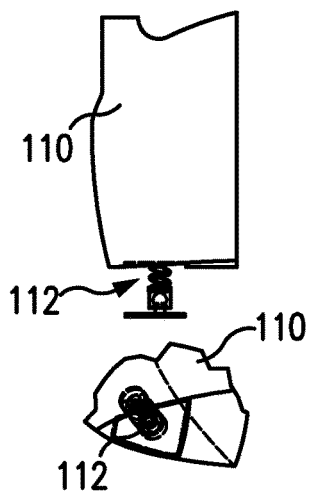 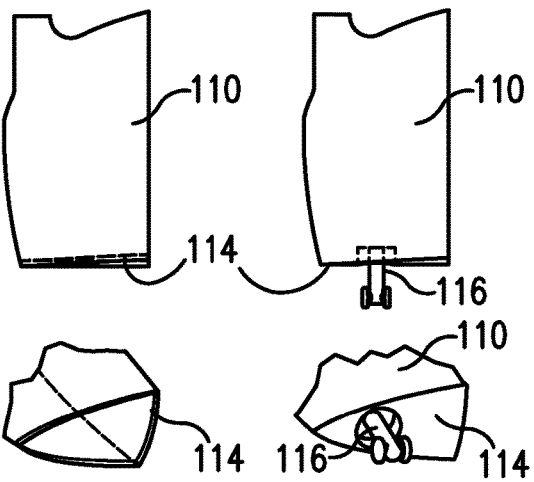 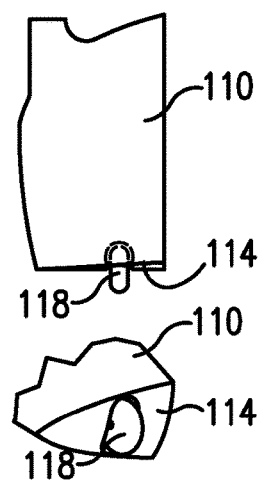
FIG. 7B    FIG. 7C    FIG. 7D    FIG. 7E
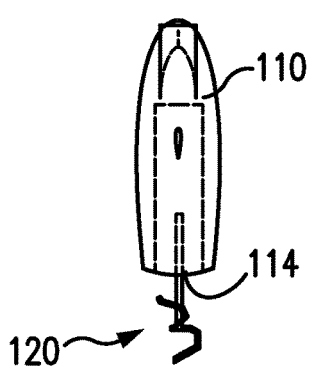 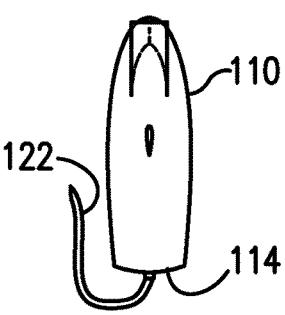 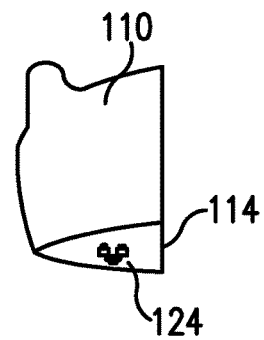 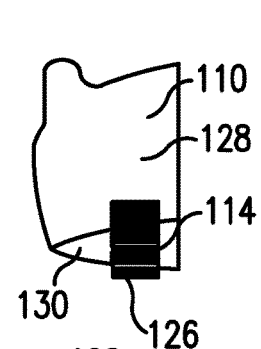
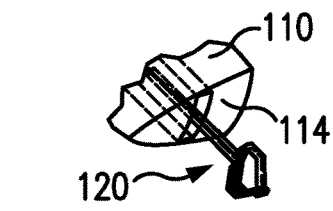 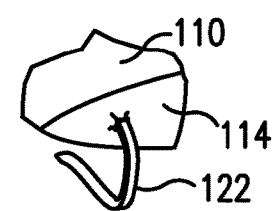 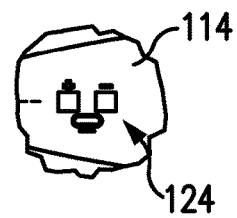 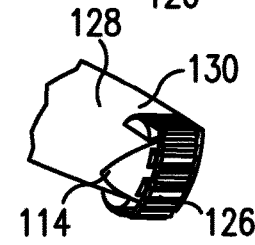
FIG. 7F    FIG. 7G    FIG. 7H    FIG. 7I

UNIVERSAL VEHICLE WITH IMPROVED STABILITY FOR SAFE OPERATION IN AIR, WATER AND TERRAIN ENVIRONMENTS

REFERENCE TO THE RELATED PATENT APPLICATION(S)

The Utility patent application is a National Stage Application of PCT/US2016/049429 filed on 30 Aug. 2016 and is based on a Provisional Patent Application No. 62/212,312 filed on 31 Aug. 2015.

FIELD OF THE INVENTION

The present invention is directed to the vehicle transportation industry, and particularly, to unmanned and manned aerial vehicles dynamically adaptable for travel in aerial, marine, and surface environments in an autonomous and remotely piloted control regime.

The subject invention is further directed to a vehicle with improved stability and safety of operation in either air, water, or terrain environment provided with a dynamically controlled mechanism for real-time control either of pitch, roll, and yaw moments by dynamically manipulating (passively and/or actively) the vehicles' characteristics which may include either of the following: center of thrust, moment arm of center of thrust related to the center of gravity, thrust orientation, aerodynamic center of the vehicle, center of airflow pressure, and the vehicle's center of gravity and combinations thereof.

In addition, the present invention is directed to a universal vehicle system designed with a lifting body which is composed of a plurality of interconnected modules which are configured to form an aerodynamically viable contour of the lifting body. The universal vehicle system includes a front central module, a rear module, and thrust vectoring modules displaceably connected to the front central module and operatively coupled to respective propulsive mechanisms. The thrust vectoring modules are dynamically displaced relative to the lifting body (in tilting and/or translating fashion) to direct and actuate the propulsive mechanism(s) as needed for safe and stable operation in various modes of operation and transitioning therebetween in air, water and terrain environments.

The present invention is also directed to a universal vehicle designed with a propulsion system capable of propelling or decelerating the vehicle, and which includes a tilting nacelle actuation mechanism which actuates a respective module of the lifting body structure to adapt to either of air, water or terrain modes of operations.

In addition, the present invention relates to unmanned or manned aerial vehicles, and particularly, to aircraft which use lifting body aerodynamics for achieving a desired flight regime of operation. This system expands the aerial system capabilities by permitting horizontal flight (generally preferred during cruise/loiter) and vertical flight (generally preferred for on-station hovering, take-off, and/or landing) by combining the controlled lifting body aerodynamics and vectored propulsion system actuation, while attaining a seamless safe transition between the vertical and horizontal flight modes of operation.

The present invention is also directed to a universal vehicle whose aerodynamic and/or vectored propulsion qualities permit the vehicle to perform with short runways (or no runways), high vehicle density on tarmac, and high through-put.

BACKGROUND OF THE INVENTION

Aerial vehicles capable of vertical and horizontal flight are commonly categorized as VTOL (Vertical Take-off and Landing), or STOL (Short Take-off and Landing), or STOVL (Short Take-off and Vertical Landing), or VTOSL (Vertical Take-off and Short Landing) or V/STOL platforms. These aerial vehicles usually are not capable of using aerodynamic lift forces during transition between the take-off and landing flight regimes.

Another disadvantage of the existing V/STOL platform is that tilt rotor and tilt wing concepts are generally only halfway efficient in a helicopter system and halfway efficient in an airplane system.

U.S. Pat. Nos. 1,981,700, 1,981,701, 2,062,148, 2,108,093, 2,430,820, 2,438,309, and 2,481,379 describe lifting body vehicles that feature specific shapes. However, the design of these aircraft systems permit neither the Vertical Take-off and Landing (VTOL), nor the vertical flight or the hovering flight. Moreover, the control capabilities of these systems are limited only to manipulating the airflow for roll moment control, and controlling pitch and yaw only by actuation of trailing edge surfaces. Additional limitations of the prior art systems operation are due to mounting the on-board propulsion system in a rigid (fixed) fashion.

Some existing aircraft are designed with tilt wings and tilt rotors. These vehicles have shortfalls that are mainly derived from the compromise between the aerodynamic based flight (the airplane mode of flight) and powered lift (the helicopter mode of flight). On one hand, the requirements for an efficient aerodynamic lift typically come from large effective lift producing surface areas as well as the forward speed. On the other hand, in the hovering flight mode of operation, where the vehicle's ground speed is zero, the entire lift generation results from the powered lift system.

Given the nature of these two contradicting flight modes of operation (airplane and helicopter), the efficient powered lift benefits from large, untwisted, and flexible blades moving a large volume of air where the available lift must exceed (or at least be equal to) the vehicle's weight, while the propulsion for the efficient aerodynamic lift is preferably achieved with smaller, twisted, and stiff propellers which only have to overcome the vehicle's drag as a means of generating forward ground speed. In essence, the overall efficiencies for these flight modes of operation are polar opposites, and have inherently contradicting mechanisms of achieving flight.

Tilt wing and tilt rotor vehicles, and their developers have attempted to balance efficiency at both end of the spectrum for the airplane and helicopter flight modes of operation. For example, large blades are needed for hovering or vertical take-off and landing. However, the large blades, when tilted to the airplane mode of flight, generate a large drag penalty even though they are attempting to move the entire vehicle forward.

Additionally, the large blades needed for hovering have large impact on the vehicle's ground clearance, available wing span, structural stability, overall mechanical complexity and safety. Conversely, a small propeller, while best suited for the airplane mode of flight, will not efficiently move the required volume of air to offset the vehicle's weight by means of a powered lift alone. Thus, the existing tilt wing and tilt rotor vehicles do not employ small propellers.

While the optimization for the end point flight modes of operation, i.e., the airplane mode and the helicopter mode, is challenging enough, the transition between the two flight modes is more perilous. At any interim angle during the tilt evolution between 90 degrees (in the helicopter mode) and ~0 degrees (in the airplane mode), the hand-off between the powered lift and aerodynamic lift (and vice-versa) often generates aeronautical problems.

For example, during tilting at take-off, from 90 degrees to ~0 degrees, there is a diminishing lift vector component of force as the thrust vector migrates from a vertical (90 degrees) to a horizontal (~0 degrees) orientation.

Furthermore, the ground speed is insufficient for the appreciable aerodynamic lift generation from the limited available wing area (if the available wing area is not at stall angles of attack).

In addition, the aerodynamic phenomena involving complex stall characteristics are at play during transition from the airplane mode to the helicopter mode of flight and vertical landing. The required twist on the propeller to make the airplane mode efficient and achieve higher speed horizontal flight is prone during the helicopter mode of operation to blade stall. This is known as a Vortex Ring State, whereby a rotor is enveloped by its own downwash. This blade stall phenomena occurs at or above a given rate of descent at low forward speed. The irreversible stall condition implies that transitioning to vertical flight or landing vertically is extremely dangerous should a descent rate consistent with generating the sudden loss of lift be present. Thus, the mismatch of the lift generation from one rotor to the other causes an immediate roll moment which may cause catastrophic results.

The above mentioned perils have been flagged by various programs as early as 1964, such as, for example, with the NASA LVT XC-142A Tilt Wing Program whose undesirable flight characteristics included such criteria as the instability at tilt wing angles between 35 to 80 degrees, high disk loading, excessive downwash, excessive vibration due to the drive shafts, and drive shaft damage due to wing flexing. In the present technology era, while the military utilizes the tilt rotor V-22 Osprey, such poses many aerodynamic problems.

Tailsitting vehicles also need improvements in their design and functionality. The experimental USN Convair XFY Pogo and Lockheed XFV-1 from the 1950s were tailsitter vehicles designed to have vertical take-off and landing capability. The classification of tailsitters means that the vehicle completely rests on its tail (rear) section in a vertical orientation. In various ways both the Pogo and XFV-1, while also suffering from flight transition difficulties (especially after high speed horizontal flight back to stationary vertical orientation), mechanical complexity and safety concerns, had an additional flaw in that wind gusts played havoc during vertical operation. Even while at rest, the narrow footprint of the landing gear system and high vehicle CG (center of gravity) made tailsitter vehicles susceptible to tip-over in the presence of high wind.

It is a long-lasting need in the area to provide a vehicle system capable of safe operation in and transitioning between the airplane and helicopter (and vice versa) modes of operation, where the contradicting requirements for the airplane mode of operation and the helicopter mode of operation are effectively balanced. In addition, it is highly desirable to enhance the performance of the vehicle by powering the lifting body with a propulsion system that would provide the airflow over the lifting body surface to attain continuous lift during transition between vertical and horizontal flight modes of operation, and to perform roll, pitch and yaw also by other means installed on the vehicle in addition to (or instead of) controlling the actuation of trailing edge surfaces.

SUMMARY OF THE INVENTION

It is therefore an object of the present invention to provide an advanced aviation vehicle with an enhanced flight envelope by introducing effective V/STOL capability of uncompromised and balanced operation in, and safe transitioning between the airplane and the helicopter modes of operation.

It is, another object of the present invention to provide a robust aerial vehicle capable of short take-off, short landing, vertical take-off, and/or vertical landing, that is compact, easy to manufacture, capable of both sustained vertical and horizontal flight, hovering, efficiently and safely transitioning in any sequence between vertical and horizontal flight regimes, launchability from either stationary and/or moving platform, and that is indifferent to launching/landing zone surface qualities and/or terrain types utilized during take-off and/or landing.

It is a further object of the present invention to provide the aerial vehicle capable of V/STOL which is based on merging the lifting body concept with thrust vectoring while solving the tilt wing and tilt rotor deficiencies during the flight mode transition, attained substantially in two manners: (a) by harvesting the benefits of the lifting body to create lift at high angles of attack and achieve favorable stall performance, while maximizing lift area to provide useful lift for the vehicle, and (b) by alleviating the requirements for the propulsion system based on the available lift of the lifting body during transition, even at high angles. As a result, the subject system is capable of achieving sustained vertical flight and safe transition with either smaller propeller systems or large diameter blade systems.

The overall fusion of an aerodynamically viable lifting body with thrust vectoring permits significant sub-system consolidation and modularity, and provides a wide operational range that is highly attractive to end-users, specifically in the Unmanned Autonomous Vehicle industry. While the thrust vectoring provides most (or all) of the stability and control, the subject invention results in a vehicle having minimal part count and manages to compartmentalize sub-systems in a manufacturing and/or end-user friendly fashion due to the fact that the trailing edge surfaces are not required to move as the primary means of the flight control.

It is also an object of the present invention to achieve high efficiency in lift generation of the subject vehicle during flight regimes transition which results in less power consumption/draw of the propulsion system, which benefits the vehicle range, flight envelope, overall performance, vehicle weight, permissible mission types, on-board electronics, and/or propulsion system.

It is another highly desirable object of the subject system to attain a high degree of hybridization of the lifting body of the vehicle with thrust vectoring to introduce features previously reserved for tail sitting vehicles. The subject system is capable of operation as a tail sitter, but has the added feature of rotating about its contact point with the ground into a prone position. Alternatively, it can transition out of the prone position into a semi-vertical or vertical orientation during take-off. The vehicle's ability to rest on its tail while performing the flight mode transition (from or to vertical orientation), further mitigates the negative (and even catastrophic) happenstance plaguing V/STOL designs attempted over the past decades.

In addition, it is an important object of the subject system to utilize actuated nacelles in the vehicle as a landing mechanism/apparatus, which also can place the vehicle in the prone position on either its top or bottom face should a wing gust broadside the lifting body area. Gusts mostly or completely along the vehicle's lateral (span-wise) axis would flow around the vehicle since there is minimal surface area facing the wind direction.

Along the same lines of consolidation of the vector thrust, tiling propulsion, and landing apparatus, it is another object of the subject system to offer various modes of ground locomotion for the subject vehicle while in the prone position. The subject vehicle may taxi forward, backward, turn, and rotate in place by means of rotating its nacelles and providing vectored thrust from its propulsion system. In operation, if the landing wheels are actively driven, the subject system will support tank-like steering and maneuvering. If, alternatively, only nacelle rotation (is utilized without thrust from its propulsion system), the present system may be modified to prone crawl.

The above stated objectives are made possible (among other of its innovative steps) by combining in the subject vehicle the benefits of the aerodynamically viable lifting body, tilting nacelle(s), light weight and tailsitter concepts, such that an entirely new genre of vehicle emerges that is capable of overcoming inefficiencies and safety issues of the existing tilt rotor/wing vehicles while adding completely new capabilities to the lifting body concept including tailsitter and tethered flight design features.

In one aspect, the present invention is directed to a universal vehicle for uncompromised and balanced air, water and terrain travel in various modes of operation and safe transitioning therebetween. The universal vehicle includes a lifting body composed of a plurality of cooperating modules, each configured to form the lifting body, having an aerodynamically viable contour.

Some of the lifting body modules may be removably and displaceably connected each to the other to form a modular lifting body. The cooperating modules of the lifting body include at least one thrust vectoring module and at least one propulsive mechanism operatively coupled to the thrust vectoring module. The thrust vectoring module is dynamically controlled to affect the positioning and actuation of the propulsive mechanism, thus attaining dynamic (substantially in real-time) control of the positioning and mode of operation of the vehicle as well as transitioning between the modes of operation thereof.

At least one (or more) thrust vectoring module(s) may include a tilting nacelle module carrying the propulsive mechanism thereon and rotatively displaceable about an axis extending sidewise the lifting body.

The lifting body may be designed with light weight cooperating upper and lower lifting body surfaces (shells) which define an internal volume therebetween when displaceably connected one to another. The lifting body further includes a central front module, and a rear module coupled to said central front module. The tilting nacelle module may be displaceably (rotatively or translationally) disposed at each side of the central front module for symmetric or asymmetric actuation of the propulsive mechanism in a controlled direction.

Each of the central front module, rear module, and the nacelle module(s) may be formed with a lower shell and an upper shell contoured to cooperate with each other at their respective peripheries, and to form a respective internal volume when the upper and lower shells are connected. The internal volume may be utilized as a payload compartment or compartment for accommodating the vehicle's components selected from a group including avionics system, sensors system, weapon system, navigation and guidance system, communication system, power system, energy storage unit, payload system, payload, propulsion system, fuel cell, landing gear system, docking system, tether system, flight assist system, collision avoidance system, deceleration system, flight termination system, ballast system, buoyancy system, mechanical systems, and electronics.

The nacelle module has a length corresponding to the length of the central front module, or corresponding to the length of the lifting body (from front edge to rear edge), as well as corresponding to a length exceeding the length of the central front module but smaller than the length of the lifting body.

The propulsive mechanism may be positioned at the front end the nacelle module, and may be tiltably displaceable about an axis of the nacelle module.

The vehicle further includes at least one stabilizer module positioned in operative cooperation with the rear module. The stabilizer module may have a vertical, horizontal, dihedral, or anhedral orientation relative to the rear module surface. The stabilizer module may be installed at the rear module in a rigidly fixed or deployable fashion.

At least one motor may be positioned in the internal compartment defined in any of the lifting body modules. For example, the motor may be located within the nacelle, and be operatively coupled to the propulsive mechanism.

The propulsive mechanism may be dynamically controlled to operate in a counter-rotation regime relative to another propulsive mechanism for generating airflows over the lifting body having opposing vorticity flow fields.

The modes of operation affected by the thrust vectoring modules may include short take-off, short landing, conventional take-off, conventional landing, externally assisted take-off, externally assisted landing, and combinations thereof. The thrust vectoring modules are also configured to control lateral and/or longitudinal positioning of the vehicle by controlling the roll, pitch, and yaw moments thereof.

In operation, the thrust vectoring module is controllably deployed to a specific position to create a thrust force by the propulsive mechanism to result in the vehicle deceleration.

The vehicle may be adapted to carry a superstructure thereon which can be removably attached to the vehicle. The thrust vectoring module is controllably deployed to a position to create a thrust force from the propulsive mechanism resulting in detachment of the superstructure when release (and/or delivery) of the superstructure is needed.

The thrust vectoring module can be controllably rotated to a position where the propulsive mechanism strikes at least one module of the vehicle to mitigate disaster in a crisis situation or to intentionally terminate flight.

The subject universal vehicle further may include a landing device which is deployable when landing mode of operation is pursued.

In addition, the thrust vectoring modules are configured for surface maneuverability by alternate actuation of the pair of tilting nacelles (without actuation of the propulsive mechanism) to actuate the prone positioned crawling mode of operation. Also, the thrust vectoring modules are configured to propel the vehicle in the various modes of operation including motion in flight, on the terrain, sub-terrain, on a submersed body or combinations thereof.

The thrust vectoring modules are configured to rotate in clockwise direction and in counter-clockwise direction, with the propulsive mechanisms of each thrust vectoring module configured to rotate in two directions. The propulsive mechanism of the thrust vectoring module may operate as a pusher, or a tractor.

In another aspect, the present invention is a method of operating a universal vehicle for balanced air, water, and terrain travel in various modes of operation and providing safe transitioning therebetween. The subject method comprises the steps of:

configuring a lifting body with a plurality of cooperating module contoured to create a substantially aerodynamically contoured lifting body, configuring at least one lifting body module as a thrust vectoring module operatively coupled with at least one propulsive mechanism, and controlling the thrust vectoring module to affect positioning and actuation of the propulsive mechanism to dynamically control mode of operation of the vehicle, and the transitioning between the modes of operation.

The subject method further includes the steps of:

operating the vehicle in either of vertical flight, hovering flight, on-station airborne vertical flight, and horizontal flight, vertical take-off (where an initial or final resting position includes vertical position including resting on a trailing edge of a predetermined module of the lifting body), horizontal prone crawl position (including resting on a predetermined area of a predetermined module of the lifting body), and transitioning to or from the prone crawl position during the take-off and landing, as well as transitioning from the vertical orientation to the prone position on either a top or bottom face of the lifting body.

In the subject method, the modes of operation further comprise release, launch, capture, and landing from or onto a stationary or moving platform, where the platform may include at least one of a structure such as a hitch system, a hook system, a cradle system, a rail system, a netting system, and a trailer installed on a host vehicle, said host vehicle including a surface, a sub-surface, and aerial, amphibious, or marine structures.

The subject method further assumes the step of:

coupling a motor to the thrust vectoring module for flying the vehicle, propelling the vehicle on terrain, propelling the vehicle on a fluid medium, and propelling the vehicle in a fluid medium, or coupling a navigation system to the vehicle, and navigating the vehicle in flight, while moving through a fluid medium, or on terrain using the navigation system, or coupling a control system to the vehicle, and controlling the vehicle in flight, while moving through a fluid medium, or on terrain using the control system.

The subject method further comprises the steps of:

configuring the thrust vectoring module as a multi-function actuated thrust module, configuring the lifting body with at least one multi-function central lifting body module, at least one multi-function rear lifting body module, at least one multi-function vertical module, and at least one multi-function horizontal module, installing at least one component, internally or externally at at least one of the multi-function thrust module, central lifting body module, rear lifting body module, vertical module, and horizontal module, where the at least one component includes a component selected from a group including: payload, weaponization, counter measures system, communication system, ballast system, sensing system, suspension system, braking system, dampening system, airbag, parachute, deceleration apparatus, drive apparatus, steering apparatus, vibration apparatus, landing gear apparatus, charging apparatus, discharging apparatus, electromagnet device, flight assisting device, locomotion assisting device, maneuvering assisting device, docking apparatus with or without electrical connectivity to the respective docking base, anchoring device, gripping device, grappling device, clawing device, floating device, retrieving device, and capturing device, and combinations thereof.

The subject method further comprises:

operating the vehicle in a loss mitigation mode of operation to diminish damages to the vehicle's modules. The loss mitigation mode of operation is triggered by a mechanism selected from a group including: pilot triggered, autonomous pilot triggered, observer triggered, sensor triggered, deceleration triggered, acceleration triggered, radar triggered, transponder triggered, traffic controller triggered, impact triggered, and combinations thereof.

The subject method further comprises:

operating the vehicle in a flight termination mode triggered by a mechanism selected from a group including: pilot triggered, autonomous pilot triggered, observer triggered, sensor triggered, deceleration triggered, acceleration triggered, radar triggered, transponder triggered, traffic controller triggered, impact triggered and combinations thereof.

The subject method further includes the steps of:

applying proofing treatments to the lifting body. The proofing treatment may be selected from a group including: bullet proofing, fragmentation proofing, explosive proofing, heat proofing, fire proofing, and sand proofing.

In the subject method, a plurality of the propulsive mechanisms are selected from a group including propellers, turbines, thrusters, fans, and rockets capable of accelerating in a gas or a fluid medium, combustion, glow, electric, self-contained, fuel cell based, hybrid, pump or geared propulsive mechanisms, and are installed at predetermined locations on the lifting body which are positioned and actuated to control the vehicle roll, pitch, and yaw moments.

The subject method further comprises the steps of:

controlling stability of the vehicle by manipulation of the vehicle's center of gravity along the lateral axis, the longitudinal axis, or the lateral and the longitudinal axis via translation, and/or rotation, and/or vibration of internal and/or external masses.

These and other objects and advantages of the subject invention will be apparent from the further detailed description and drawings contained in this patent application.

BRIEF DESCRIPTION OF THE DRAWINGS

FIG. 7A and its detail views (FIGS. 7B-7I) illustrate the multi-functionality of the nacelle system;

DETAILED DESCRIPTION OF THE PREFERRED EMBODIMENTS

In the present aircraft design, the effectiveness and versatility of the vehicle results from the combined integration of the vehicle's sub-systems and their cross functionality. The concept underlying the design and operation of the subject system is not limited to the use of sub-systems with exclusively dedicated functions, but rather capable of multiple function systems. For example, some of the proposed embodiments combine the thrust vectoring nacelles with the landing gear and/or payload compartment. The vehicle body functions as both a primary lift generation and avionics/payload compartmentalization, the trailing edge of the lifting body, and horizontal and vertical stabilizers, and/or rear vehicle body and also function as a landing apparatus.

The aircraft of the present invention, when used as an Unmanned Aerial System, may be used to meet various end-user needs such as, but not limited to, security monitoring, crisis mitigation, disaster relief, scientific sensing, sensory platform for research and development of other sub-systems, transportation, payload delivery, communication, and other peacetime or wartime missions.

The following description will present preferred embodiments of the subject system with an uninhabited aircraft system detailed as an example. However, the present invention can also be applied to an inhabited (manned) aircraft.

Figure 1A:
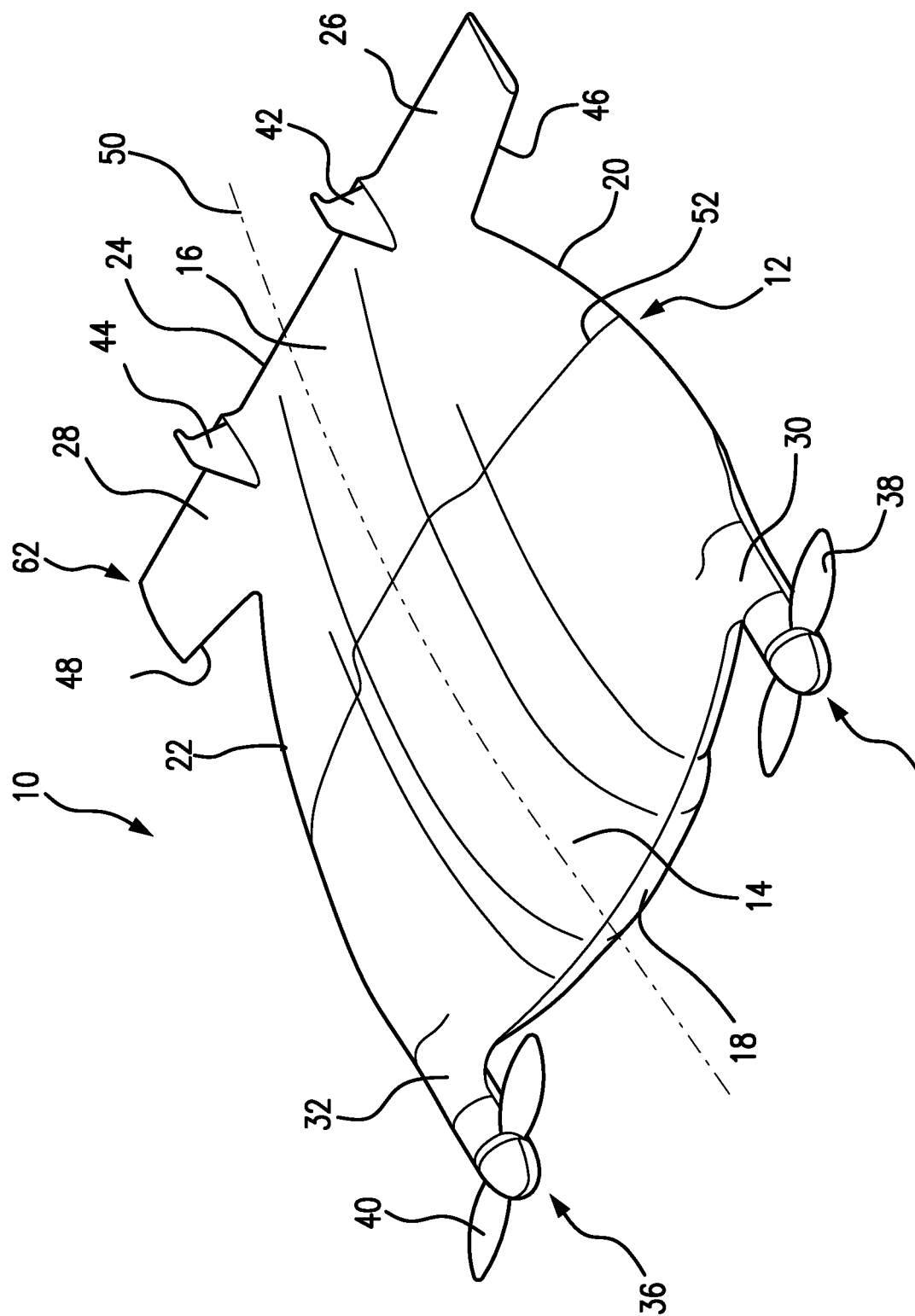
FIGS. 1A, 1B and 1C are perspective views of the subject aircraft system according to one embodiment where all of the vehicle surfaces and propulsion system are connected (FIG. 1A), or displaceable one from another (FIGS. 1B-1C)

An exemplary base model is presented in FIG. 1A with a fully fixed aircraft configuration (where the entire vehicle lifting body is non-actuated and is assembled in accordance to the subject design during manufacturing) complemented by presentation of actuation regimes of the key systems and/or modifications to the lifting body. As an example, a particular propulsive device is described herein. However, the propulsion system contemplated in the subject system may further include propellers, turbines or fans, either in multiples or pairings or as a single unit, with any blade count, with or without counter rotation, centered or offset, of any diameter and/or twist/pitch, body and/or pod and/or nacelle and/or tip-mounted, fixed-mounted and/or allowed to actuate, mounted in series and/or in parallel, mounted symmetrically or asymmetrically, and/or configured as a tractor (puller) and/or a pusher.

FIGS. 1A-30 show the subject aircraft system 10 according to one embodiment of the present invention which includes a lifting body 12 built with a front section (module) 14 and a rear section (module) 16 which are contoured to create an aerodynamic lifting shape that connects the front leading edge 18 to the left and right ventral trailing edges 20 and 22, respectively. The lifting body 12 also is contoured with the body span trailing edge 24 which is contoured with a left horizontal surface 26 and a right horizontal surface 28.

The front section 14 has the left nacelle 30 and right nacelle 32. The aircraft system further includes a pair of rotors 34 and 36. The left rotor 34 drives the left propeller 38, and the right motor 36 drives the right propeller 40.

Figure 1B:
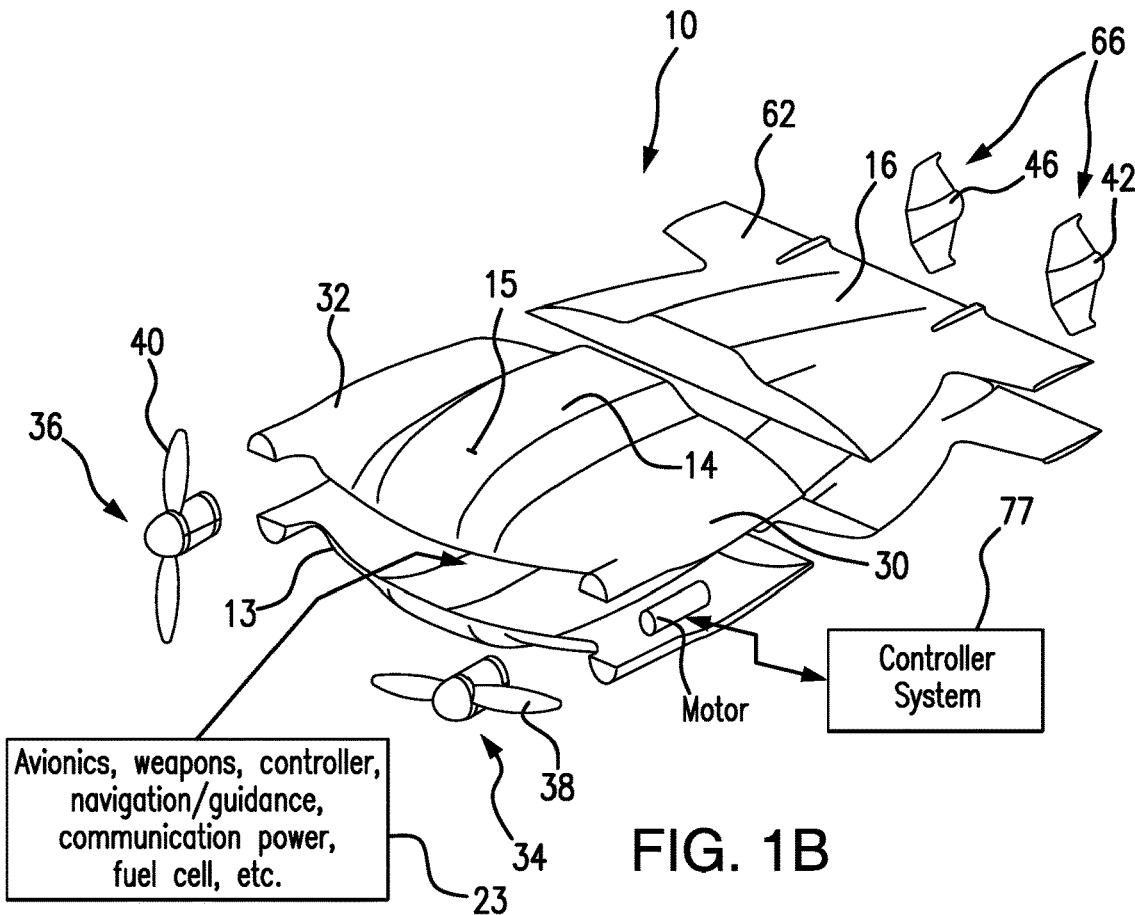
Figure 1C:
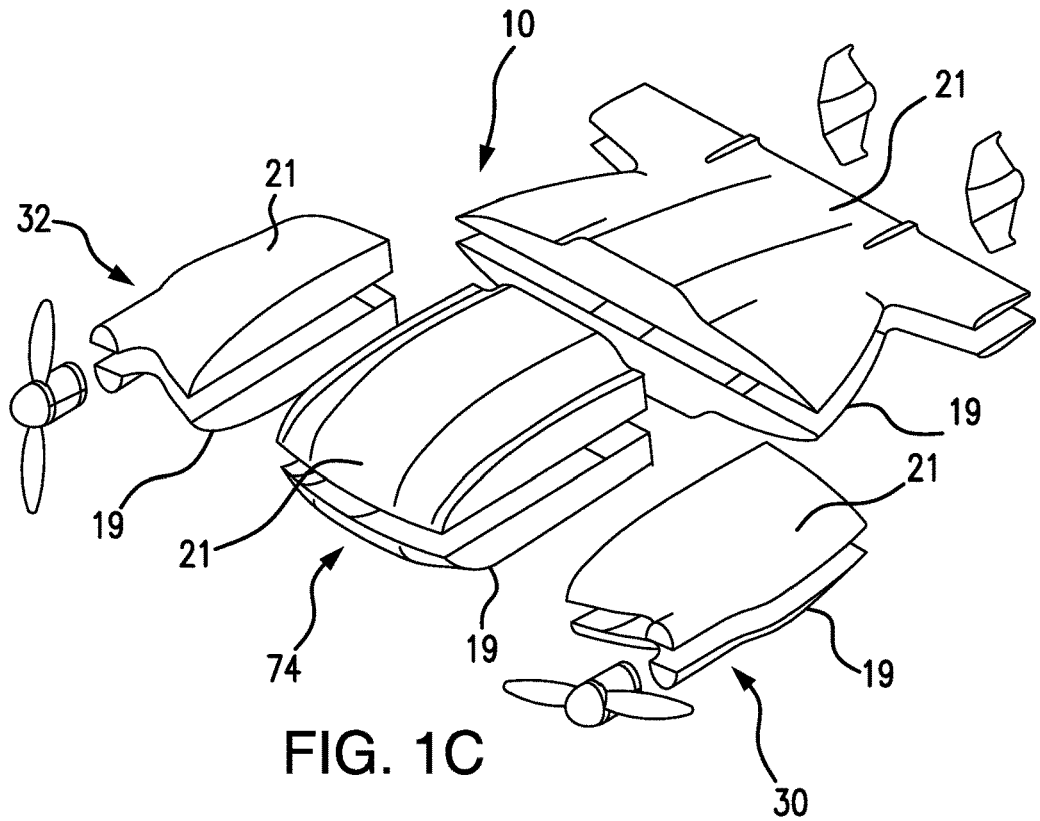

A left vertical surface 42 and a right vertical surface 44 are formed at the body span trailing edge 24 and comprise the empennage or tail assembly of the aircraft system 10. Horizontal leading edges 46 (left) and 48 (right) are formed at the rear section 16 of the lifting body 12. There is a transition that is configured between the vertical trailing edges 20, 22, respectively and the horizontal leading edges 46, 48 respectively as shown in FIGS. 1A-1C.

The aircraft system 10 has a symmetric shape with reference to a central horizontal axis (centerline) 50 extending along the horizontal direction (which is the typical direction of flight). The centerline 50 is hereinafter referred to as the standard chord line. All other chord line references run parallel to the standard chord line 50. A span line 52 extends perpendicular to the standard chord line 50, and spans between the left and the right sides of the aircraft 10.

The vehicle body 12 may be designed with a plurality of lifting body modules. As shown in FIGS. 1A-1C, the front body module 14 and the rear body module 16 can be removeably connected each to the other. A plurality of other modules may be created by any sectioning planes or sectioning curvatures in any orientation and location of the lifting body 12.

The lifting body modules are contoured to create, when connected each to the other, an aerodynamical shape for the lifting body 12.

The lifting body 12 may be manufactured from lower shell 13 and top shell 15 (shown in FIG. 1B) which are low-weight rigid structures connectable each to the other at their periphery.

Similarly, all lift body modules (front central module, rear module, nacelle modules) may be formed from the corresponding lower and top shells 19, 21, respectively, as shown in FIG. 1C.

Any given lifting body module may house at least one, or any plurality, of vehicle components 23, which include avionics, navigation and guidance systems, safety system, communication system, sensors system, propulsion system, mechanical system, power system, weapons, explosives, landing gear apparatus, docking systems, fuel tank, fuel cell, payloads, electronics, and MEMs, separately, or in any combination.

Figure 2A:
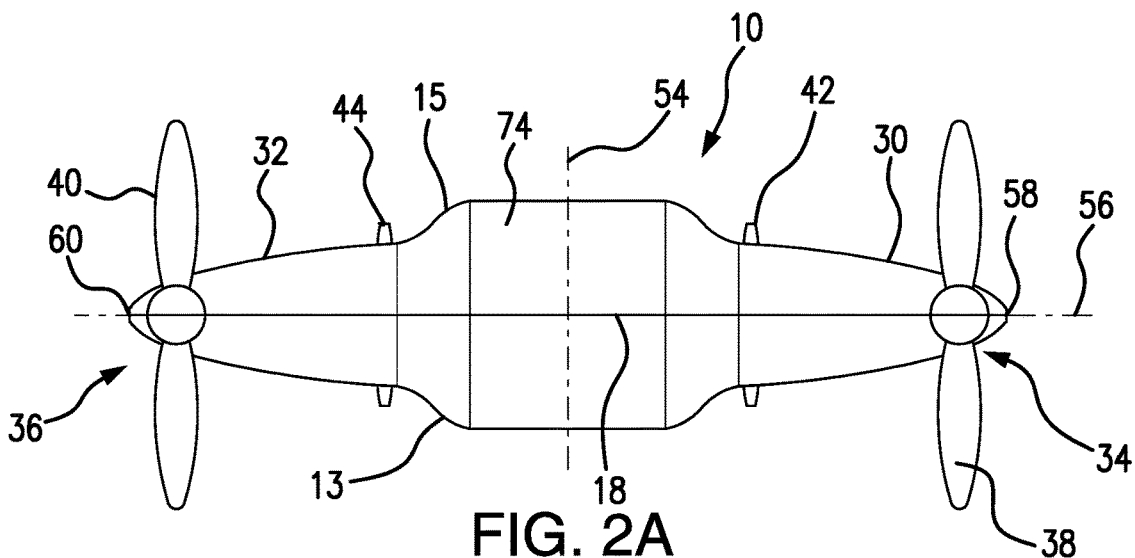
FIG. 2A is a front view of the aircraft shown in FIGS. 1A-1C, and FIGS. 2B-2E show alternate lifting body cross section configurations.
Figure 2B:
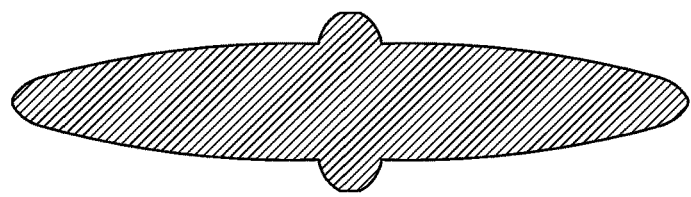
Figure 2C:
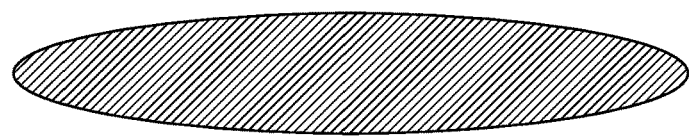
Figure 2D:
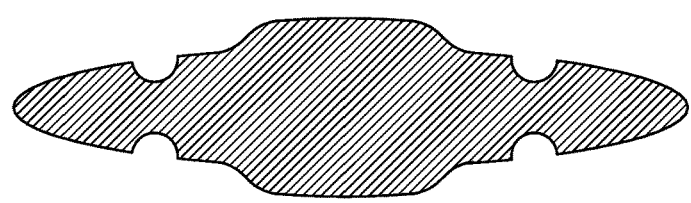
Figure 2E:
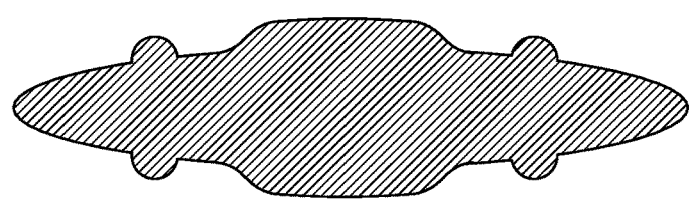

FIG. 2A is a front view of the aircraft 10 shown in FIGS. 1A-1C with alternative lifting body cross section configurations illustrated in FIGS. 2B, 2C, 2D, and 2E. FIG. 2B, illustrates a smaller protrusion centered about the vertical axis 54 and the horizontal axis 56 extending between sides 58 and 60 of the lifting body 12. FIG. 2C illustrates a clean cross section that does not contain any extrusions, FIG. 2D, illustrates protrusions offset from the vertical axis 54 and horizontal axis 56, FIG. 2E illustrates a recess into the cross section that is offset from the vertical axis 54. Any plurality of cross sections with any plurality of features including, but not limited to, that are symmetric, asymmetric, featuring protrusion or recess that is centered or offset from either horizontal or vertical axis, of any size, of any shape, or of any combination of the above presented features thereof are contemplated in the subject system design. The lifting body's cross section thickness and width are generally variable parameters which depend on the location of the cross-section of the lifting body and their angles.

Figure 3A:
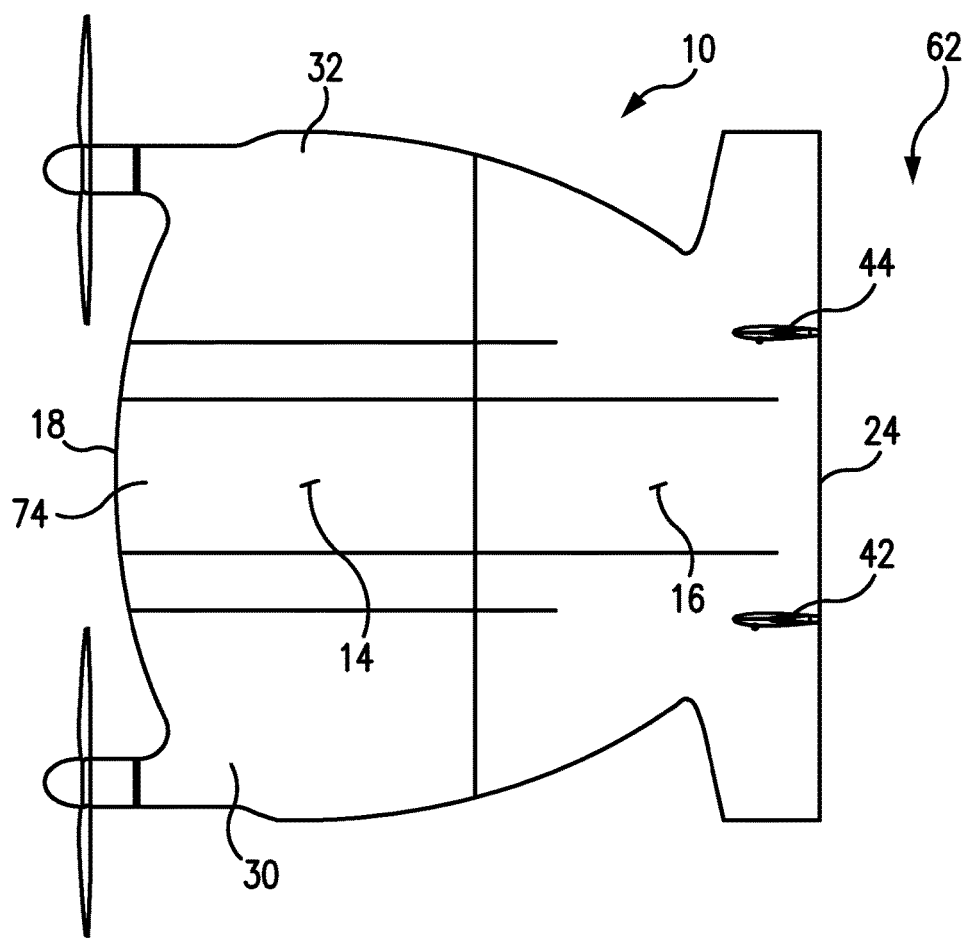
FIG. 3A is a top view of the aircraft shown in FIGS. 1A-1C with alternate horizontal stabilizer configurations (shown in FIG. 3B-3E)
Figure 3B:
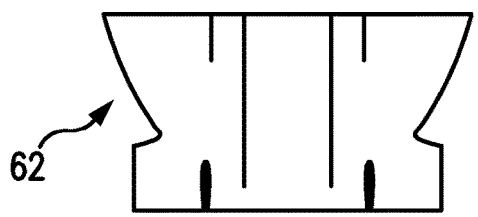
Figure 3D:
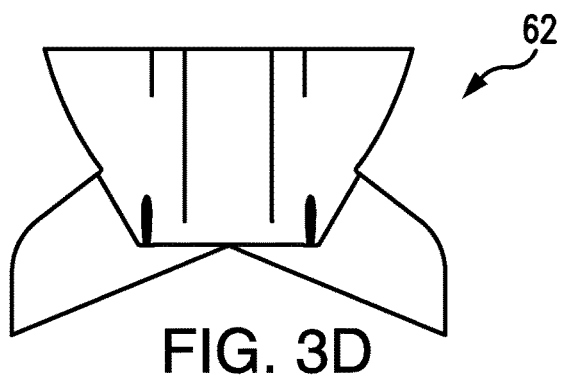
Figure 3C:
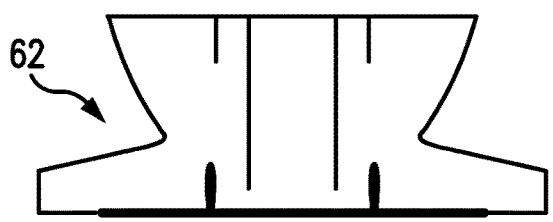
Figure 3E:
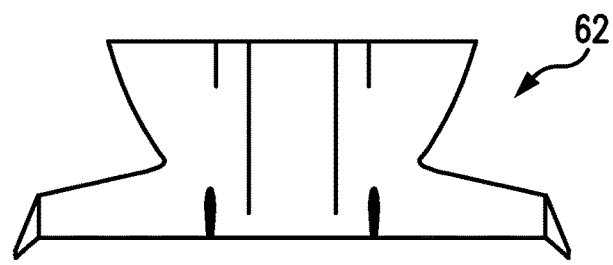

FIG. 3A is a top view of the aircraft 10 shown in FIGS. 1A-1C with alternative horizontal stabilizer configurations presented in FIGS. 3B, 3C, 3D and 3E. FIG. 3B illustrates a horizontal stabilizer 62 whose overall span is shorter than the maximum span of the aircraft body 12, FIG. 3C illustrates a horizontal stabilizer 62 whose overall span is greater than the maximum span of the aircraft body, FIG. 3D illustrates a swept back horizontal stabilizer system, and FIG. 3E illustrates a horizontal stabilizer tip 64 configured to enhance the aerodynamic performance and the vehicle functionality.

The stabilizer details illustrated in FIGS. 3B-3E represent only four examples of configurations, and other variations are contemplated in the subject design, including, but not limited to, configurations where the shape of the horizontal stabilizer 62 may be symmetric or asymmetric, with or without leading edge sweep, with or without trailing edge sweep, with permanent or varying chord length, thickness and sweep, with or without corner filleting, with or without corner chamfering, with or without an airfoil cross section, rigid, inflatable, interchangeable, deployable, installed to the lifting body with or without dihedral or anhedral, or in any combination thereof.

The distance between the left vertical stabilizer 42 and the right vertical stabilizer 44, as shown in FIG. 3A, may vary between the length of the full span line to a zero distance where the aircraft would have a single centered or offset vertical stabilizer.

Figure 4A:
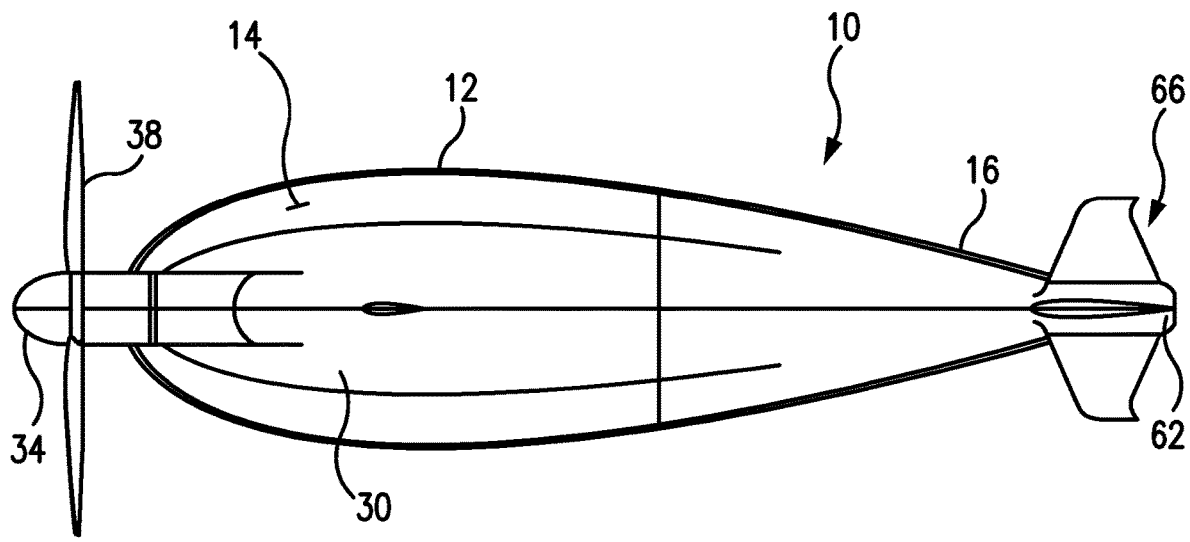
FIG. 4A is a side view of the aircraft in FIGS. 1A-1C with alternate vertical stabilizer configurations shown in FIGS. 4B-4E.
Figure 4B:
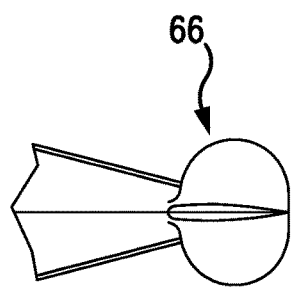
Figure 4D:
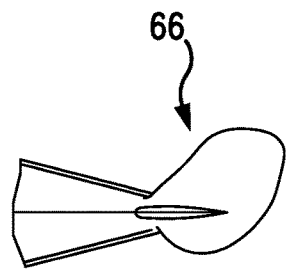
Figure 4C:
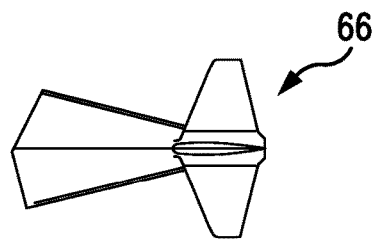
Figure 4E:
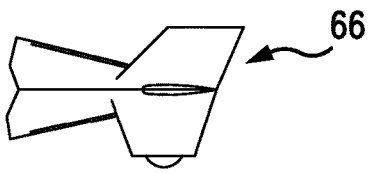

FIG. 4A is a side view of the aircraft shown in FIGS. 1A-1C with alternative vertical stabilizer configurations presented in FIGS. 4B, 4C, 4D and 4E. FIG. 4B illustrates a vertical stabilizer 66 with a circular shape, FIG. 4C illustrates a vertical stabilizer 66 with leading and trailing edge sweep, FIG. 4D illustrates an asymmetrical, rounded, and swept back vertical stabilizer 66, and FIG. 4E illustrates a swept back, hard corner vertical stabilizer with recessed tail wheel.

It is important to note that while the provided detail views of FIGS. 4B-4E illustrate only four exemplary alternative configurations of the vertical stabilizer 66, any variations including, but not limited to, implementations where the shape of the vertical stabilizer may be symmetric or asymmetric, with or without leading edge sweep, with or without trailing edge sweep, constant or varying in chord length and/or thickness, with or without corner filleting, with or without corner chamfering, with or without integrated wheel or castering wheel or landing gear fixture, with or without airfoil cross section, rigid, inflatable, interchangeable, deployable, installed to the lifting body with or without dihedral or anhedral, or in any combination of the above listed thereof are also included within the spirit of the subject aircraft system 10.

Figure 5A:
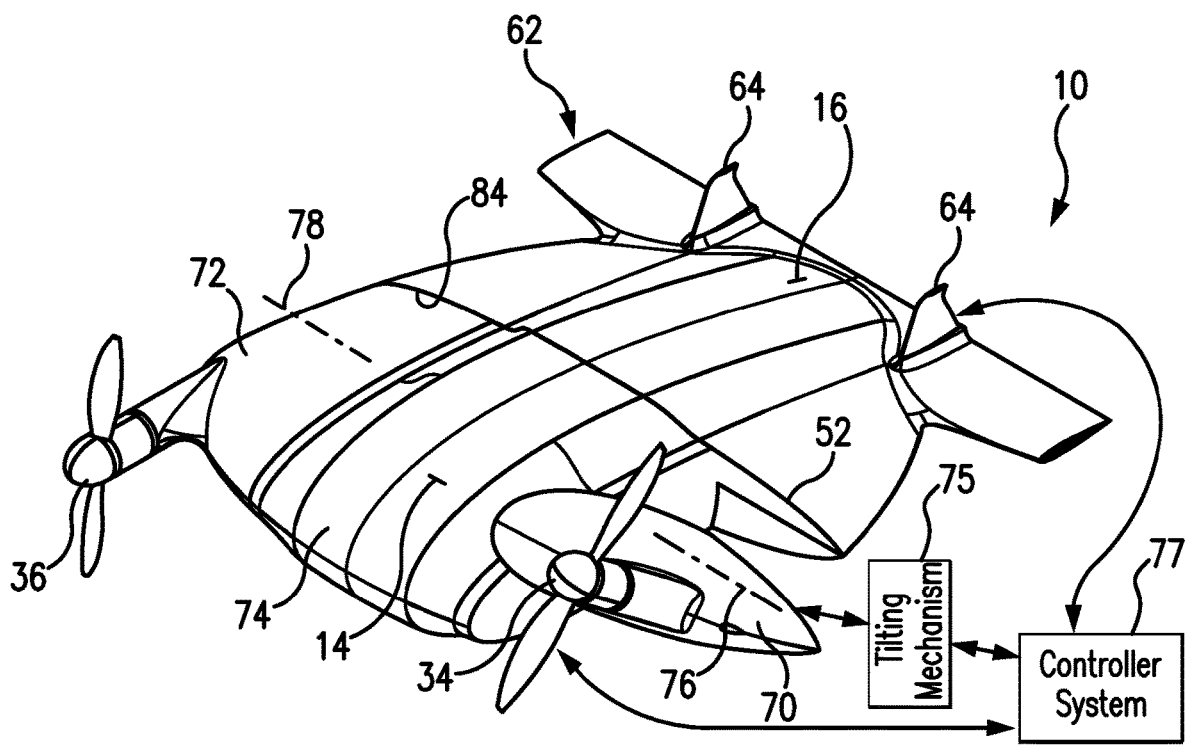
FIG. 5A is a perspective view of the embodiment of the subject aircraft with thrust vectoring capability with alternate embodiments show in the detail views shown in FIGS. 5B-5E.

FIG. 5A shows a perspective view of a preferred embodiment of the subject aircraft system 10 with thrust vectoring capability attained by means of providing the lifting body 12 with one or two tilting nacelle modules 70, 72.

In accordance with the embodiment shown in FIGS. 5A-5E, the aircraft's lifting body 12 includes a left nacelle module 70 capable of pitching up and down as well as a right nacelle module 72 capable of pitching up and down. At least one nacelle tilting mechanism connects the right nacelle module 72 to the front central body module 74, and at least one nacelle tilting mechanism connects the left nacelle module 70 to the central module 74 such that the pitching actuation may occur in unison or independently of each other.

The nacelle tilting mechanism 75, schematically represented in FIG. 5A, may be housed entirely in the tilting nacelle modules 70, 72, or entirely in the front central module 74. Also, components of the nacelle tilting mechanism 75 may be embedded inside the nacelle modules 70, 72 and inside the front central module 74 whose cooperative functionality, under control of the controller system 77, results in the actuation, rotation, or a combination of actuation and rotation motion of at least one or more tilting nacelles 70, 72. The controller system 77 also may occupy the inner volumes defined in the nacelle modules 70, 72, front central module 74, or be spread through the system.

The front central module 74 and the rear body module 16 may be connected to each other and allow the freedom for the left nacelle module 70 and the right nacelle module 72 to actuate or rotate about their axis of rotation 76, 78, respectively.

The left nacelle module 70 and its end-face 82 as well as the right nacelle 72 and its end-face 84 are multipurpose structures as will be detailed in the following paragraphs.

Although FIGS. 5A-5E show as an example, a symmetric left and right nacelle configuration with additional asymmetric nacelle types or configurations with independent or dependent mechanisms of deployment are also contemplated in the subject system.

Figure 5B:
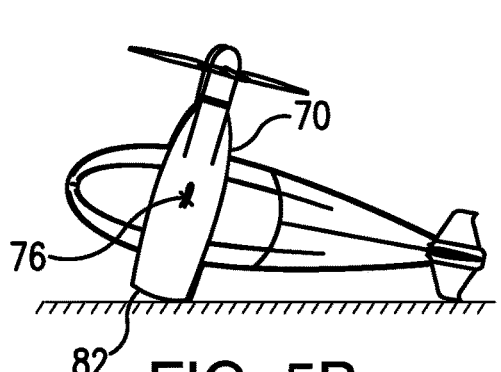

FIG. 5B is an elevational side view of FIG. 5A where the subject aircraft system 10 is shown in a resting state, hereafter referred as the prone position. In this embodiment, at least one nacelle 70 is actuated to pitch relative to the vehicle body 12 whose end-face 82 (running along or in proximity to the span line 52) may serve as a point of contact or as a landing gear apparatus.

Figure 5D:
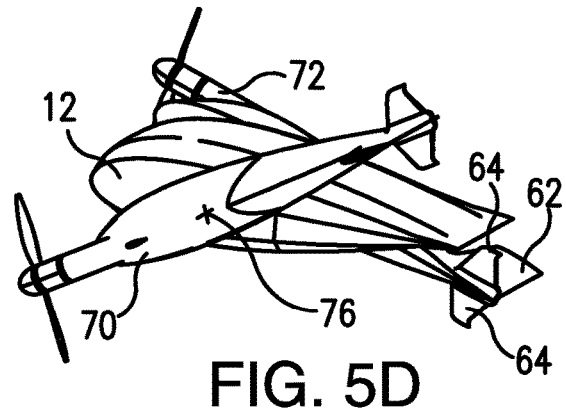
Figure 5C:
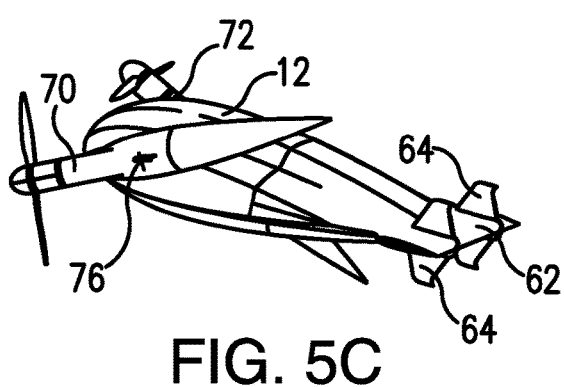
Figure 5E:
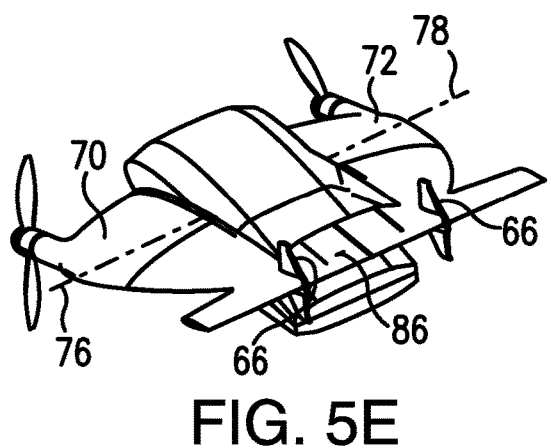

Alternatively, the nacelles, as shown in FIGS. 5D-5E, may run any chord length. It is important to note that all embodiments include at least one or more actuated nacelles which may also have additional functionality as detailed in further paragraphs.

FIGS. 5C-5E are representative of alternate nacelle actuation configurations that allow thrust vectoring similar to the embodiment shown in FIG. 5A. FIG. 5C illustrates an embodiment with the pitching nacelle modules 70, 72 (one at each side of the lifting body 12). In the embodiment shown in FIG. 5C, the fixed horizontal 62 and vertical stabilizers 66 of that side do not pitch with the nacelle.

FIG. 5D illustrate an embodiment where the pitching nacelles 70, 72 at each side of the lifting body 12 run the length of a full chord line, and where the fixed horizontal and vertical stabilizers 62, 66 of that side also pitch with the nacelle.

FIG. 5E is yet a variation of the system shown in FIG. 5D where the body segment 86 of the vehicle 10 between the vertical stabilizers 66 also deploy with the nacelle actuation. The embodiment shown in FIG. 5E may have the capability of rigidly engaging each other, so that the two independent nacelle sections 70, 72 become one piece on-demand, or may be disengaged on-demand to perform independently.

Figure 6A:
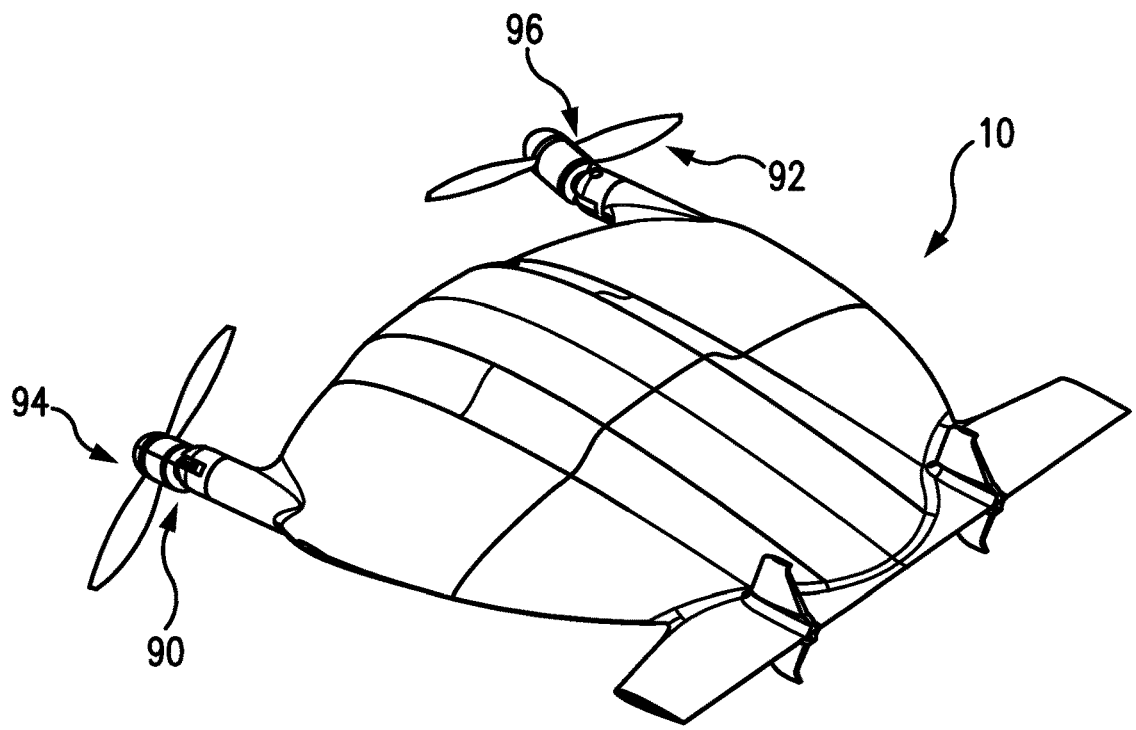
FIG. 6A is a perspective view of the embodiment of the subject aircraft with omni-directional nacelle actuation capability with alternate embodiments shown in the detail views of FIGS. 6B-6D.
Figure 6B:
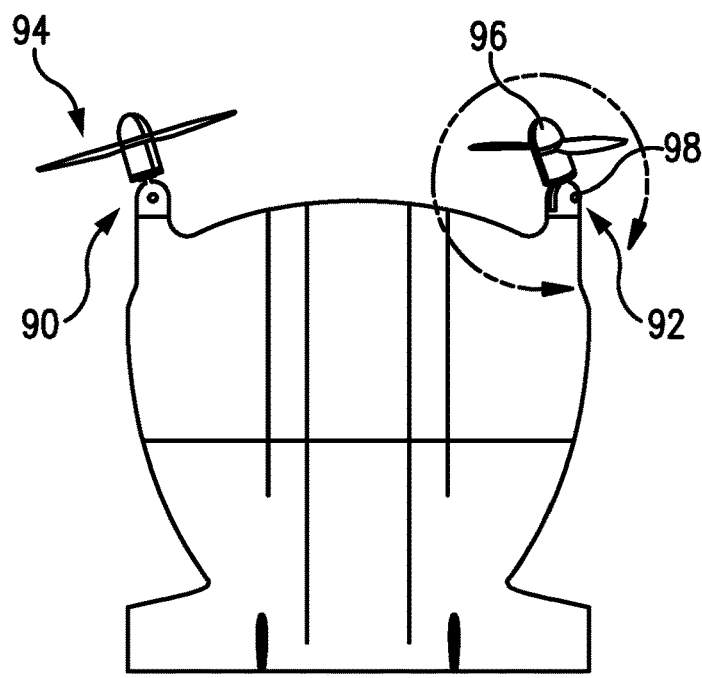
Figure 6C:
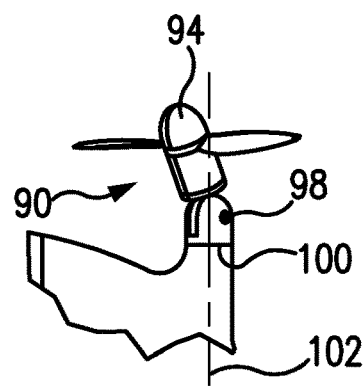

FIG. 6A is a perspective view of the subject vehicle 10 with an omni-directional thrust vectoring nacelle system. FIG. 6B is a top view of the system shown in FIG. 6A, and FIG. 6C is a cut-off from FIG. 6B showing at least one or more nacelles 90, 92, whose actuation provides omni-directional capability, which is achieved by providing the nacelle 90, 92 with a pivoting nacelle head 94, 96, and actuating the nacelle head to pivot about the axle 98. In addition, the base 100 of the nacelle 90, 92 may be actuated to rotate about the axis 102.

Figure 6D:
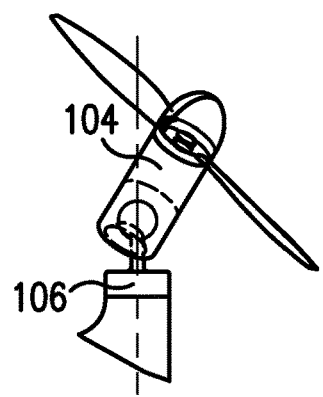

Alternatively, as shown in FIG. 6D, a similar omni-directional thrust vectoring capability is provided by using a ball joint style connection between the pivoting nacelle 104 and the fixed nacelle base 106.

FIG. 7A is an isometric view of the embodiment shown in FIG. 5B, with at least one (or more) multi-functional tilting nacelles 110. FIGS. 7 B-7I show, respectively, normal and perspective views of tilting nacelles 110 which are provided with various devices attached to the actuated nacelle (or nacelles) 110 whose attributes include, but are not limited to, fixed, deployable, actuated, retractable, being internally or externally mounted, mounted on the rear nacelle face or other nacelle surfaces, extending out of the rear nacelle face or other nacelle surfaces, passive or driven (powered), with or without sensory capability, with or without data gathering capability, with or without energy absorbing devices, with or without steering or maneuverability functionality, with or without flight augmentation capability, with or without interaction or connectivity to the ground, to other structures, to other vehicles or to other external systems, with or without docking capability to other structures, devices or systems, or any combinations of the afore-listed attributes.

FIG. 7B shows the tilting nacelle 110 provided with a retractable landing pad system 112, FIG. 7C shows a sealed rear nacelle face 114 that may or may not be surface treated for interaction with the intended contact surface, FIG. 7D shows the tilting nacelle 110 provided with a deployed landing gear bogie 116 extending past the rear face 114 of the nacelle 110, FIG. 7E shows the tilting nacelle 110 provided with a fixed, in-set, wheel 118 extending past the rear face 114 of the nacelle 110. FIG. 7F shows the tilting nacelle 110 provided with a claw-like gripping/grappling/anchoring system 120 extending from the rear face 114 of the nacelle 110 that may be utilized for example (but not limited to) to secure the vehicle, allowing for perching-like capability, and collecting specimen or ground sample 110. FIG. 7G shows the tilting nacelle 110 provided with a hook extension 122 extending past the rear face 114 and around the nacelle to serve as, but not limited to a catch, sky-hook, or skid. FIG. 7H shows a rear nacelle face 114 that features powering and data connectivity port 124 with FIG. 7I showing the tilting nacelle 110 provided with a tank track style apparatus 126 extending around the rear face 114, as well as the upper face 128 and lower face 130 of the nacelle 110. It is important to note that any appendage or system installed on the tilting nacelle 110 that may come into contact with or interact with any other object or surface may additionally comprise features including, but not limited to, suspension, dampening, detection, sensing, pivoting, manipulation, collecting, perching, docking, and maneuvering.

Figure 8A:
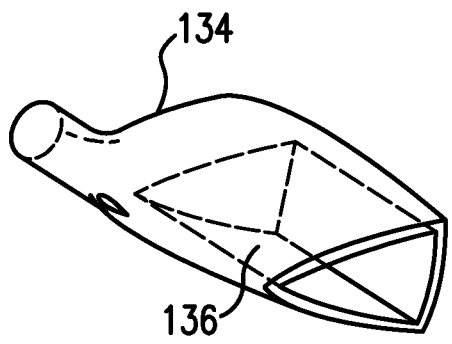
FIGS. 8A-8F shows several detail views of payload applications pertaining to the nacelle system.

FIGS. 8A-8F show additional suggested payload functionality for at least one or more actuated nacelles presented in FIG. 7A and its embodiments shown in FIGS. 7B-7I. FIG. 8A shows a modified nacelle module 134 formed with a compartment 136 which is intended for housing a number of systems such as avionics, safety systems, communication systems, propulsion systems, mechanical systems, power systems, fuel tank, fuel cell, or other generic payloads or electronics.

Figure 8D:
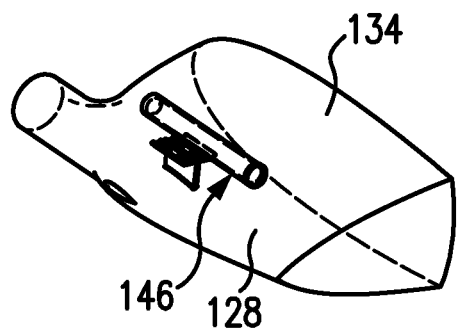
Figure 8B:
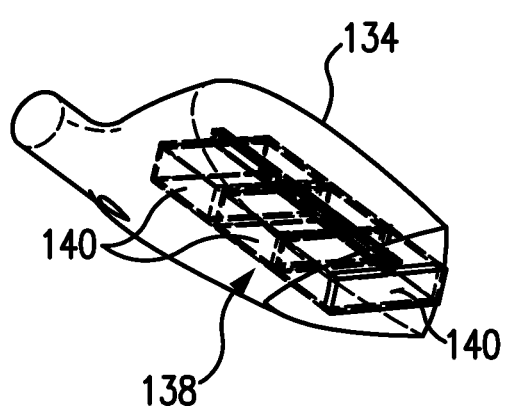

FIG. 8B shows the nacelle 134 configured with a payload deployment system 138 capable of payload delivery, for example, of three contained boxes 140, in a serial/sequential fashion loaded in the compartment formed in the nacelle 134.

Figure 8E:
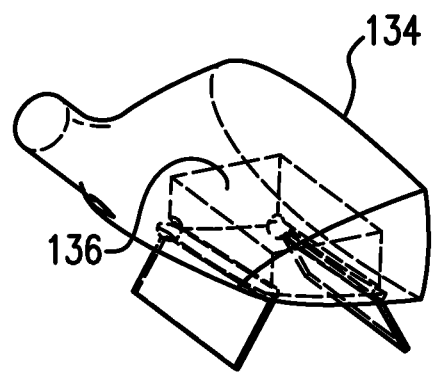
Figure 8C:
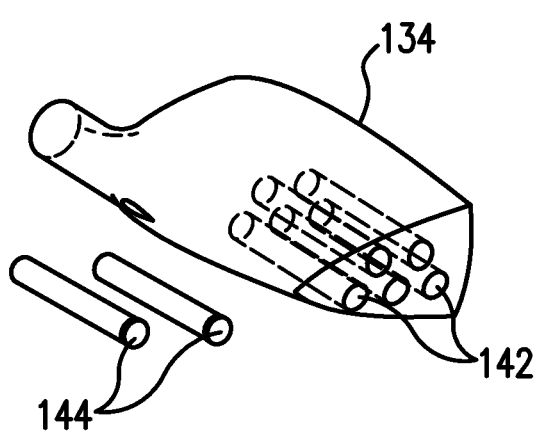

FIG. 8C shows a plurality of payload compartments 142 contoured, for example, for tubular payloads 144. However, the compartments may be of any other shape, and may extend in parallel or in series.

FIG. 8D shows the nacelle 134 provided with an external payload deployment system 146, (or payload hardpoint) installed on the surface face 128 of the nacelle 134. FIG. 8E shows the nacelle 134 whose payload compartment 136 may be exposed by actuating gates (surfaces) 148.

Figure 8F:
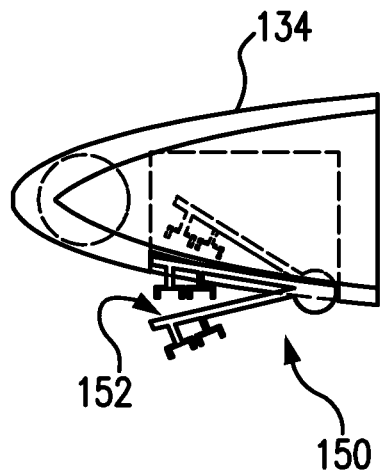

FIG. 8F shows the nacelle 134 provided with a nacelle payload compartment 136 that blends features from several afore-described embodiments such as, for example, series and parallel payload delivery (FIG. 8B), internal (FIGS. 8A, 8B, 8E) and external compartmentalization (FIG. 8E), and multi-stage delivery mechanism 150 which includes a payload receiver (or cartridge) 152 actuated to expose the embedded payload hardpoints.

Figure 9A:
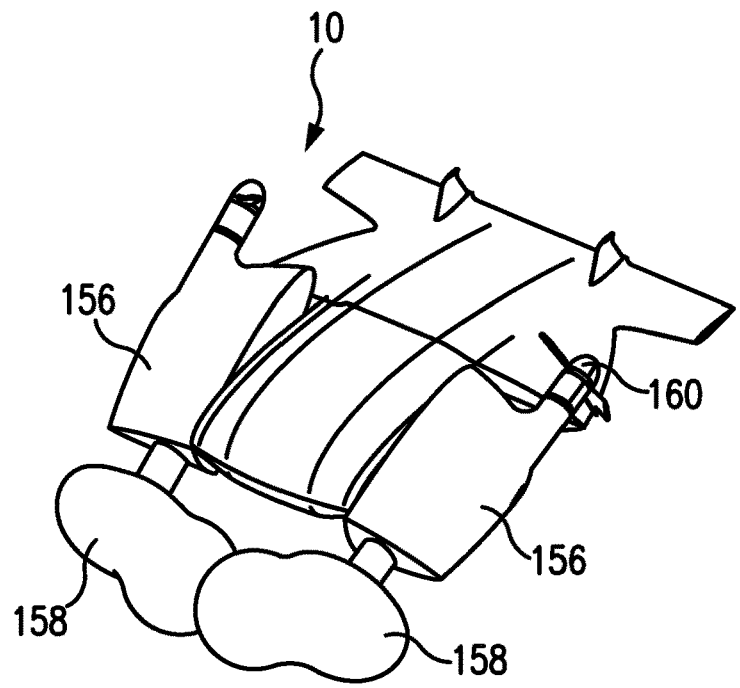
FIGS. 9A-9B show the vehicle embodiments of the subject system where the actuated nacelles are shown with the deployed safety devices.
Figure 9B:
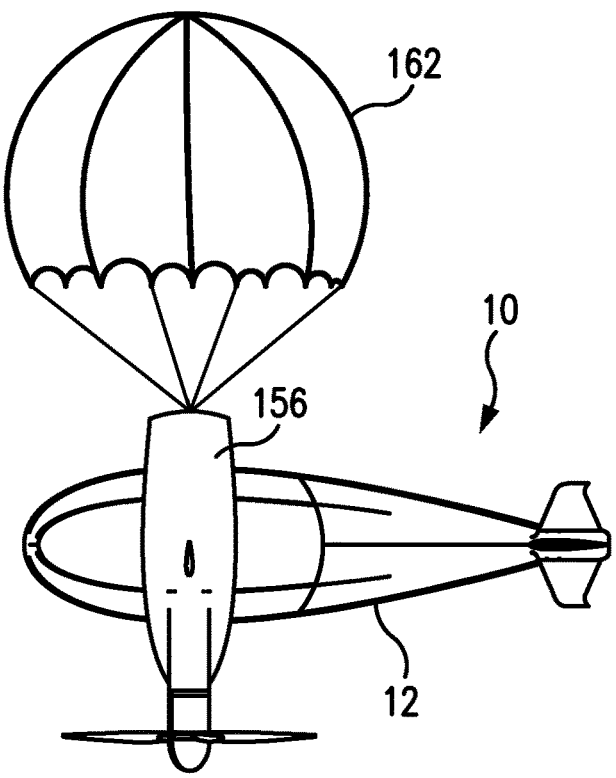

FIGS. 9A-9B show two embodiments of the subject vehicle 10 where at least one (or more) actuated nacelles 156 have deployed safety devices 158. FIG. 9A shows an embodiment of the subject aircraft 10, in a crisis situation where the flight termination sequence may be engaged and damage mitigation may be desirable. As shown in FIG. 9A, the vehicle 10 has the actuated nacelles 156 turned such that at least one (or more) propulsive devices 160 are destructively engaged with at least one (or more) components of the vehicle 10. In this situation, at least one (or more) airbag-style or energy absorbing devices 158 have deployed to mitigate energy transfer on impact. The energy absorbing device 158, if inflated with air/gas, may provide buoyancy in case of splash down. FIG. 9B shows another embodiment of the subject vehicle 10 where a scenario of flight termination occurs. As shown, a controlled descent is actuated which utilizes at least one or more parachutes 162 (or other deceleration devices).

Figure 10A:
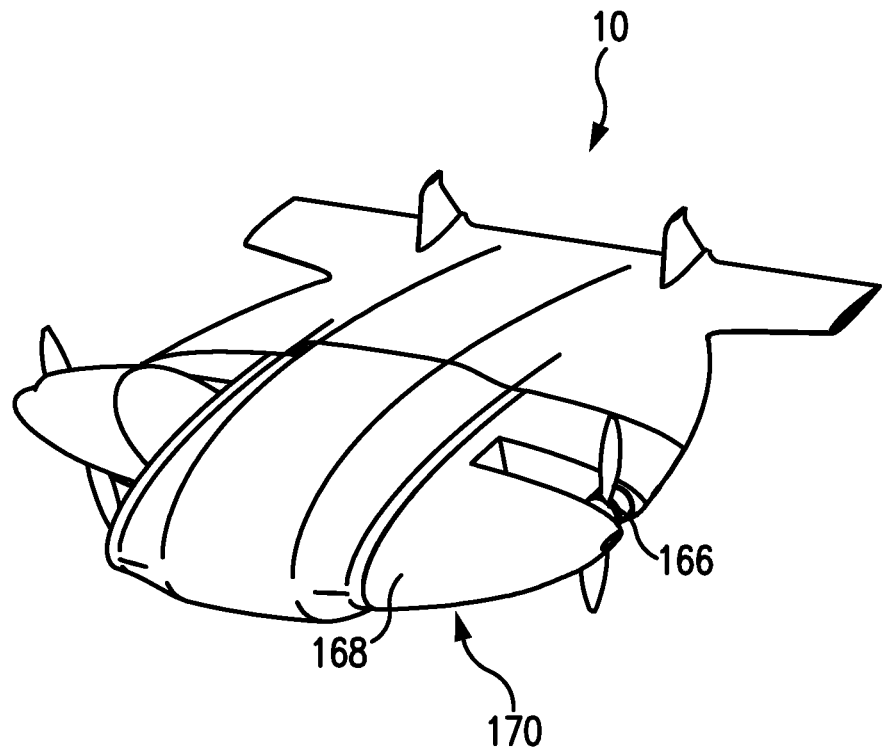
FIGS. 10A-10E show alternative embodiments of the propulsive system.

FIGS. 10A-10E show five alternative embodiments of various configurations and methods of operation of the propulsion system. FIG. 10A shows the subject system 10 with a propulsion system 166 mounted on the body 168 of the nacelle 170. The thrust vectoring capability deploys in corresponding fashion with the actuated nacelle 170.

Figure 10B:
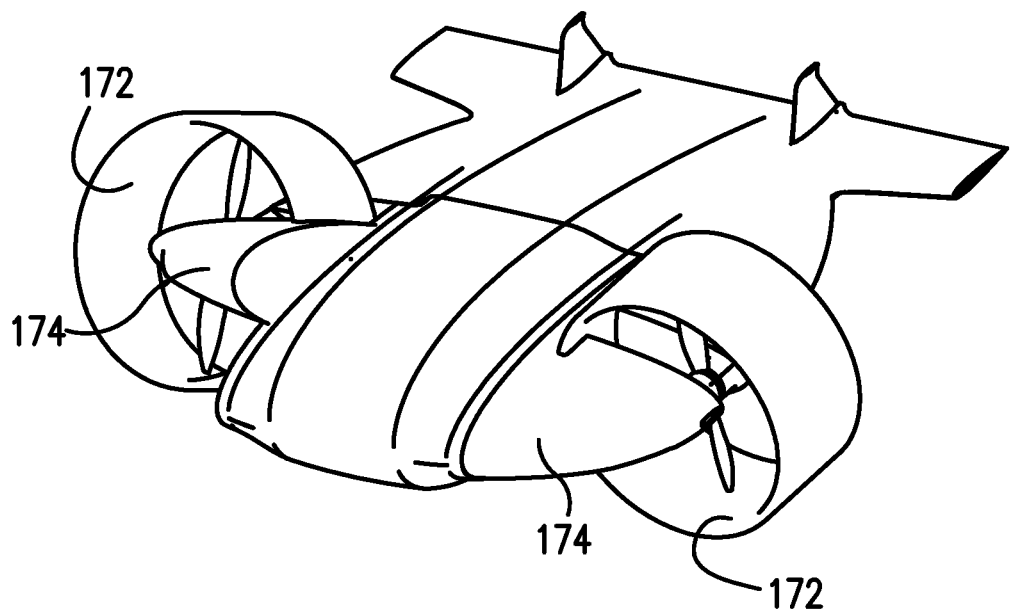

FIG. 10B shows the subject system with the propulsion system 172 mounted on the shrouded (or ducted) nacelle module 174 whose thrust vectoring capability deploys in conjunction with the actuated nacelle. In FIG. 10B, the trailing edge 176 of the shroud (or ducting) may additionally serve as a landing apparatus for which this embodiment may rest while in the prone position.

Figure 10C:
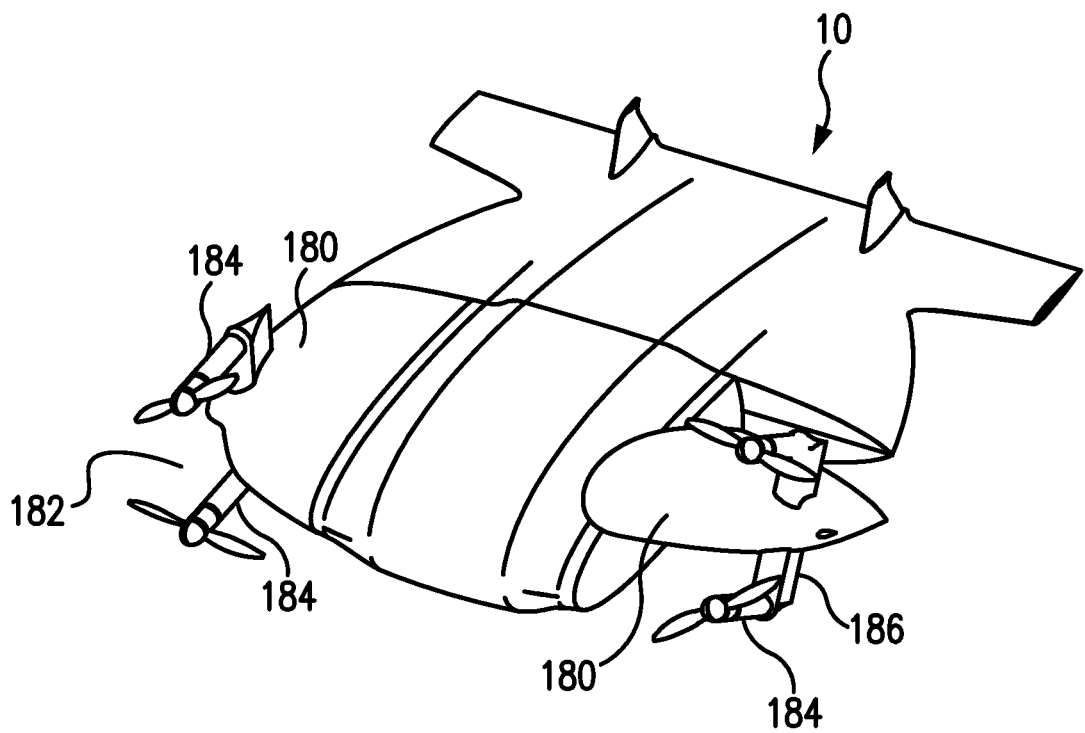

FIG. 10C shows the nacelle 180 provided with a multi-propulsion mechanism 182, comprising a plurality of propulsive devices 184. The multi-propulsion mechanism 182 is actuated by the movement of the nacelle 180. In the embodiment shown in FIG. 10C, any number of propulsion devices 184 may be installed on the aircraft 10 which may have independent actuation timed with the nacelle's deployment. A supporting structure 186 connecting the propulsion devices 184 to the nacelle 180 may rotate or translate to allow further degrees of freedom.

Figure 10D:
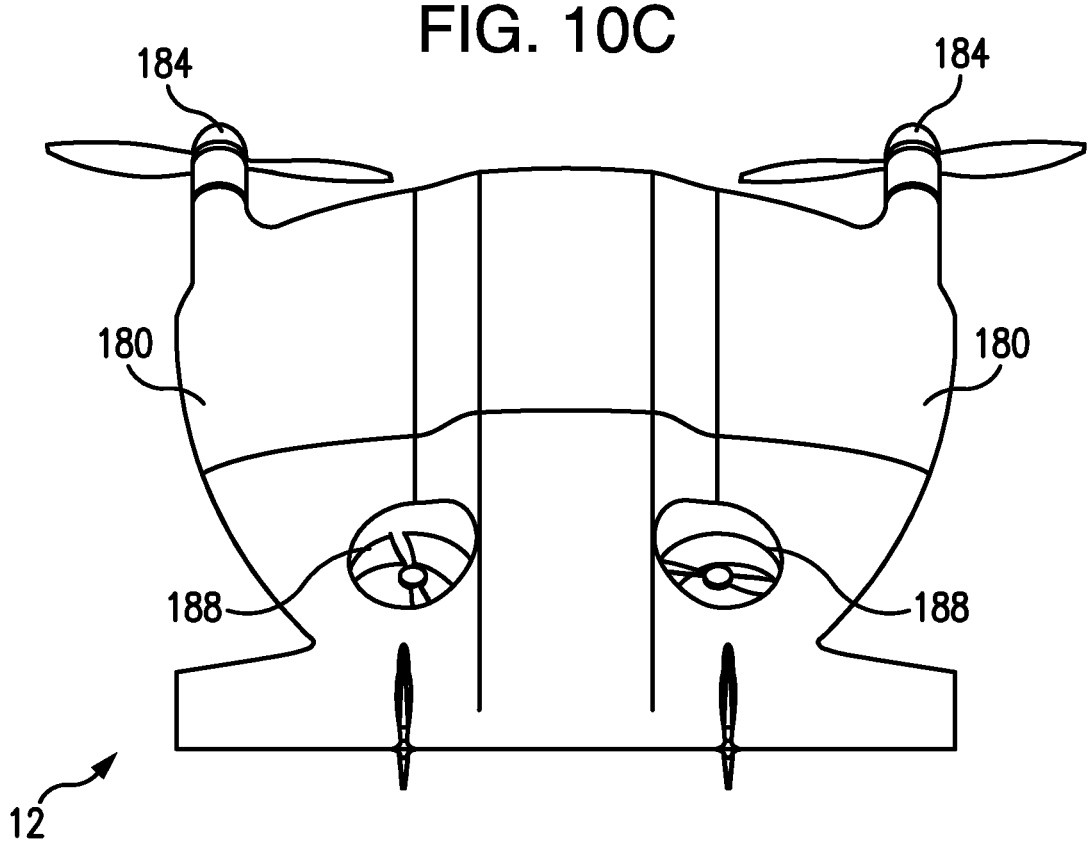

FIG. 10D shows the subject system 10 with at least one or more propulsive devices 184, 188 that are mounted in a direction which generally is not aligned with the motion of the vehicle. The propulsive devices 184 may be mounted on the tilting nacelle 180. Alternatively, the propulsive devices 188 may be embedded in the lifting body 12 fixed or thrust vectored, centered or offset, and may be utilized for the vehicle 10 maneuverability or any other kind of manipulation of stability and control including stable positioning in a fluid.

Figure 10E:
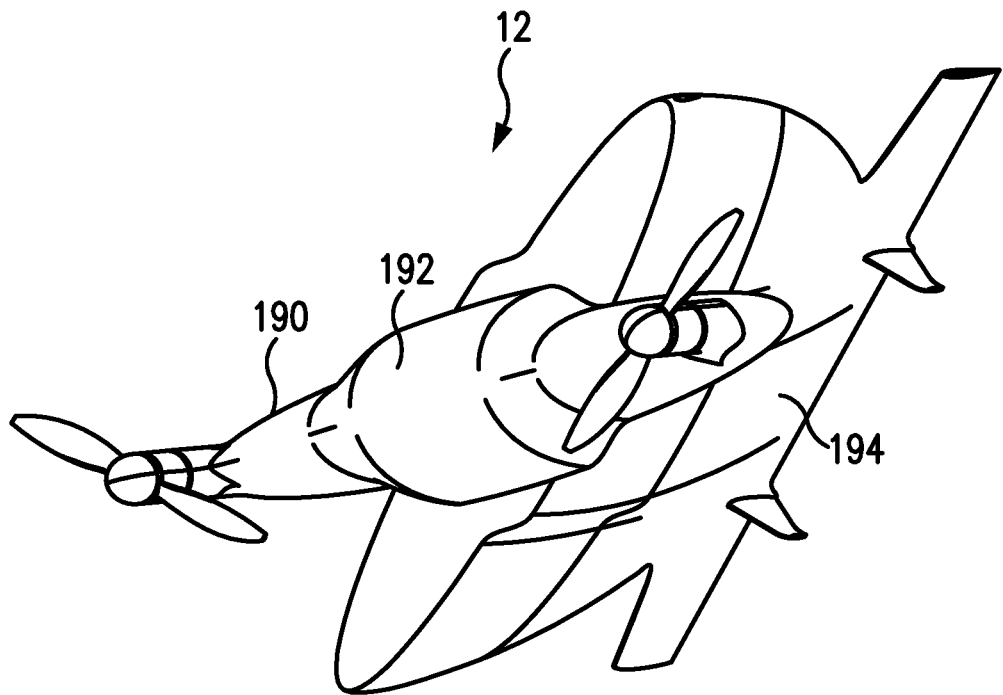

FIG. 10E shows the co-joined nacelles 190 having a body section 192 capable of rotating co-joined nacelles 190 with respect to the section 194 of the lifting body 12. While the embodiments shown in FIG. 10A-10E illustrate nacelle mounted propulsive devices, it is contemplated that the propulsive devices may be installed in other locations of at least one or more nacelles, lifting body sections, or any combinations thereof.

Figure 11:
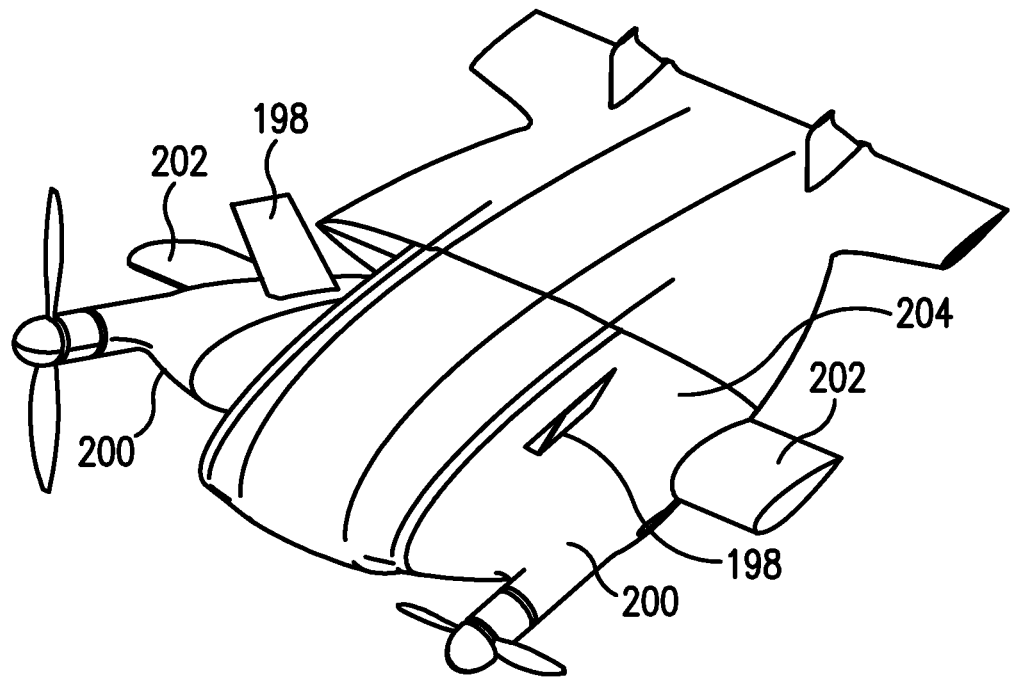
FIG. 11 is a perspective view of an embodiment of the subject system with installed surfaces/extensions.

FIG. 11 shows a perspective view of still another embodiment of the subject aircraft 10 comprising at least one (or more) surface extensions 198, located on at least one or more nacelle modules 200. The methods of installation of the surface extensions 198 and extensions 202 may include, but are not limited to, fixed, actuated, deployable, detachable, or jettison-able extensions. The surface extensions 198, 202 may be used to control aerodynamics, stability, controllability (or any combination thereof) of the vehicle 10. The surface extensions 198, 202 may also operate in conjunction with at least one or more payloads, hardpoints, sensors, other devices, other sub-systems, other docking mechanisms, or any combination thereof.

Figure 12A:
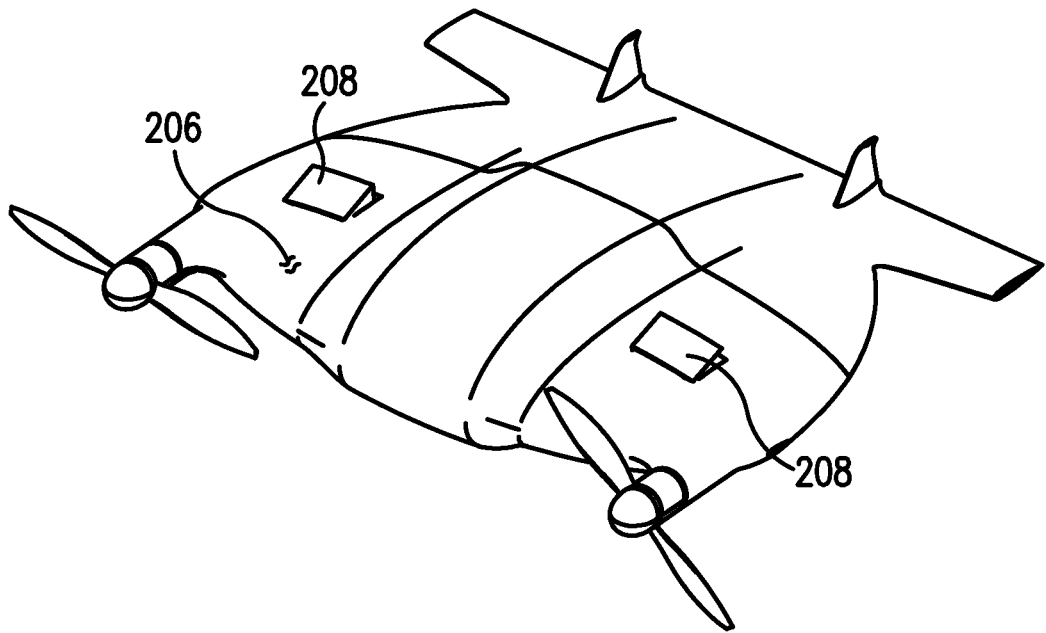
FIGS. 12A-12B show alternative embodiments of the method for manipulating the fluid flow.
Figure 12B:
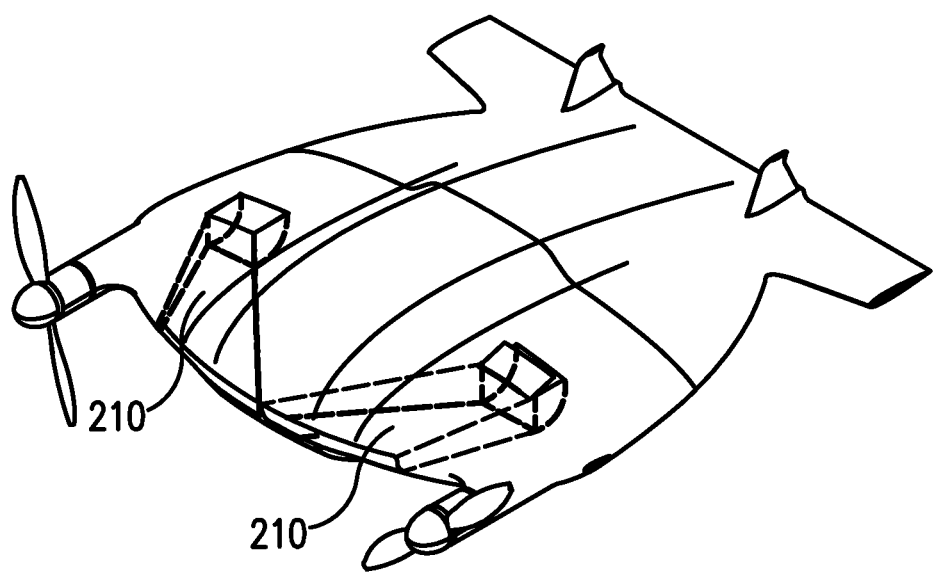

FIGS. 12A-12B show two exemplary embodiments of the methods for manipulating the fluid flow in the subject system. FIG. 12A shows an embodiment where at least one or more surface skin manipulators 206 are utilized. In this embodiment, while the speed brake type surfaces 206 are shown as an example, other arrangements for air fluid flow control may be used, including deployed surface skin manipulators (passive or actuated) which would further manipulate the aerodynamic flow or boundary layer flow surrounding the surface of the nacelles or the lifting body. The skin manipulator devices 206 include, but are not limited to, skin roughing, texturing, blistering, undulation, indentation, slits, slots, steps, and other vortex generation devices.

FIG. 12A also illustrates at least one or more doors 208 exposing other sub-systems or sensors.

FIG. 12B shows an embodiment of the subject aircraft system 10 where at least one (or more) internal ducts 210 mostly transfer the leading edge flow to another portion of the vehicle, so that the energy can be injected into any other location of the vehicle's surrounding boundary layer. Further, methods capable of inserting energy into the surrounding fluid include combinations of, but are not limited to, energization of flow via ducting, venting, sucking, vibrating, heating, cooling, and MEMs (Microelectromechanical systems).

Figure 13A:
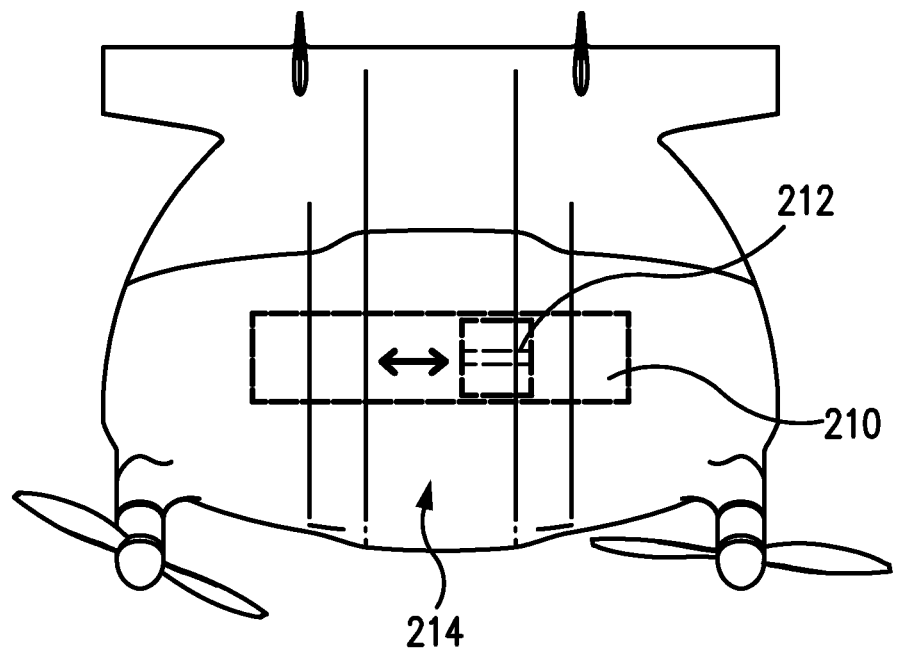
FIGS. 13A-13B show alternative embodiments of the method for manipulating the center gravity of the subject vehicle.
Figure 13B:
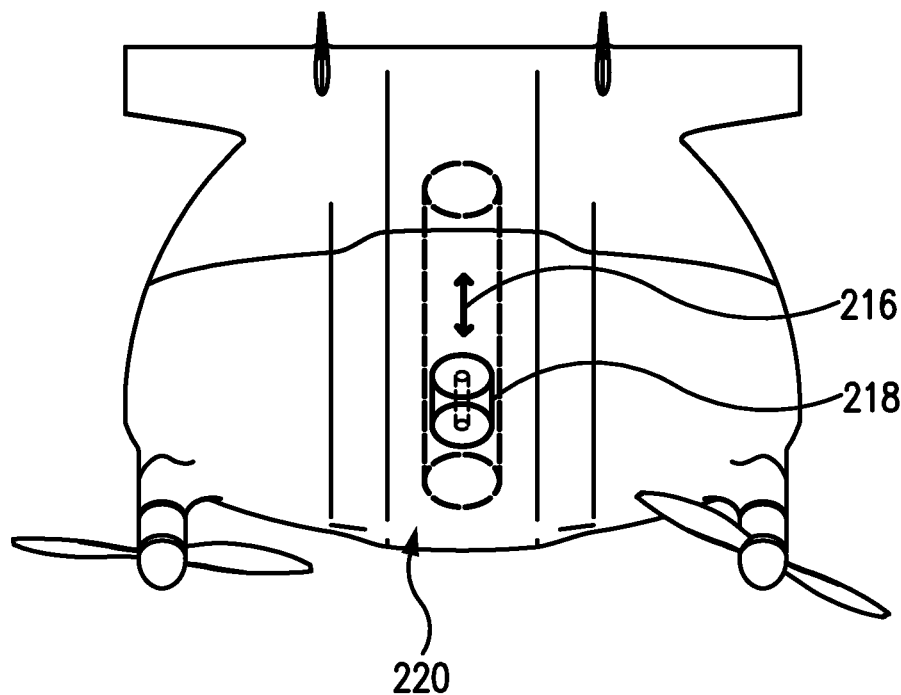

FIGS. 13A-13B show two embodiments of methods for manipulating the center of gravity of the subject vehicle system 10. FIG. 13A shows an embodiment where at least one span-wise cavity (or guide) 210 permits span-wise movement of an internal mass (or ballast) 212, so that the center of gravity can shift laterally, to manipulate the vehicle's stability, control, or both. The span-wise shifting mass system 214 may be further used to counter balance asymmetric mass distribution possibly due the jettisoning of at least one or more payloads and/or sub-systems.

FIG. 13B shows an embodiment of the subject aircraft system 10 where a chord-wise cavity or guide 216 allows the chord-wise movement of an internal mass 218, so that the center of gravity shifts longitudinally, to control the vehicle's stability. The chord-wise shifting mass system 220 may be further used to aid in the transitioning between vertical and horizontal modes of operation, in addition to counter-balancing an asymmetric mass distribution possibly due the jettisoning of at least one or more payloads and/or sub-systems.

While FIGS. 13A-13B depict a single guide 210 and 216. However, multiple guides containing one or more masses, installed in any orientation are contemplated in the present system. This may provide the center of gravity management sub-system and may provide any degree of freedom to the moving mass or masses 212, 218 to achieve the desired results.

Figure 14A:
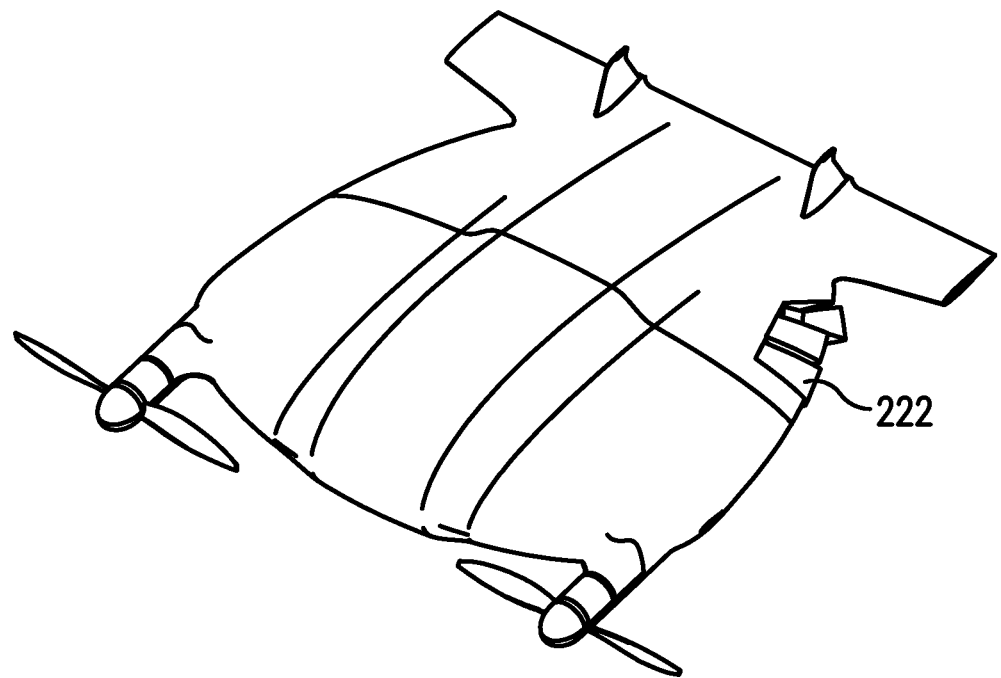
FIGS. 14A-14B show alternative embodiments of the subject system capable of manipulating aerodynamic performance, vehicle stability, and/or vehicle control.
Figure 14B:
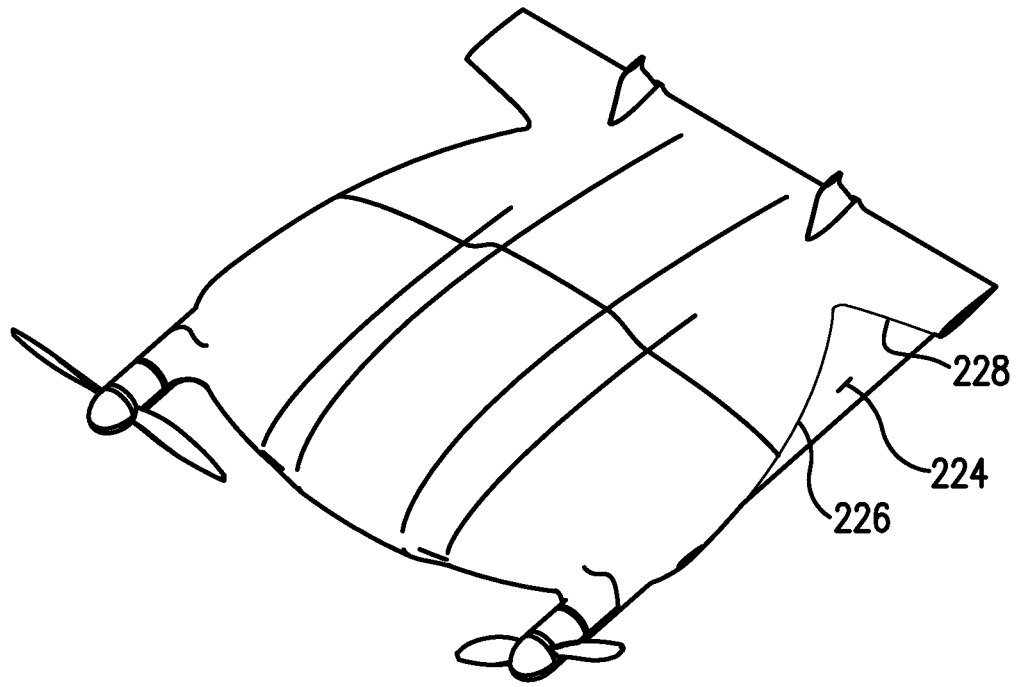

FIGS. 14A-14B show two embodiments of the subject aircraft system 10 capable of additional control of the aerodynamic performance and vehicle stability. FIG. 14A shows one (or more) ventral trailing edge surface actuators 222 by means of which the camber and span of the lifting body may be controlled. FIG. 14B shows one or more fixed or deployable membranes which may be fabric or mesh 224 housed along the ventral trailing edge 226 capable of extending along the span of the horizontal surface leading edge 228. It is important to note that such devices may be further installed within pairs and symmetrically about the standard chord line.

Figure 15:
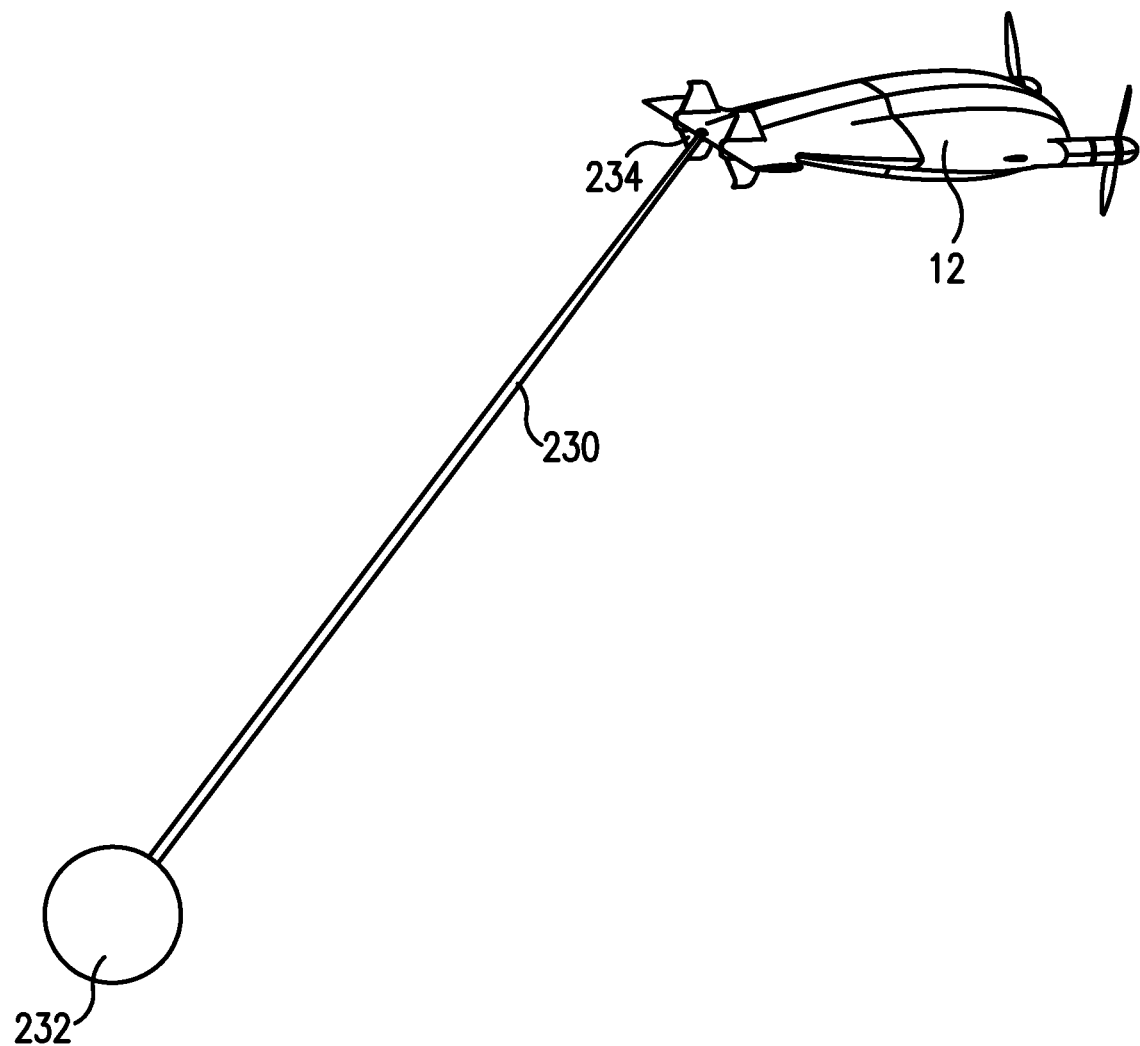
FIG. 15 shows an embodiment of the subject system utilizing a tethered arrangement.

FIG. 15 shows an embodiment of the subject aircraft system 10 where the vehicle 12 is connected via a tether 230 to a fixed or moving connection point 232 that may be aerial, grounded, amphibious, or marine. The tether 230 may carry electricity, fiber optics, other signal carrying components, or any combination thereof, in addition to the structural, load bearing tether structure. The tether connection 234 may be situated on any location thereof, so that the connection 234 has the engaging capability, as well as the disengaging capability.

The tethered method of operation permits tethered flight capability with the added benefit of disengaging the tether for on-command fly-away. Additionally, at least one or more tethers 230 may be connected to at least one or more towed objects 232 that are being transported by the vehicle 12. The towed objects 232 may comprise a singular, or multitude, or combination of: payloads, such as, nets, banners, flags, targets, capture devices, or other vehicles.

Figure 16A:
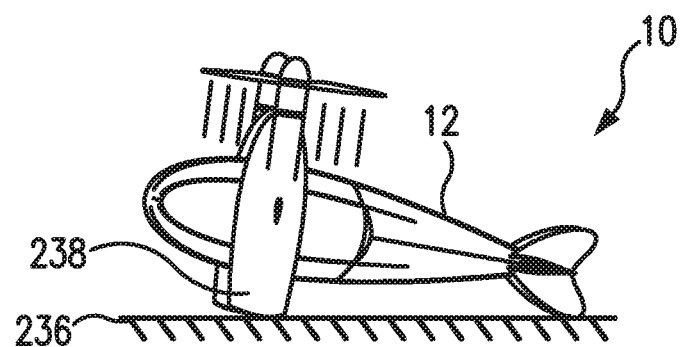
FIGS. 16A-16E are representative of different modes of vehicle interaction with the landing surface and tail sitting capability (FIG. 16C)
Figure 16B:
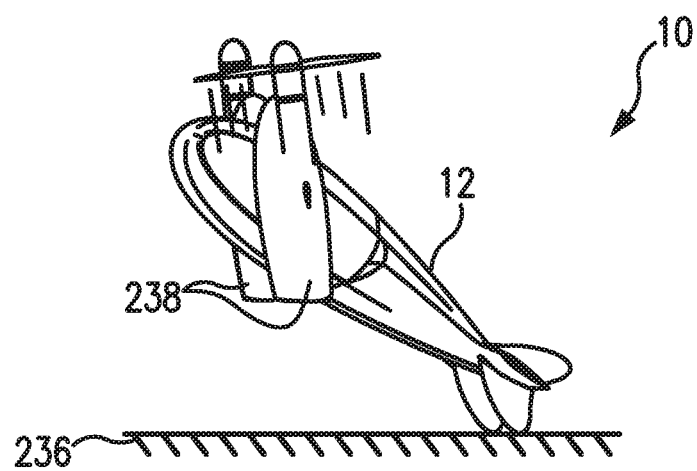
Figure 16C:
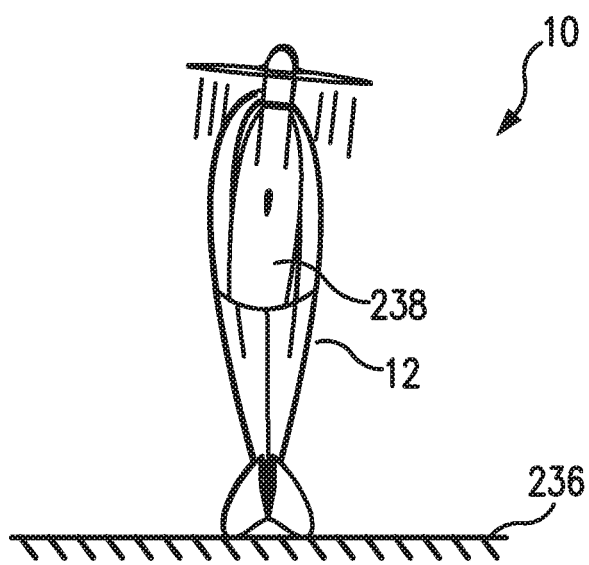

FIGS. 16A-16C illustrate a number of exemplary embodiments related to the vehicle interaction with the landing surface 236. Specifically, FIGS. 16A-16C illustrate how the tail sitting empennage cooperates with the landing surface 226 while the thrust vectoring nacelles 238 control the vehicle's orientation. As shown, the take-off transition is observed when taken sequentially in FIGS. 16A-16C. The landing transition to the prone position is observed. It is important to note that while FIG. 16B shows a preference toward the left transition, the vehicle 10 has the ability to transition, to or from a vertical orientation, on either of its lifting body sides.

Figure 16D:
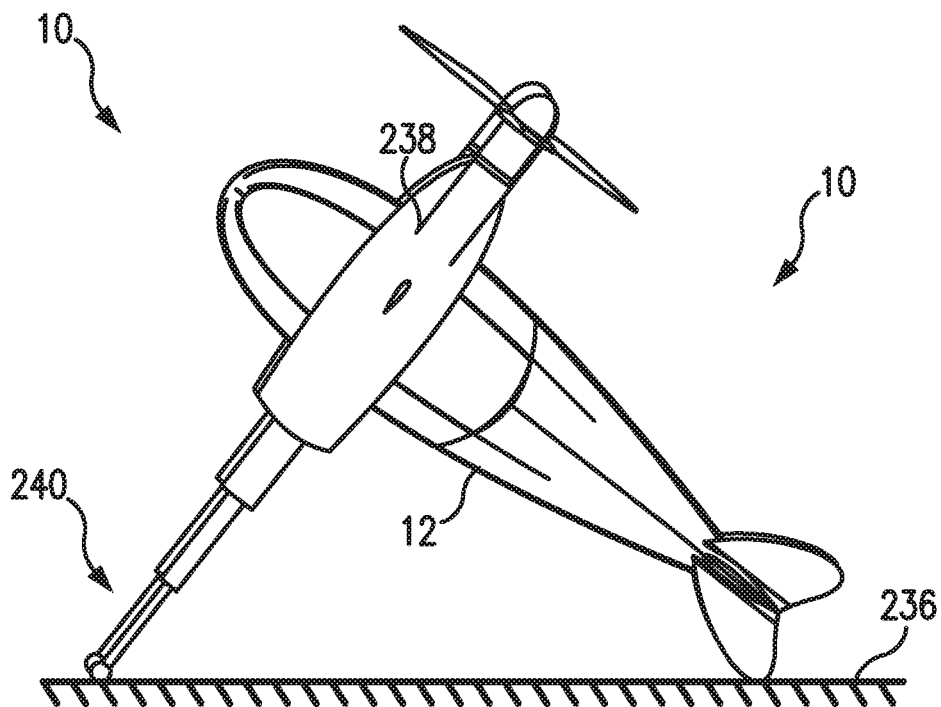

FIG. 16D shows at least one telescoping landing apparatus 240 telescopically released from the rotated nacelles 238 that may, for example, hold the vehicle 10 at a given interim angle for accommodating surface inclination or unevenness, aid in the transition to or from the vertical orientation, or combination thereof. The telescoping landing apparatus 240 may be further utilized to hold the vehicle at a desirable angle in order, for example, to facilitate operation, maintenance, sensing of the vehicle's surrounding, or combinations thereof.

Figure 16E:
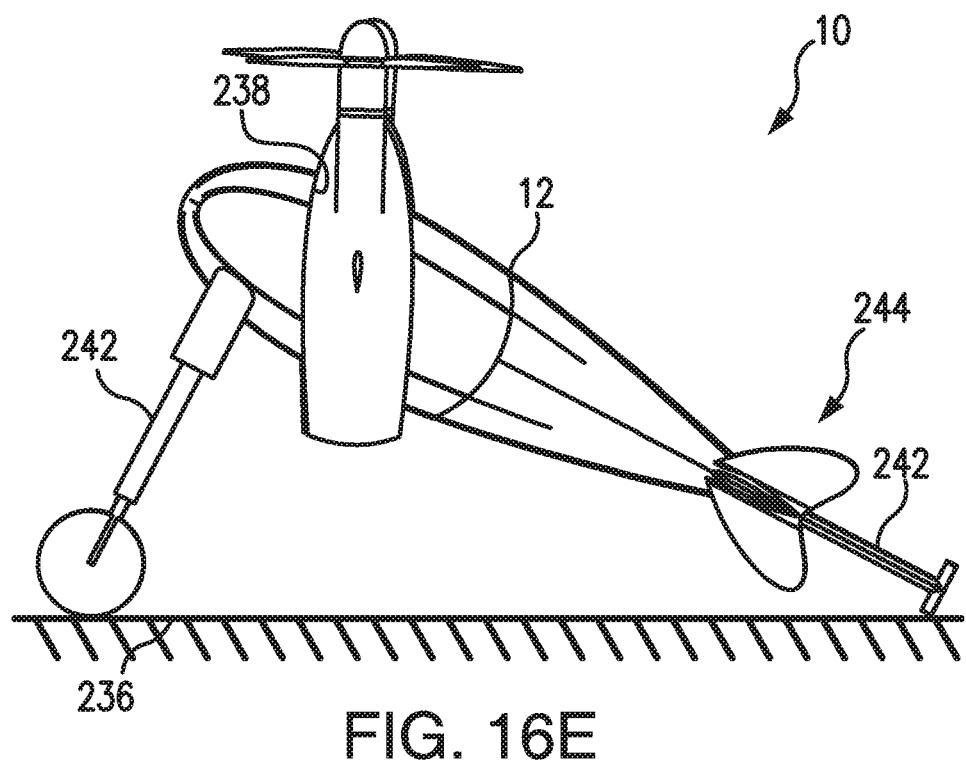

FIG. 16E shows an embodiment where at least one or more landing apparatus appendages 242 may be located in other sections of the vehicle 10. For example, the landing apparatus appendages can extend from the vehicle's lifting body 12, from the aft section 244, or both. The landing apparatus appendages 244 may comprise attributes, in any combination of, deploy-ability, retract-ability, actuation, rigidity, or jettison-ability.

Figure 17A:
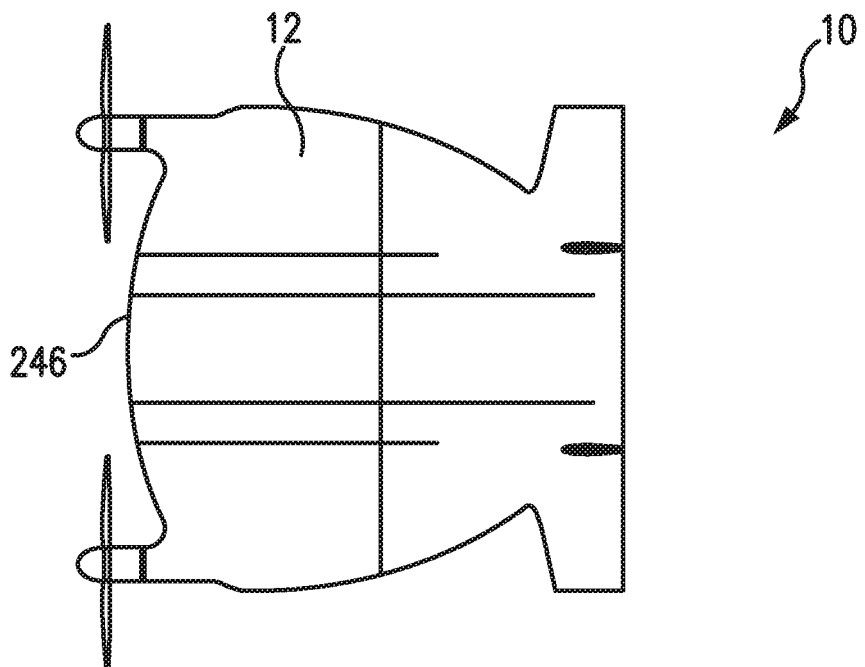
FIGS. 17A-17E show alternative embodiments of the subject vehicle comprising forward and rear section rotation along a span-wise hinge line.
Figure 17B:
Figure 17C:
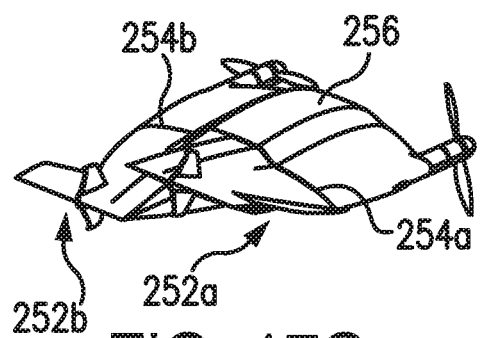

FIG. 17A shows a top view of the subject aircraft system 10 with a fixed tail section 246. FIGS. 17B-17E illustrate alternative actuated rear body section surfaces. FIG. 17B shows all-moving horizontal surfaces 248 emanating from the rear section lifting body 250. FIG. 17C shows a split rear section (252a and 252b) that are actuated about span-wise hinge lines 254a, 254b respectively, connected to a forward lifting body section 256.

Figure 17D:
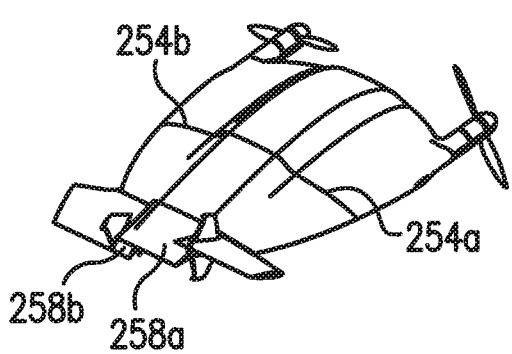

FIG. 17D shows all-moving horizontal surfaces 258a, 258b that also pivot the vertical surface about the hinge line 254a, 254b, respectively.

Figure 17E:
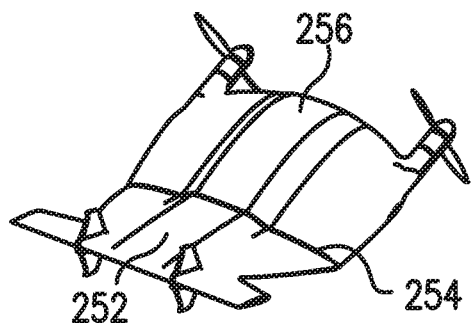

FIG. 17E shows a span-wise hinge line 254 connecting a forward body section 256 and the rear body section 252 rotatable relative to one another. It in importation to note that the span-wise hinge line rotation shown in FIG. 17C and FIG. 17E allows for overall vehicle camber manipulation. Additional body section partitioning along a span-wise direction are also contemplated in order to allow a further curvature manipulation of the subject vehicle 10.

Figure 18A:
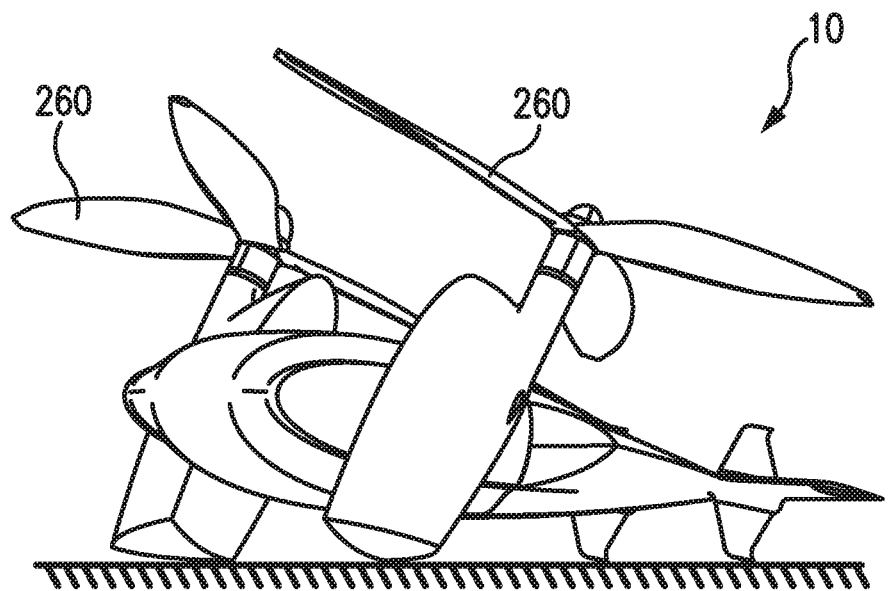
FIGS. 18A-18E show alternative embodiments of the subject vehicle with over-sized interlacing propellers.
Figure 18B:
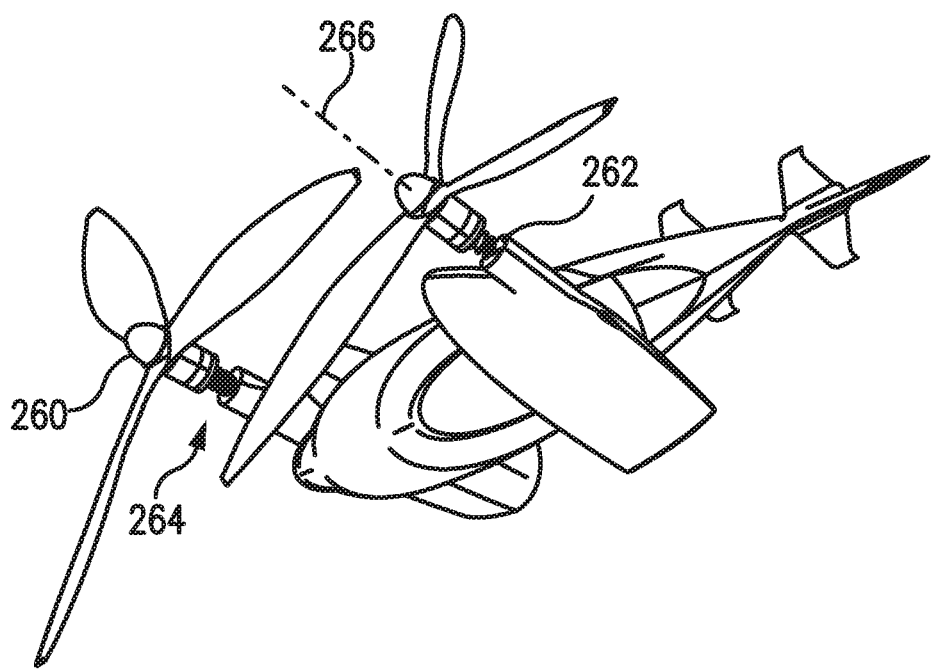

FIG. 18A shows a multi-blade propulsion embodiment of the subject system 10, whose operation involves interlacing the over-sized propellers 260 such that they do not strike each other. FIG. 18B shows the propulsion system 260 attached to the nacelle 262 via an actuation system 264. The propulsion system 260 translates along the propeller's central axis 266 and may be either passive or driven.

As shown in FIG. 18B, the actuation system 264 comprises a dampening and a suspension system 266 that allows the entire propulsion assembly 260 to move forward or aft of the propeller interlacing plane. In this fashion, should the RPM of a given propeller 260 be out of sync with the interlacing RPM, the propulsion assembly will translate off-plane, forward or rearward, as to avoid collision of the propellers.

Figure 18C:
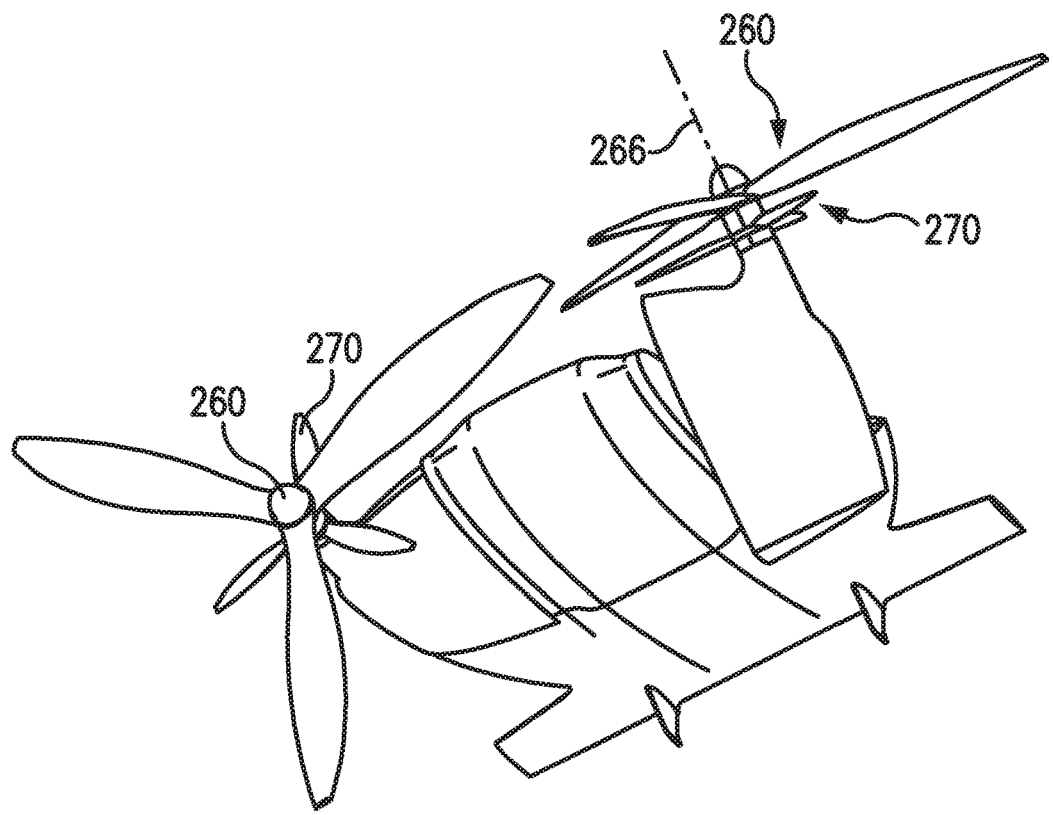

FIG. 18C shows a smaller propeller 270 installed in series with the larger interlacing propeller system 260. Both propellers 260, 270 are installed along the same central thrust axis 266 on the nacelle 262. The "child" propeller 270 may be driven or free spinning, and can be utilized in various modes of operation, such as a source for additional thrust, a parasitic drag device capable of manipulating thrust balance, any combination of yaw, or roll, or pitch, control, an auxiliary power unit capable of generating power, RPM manipulation or helical propeller wash manipulation of the in-line larger propeller, or any combination thereof.

Figure 18D:
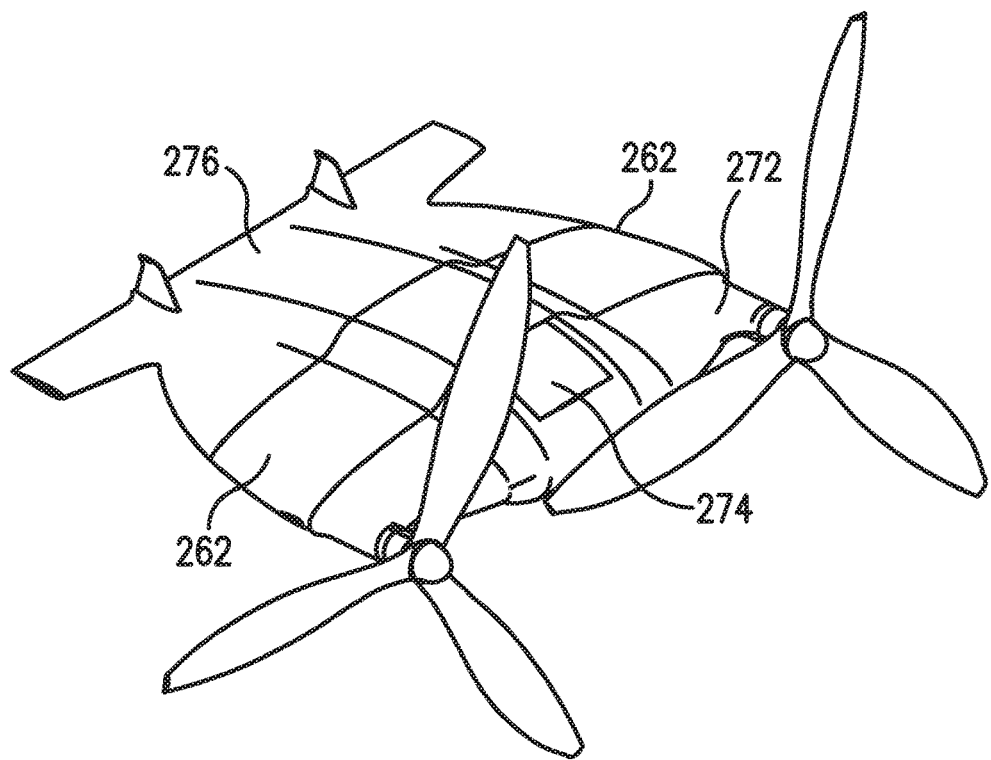

FIG. 18D illustrates a forward vehicle section that creates a propulsion yoke system 272 connecting both propulsion nacelles 262. The yoke system 272 restricts the nacelle 262 attachments to a unified motion. The yoke system 272 is installed to an actuation connection 274 that is interfaced with a rearward lifting body section 276.

Figure 18E:
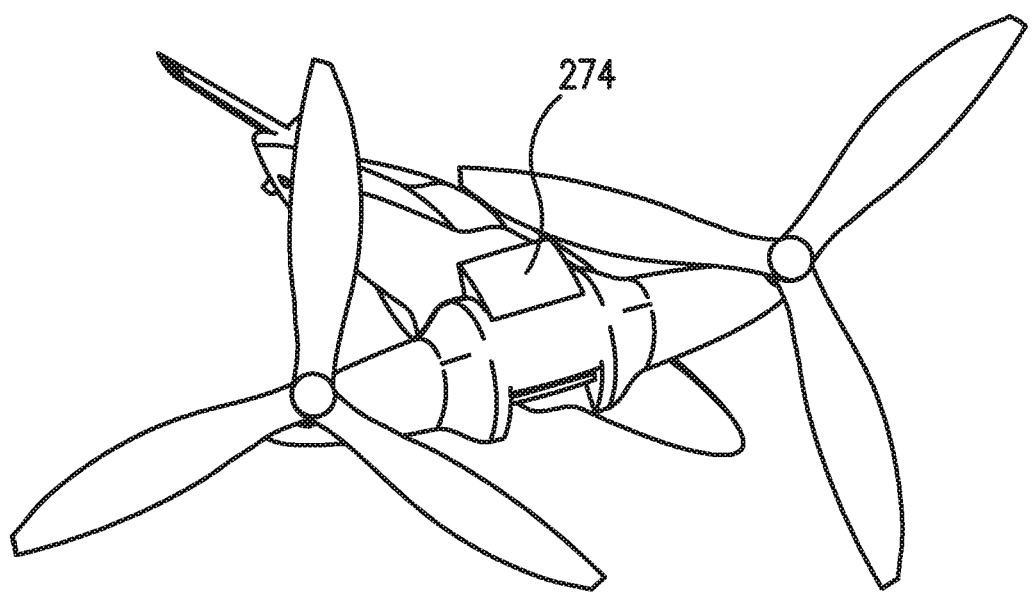

FIG. 18E illustrates the freedom of motion the actuating connection 274 permits, while the yoke system is capable of having roll and pitch control of the vehicle.

Figure 19:
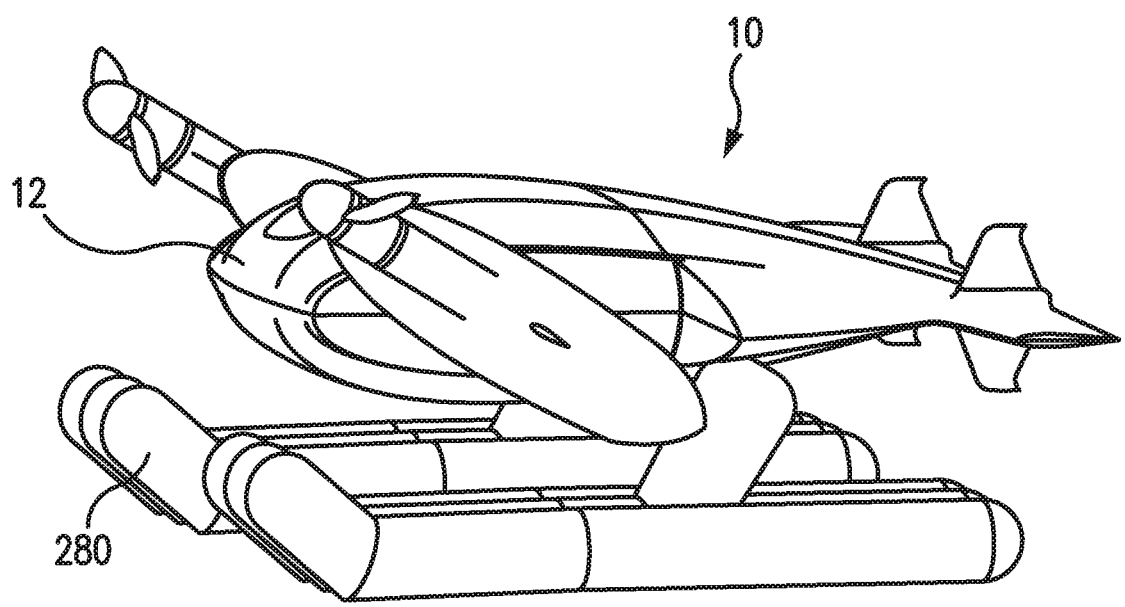
FIG. 19 shows an embodiment of the subject system comprising a landing apparatus released from the lifting body.

FIG. 19 shows an embodiment where a landing apparatus 280 is released from the lifting body 12 of the aircraft 10. While FIG. 19 illustrates a flotation style raft system, the landing apparatus 280 may include, but not be limited to, skids, wheels, pads, grippers, or struts. Furthermore, the landing apparatus 280 may be capable of, but not limited to, stowage, deployment, actuation, rotation, inflating, deflating, jettisoning, or any combination thereof.

Figure 20A:
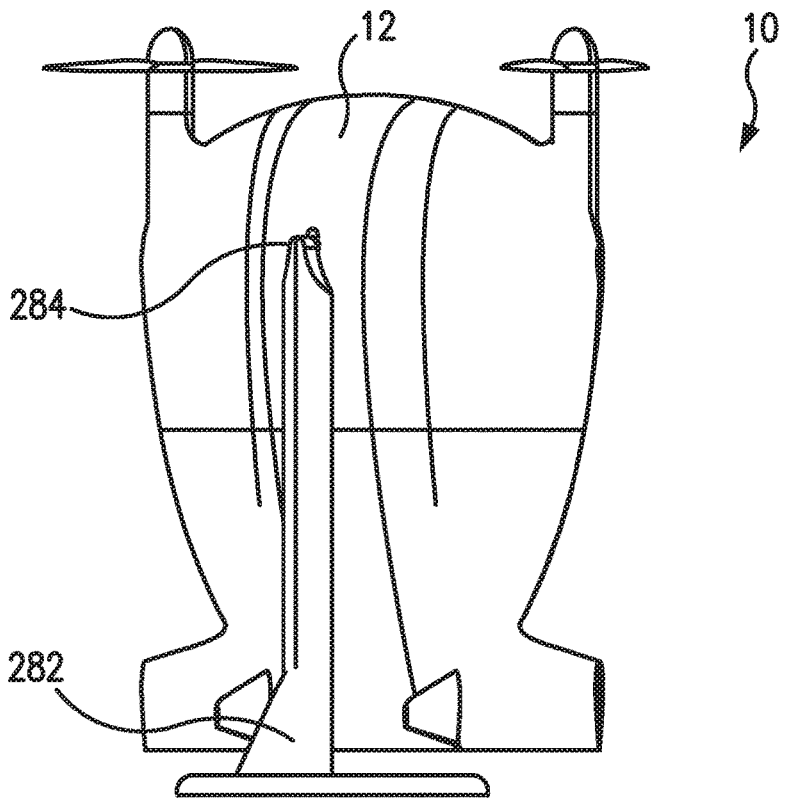
FIG. 20A shows a stationary launch/land structure supported by three mobile launch embodiments shown in FIGS. 20B-20D.

FIG. 20A shows a stationary launch and land structure followed by three additional mobile launch embodiments. As shown in FIG. 20A the subject system contains the craft 10 attached to a launch structure 282 via a release connection 284.

Figure 20B:
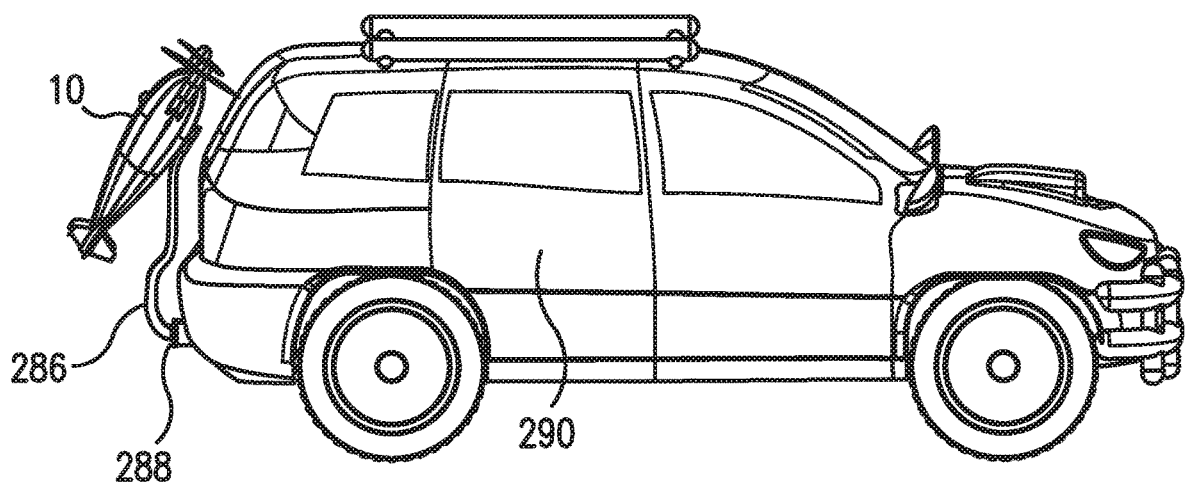

FIG. 20B shows an embodiment where the subject vehicle 10 is transported by means of a launch structure 286 that is hitch mounted 288 to a host vehicle 290.

Figure 20C:
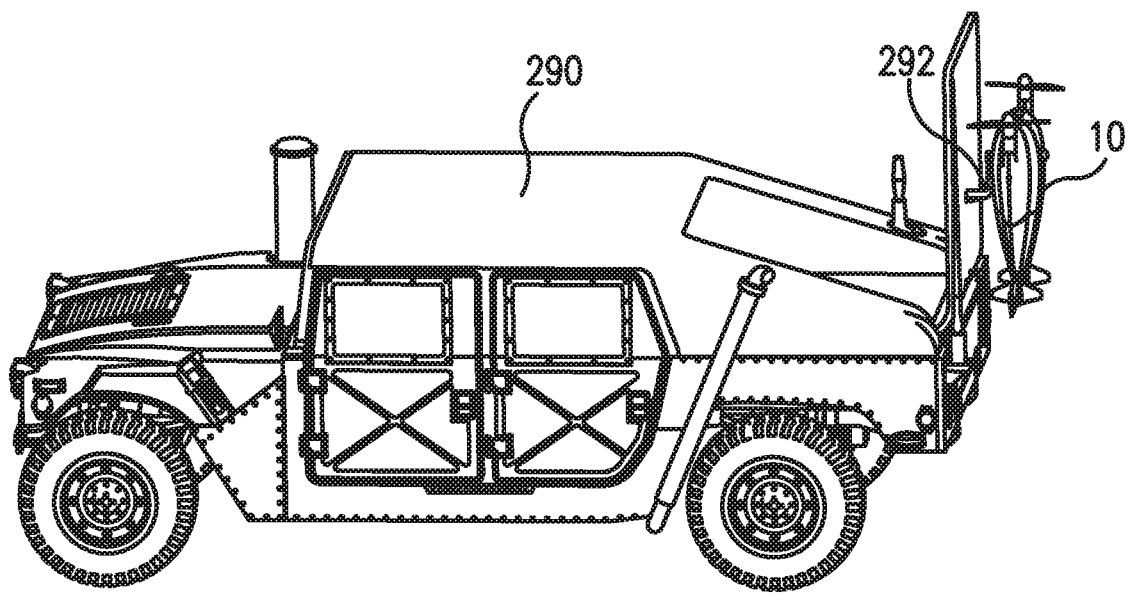
Figure 20D:
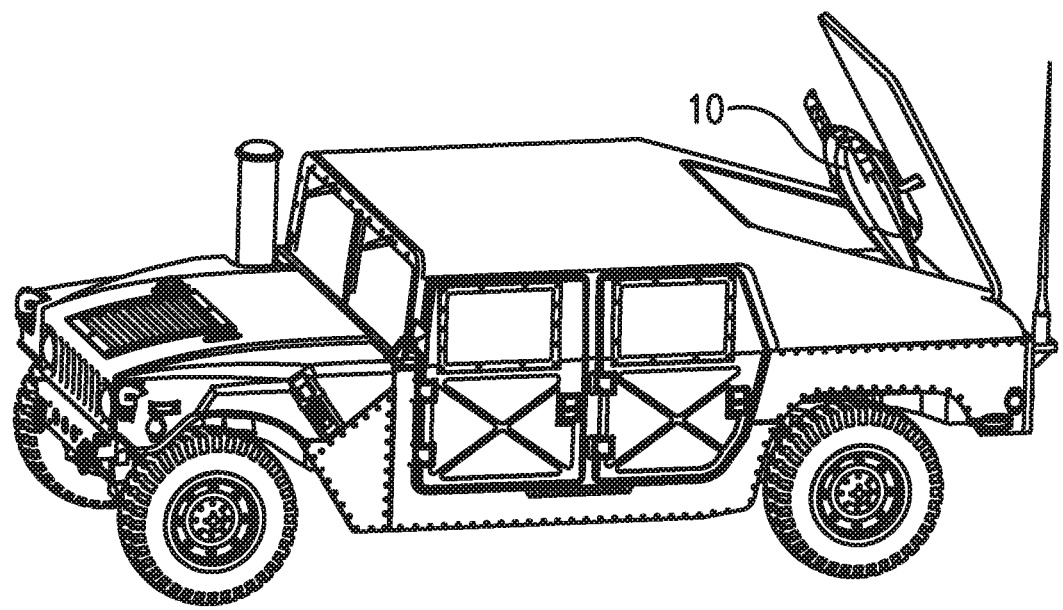

FIG. 20C shows an embodiment where the aircraft 10 is transported externally by a host vehicle 290 via an attachment system 292. FIG. 20D contains the same premise as the embodiment shown in FIG. 20C with the difference that the aircraft 10 is harbored internally.

It is important to note that the vehicle 10 may be launched from either a stationary or mobile launch structure, may have power connectivity with the host vehicle, may be releasable manually or remotely, and may or may not utilize a launch assist mechanism. Further, while the shown host vehicles 290 of FIGS. 20B-20D are land-based, the craft invention may also be hosted by other vehicles, or platforms, or structures, that are classified as, but not limited to, aerial, terrestrial, surface, amphibious, submersible, subsurface or marine.

Figure 21:
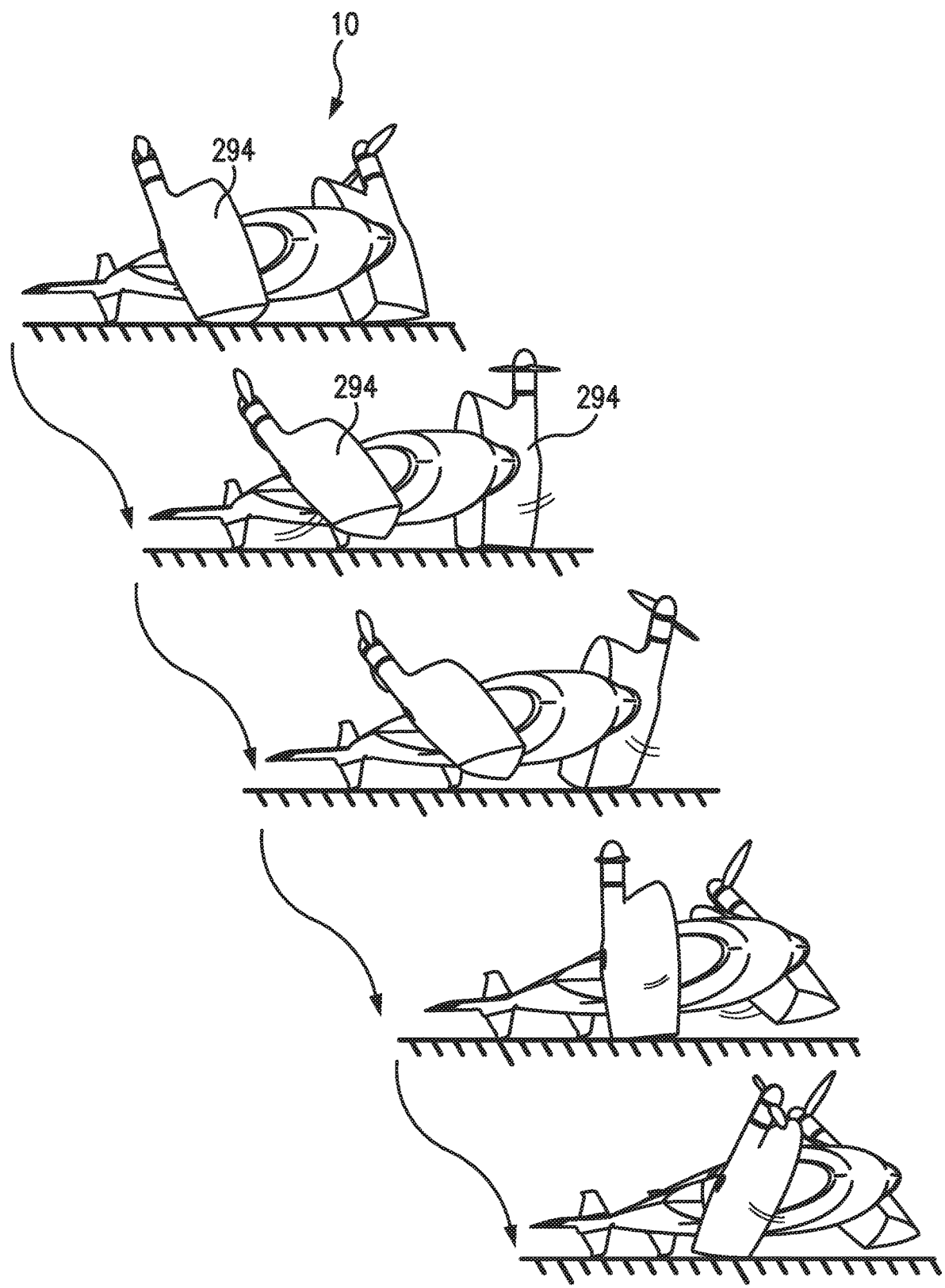
FIG. 21 shows a sequence of positions of the subject vehicle prone crawling by alternatively actuating its nacelles.

FIG. 21 is illustrative of another preferred embodiment of the subject system permitting the vehicle 10 prone crawling by alternately actuating a plurality of nacelles 294. The prone crawl capability allows the vehicle to crawl forward, backward, turn, and rotate in place.

Figure 22:
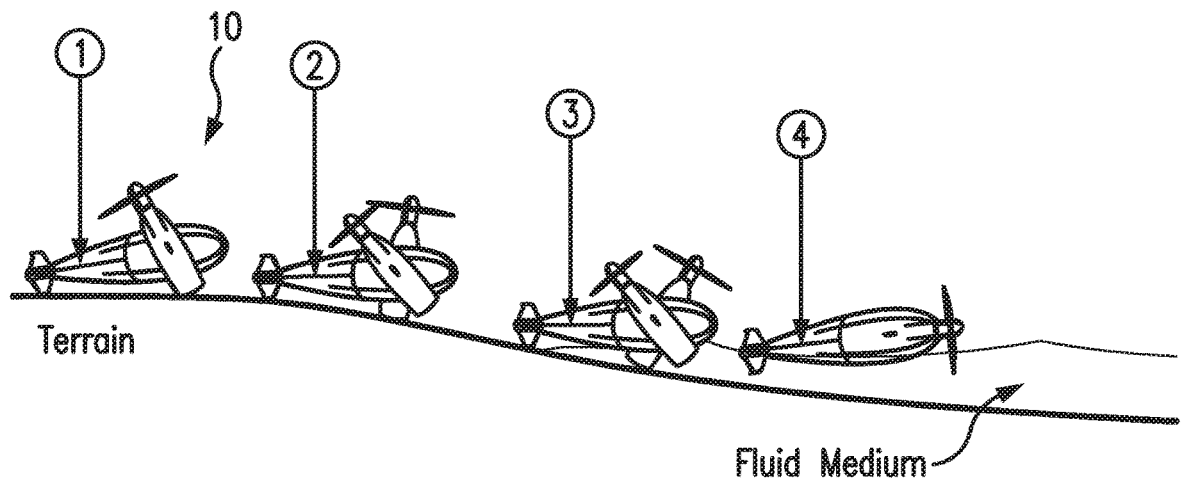
FIG. 22 shows a prone crawling embodiment of the subject system transitioning from the terrain to a fluid medium to the flight.
Figure 22:
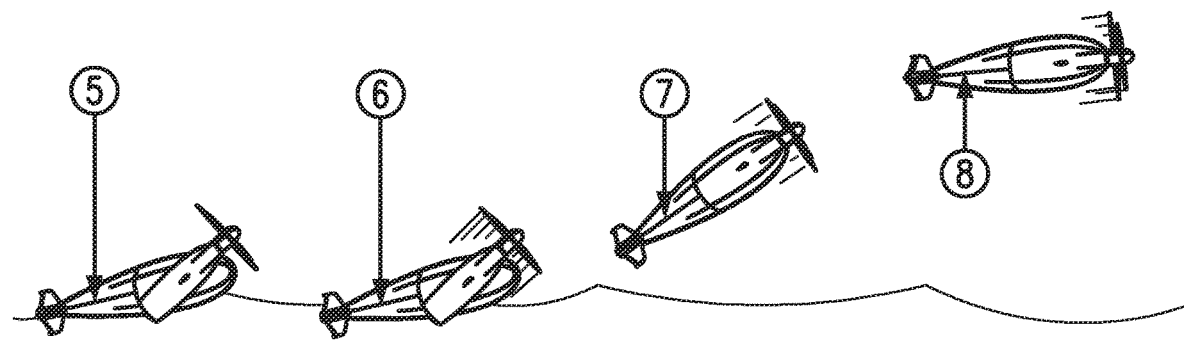

FIG. 22 shows a prone crawling embodiment transitioning from a terrain to a fluid medium and subsequently to the flight. In FIG. 22, the vehicle 10 is initially shown at rest (position 1) on any given terrain (or surface). By actuating the nacelles rotation (without thrusting), the vehicle begins to prone crawl (position 2), and subsequently enters a fluid body (position 3), and becomes surface buoyant (position 4). At the following position (position 5), the vehicle deploys its propulsion system for fluid navigation, initiates take-off (position 6), exits the fluid medium (position 7), enters a flight mode of operation, and executes a mission plan (position 8). It is important to note that such transition may be performed in a reverse order, when the vehicle 10 initially lands on the fluid surface and then exits the fluid medium onto terrain. Further, the entry to and exit from the fluid medium may additionally be performed utilizing various landing gear mechanisms of the vehicle 10, utilizing, for example, but not limited to, prone crawling, wheeled or tread or track system, or alternatively, the vehicle can be taxied via the thrust provided by the main propulsion system.

Figure 23A:
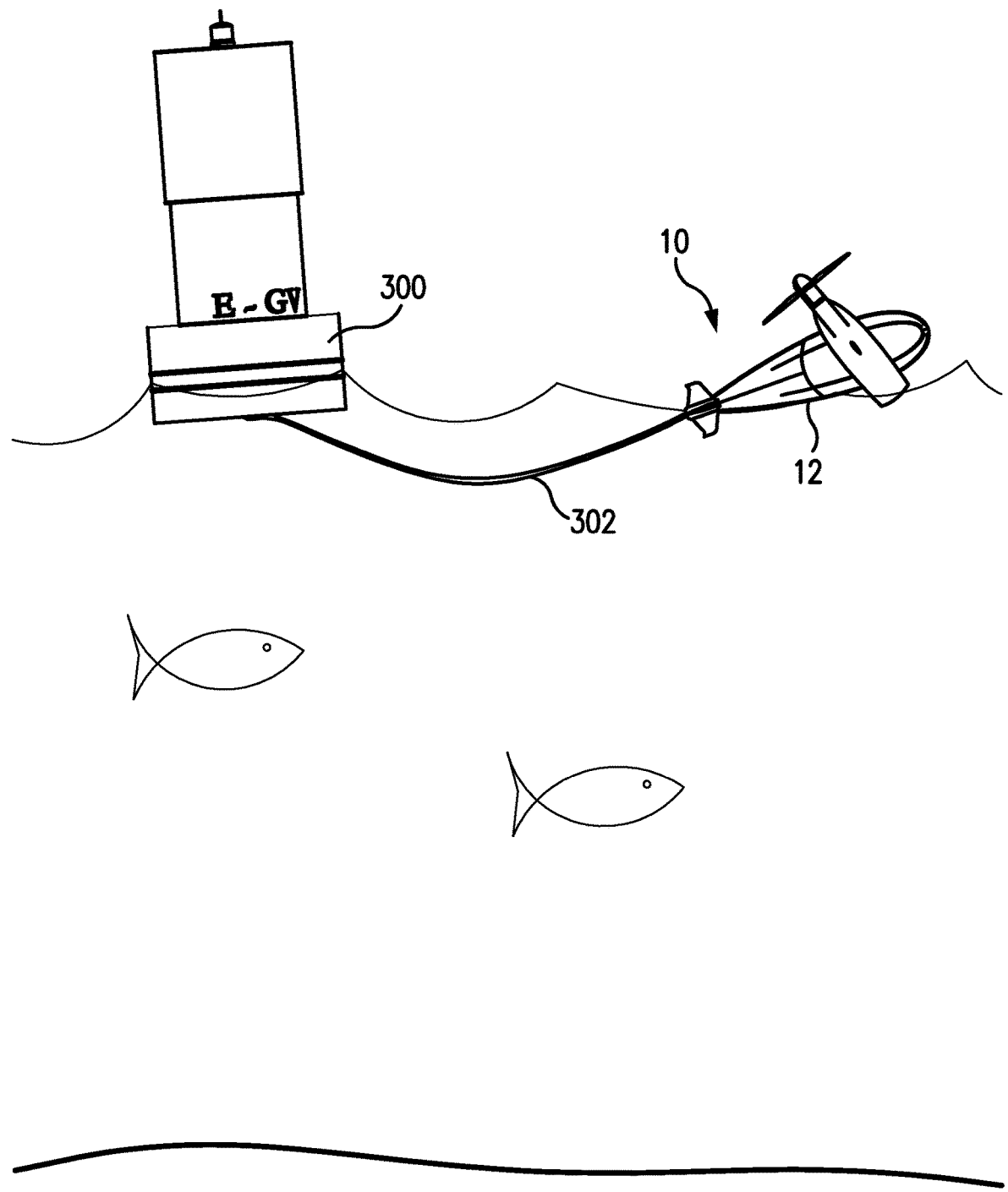
FIGS. 23A-23B illustrate two embodiments of the subject system adapted to marine applications.
Figure 23B:
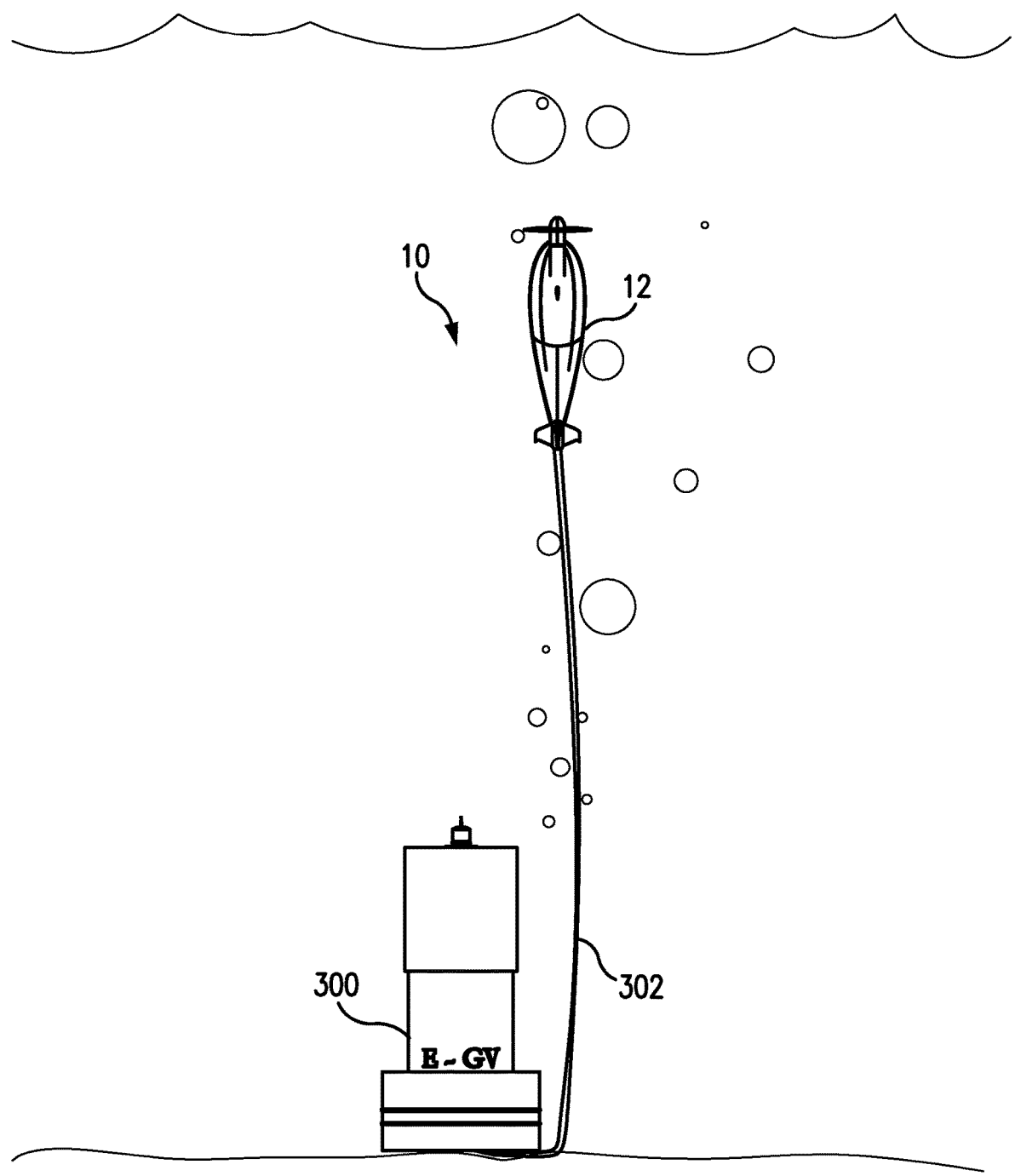

FIGS. 23A-23B illustrate two exemplary embodiments useful in marine applications. FIG. 23A shows an embodiment where the craft 10 interfaces with a buoy 300, for example, via a tether 302. The interface with another marine structure, or vessel, or vehicle, man-made or naturally existing, submersed, at water level, above water level or any combination thereof, may include, but not be limited to, a docking station, docking lift, docking hook or hitch, or docking bay.

FIG. 23B shows a mechanism of interface via the tether 302 where the vehicle 10 is submersed. It is important to note that while a buoy 300 is utilized in FIGS. 23A-23B, any given marine or marine-like structures, or vehicles, or vessels, unmanned or manned, man-made or naturally existing, stationary or dynamic, are also contemplated within the scope of the invention.

Figure 24:
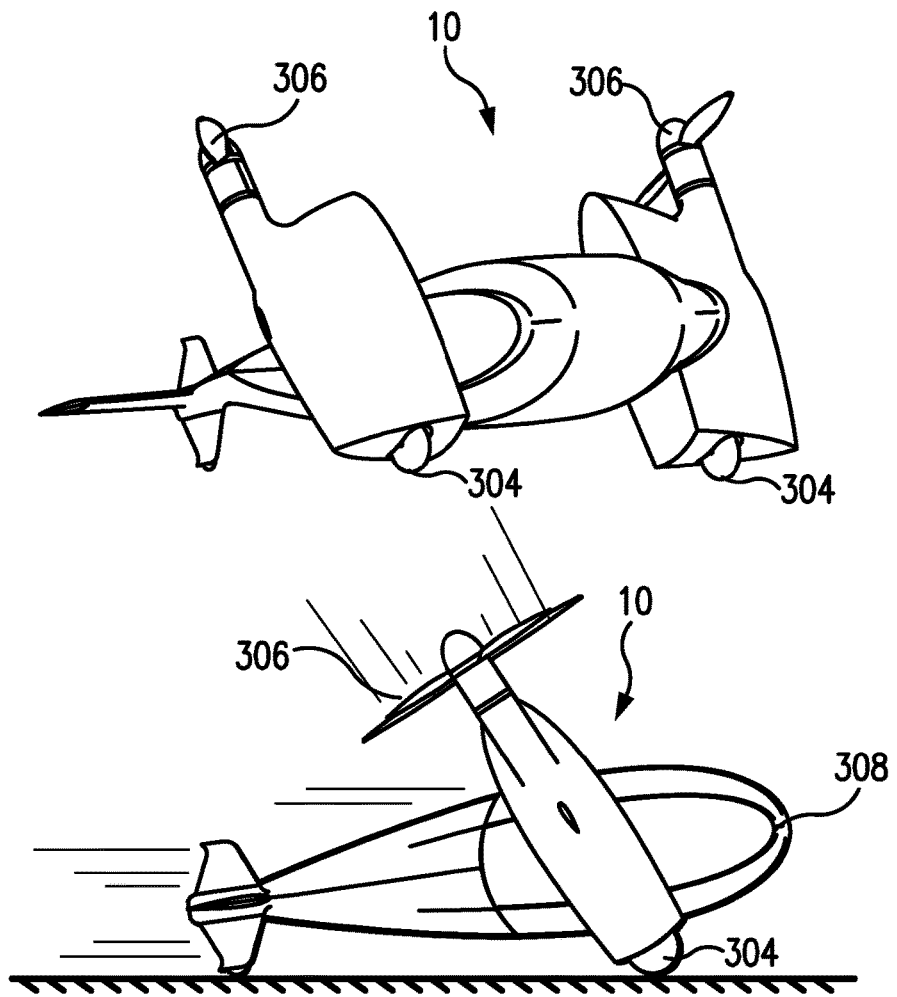
FIG. 24 illustrates a wheeled embodiment of the subject system capable of taxiing via the provided thrust.

FIG. 24 illustrates a wheeled embodiment of the vehicle 10 having wheels 304 installed at the vehicle 10 capable of taxiing supported by the thrust created by the propulsive devices 306 that pushes the vehicle 10 forward. The "push" strategy for taxiing results in a safer mode of translation such that the rotating propulsive devices 306 are deployed rearward and mostly or completely away from the nose 308 or the direction of travel. The "push" strategy can reduce the possibility of the vehicle nose-over.

Figure 25:
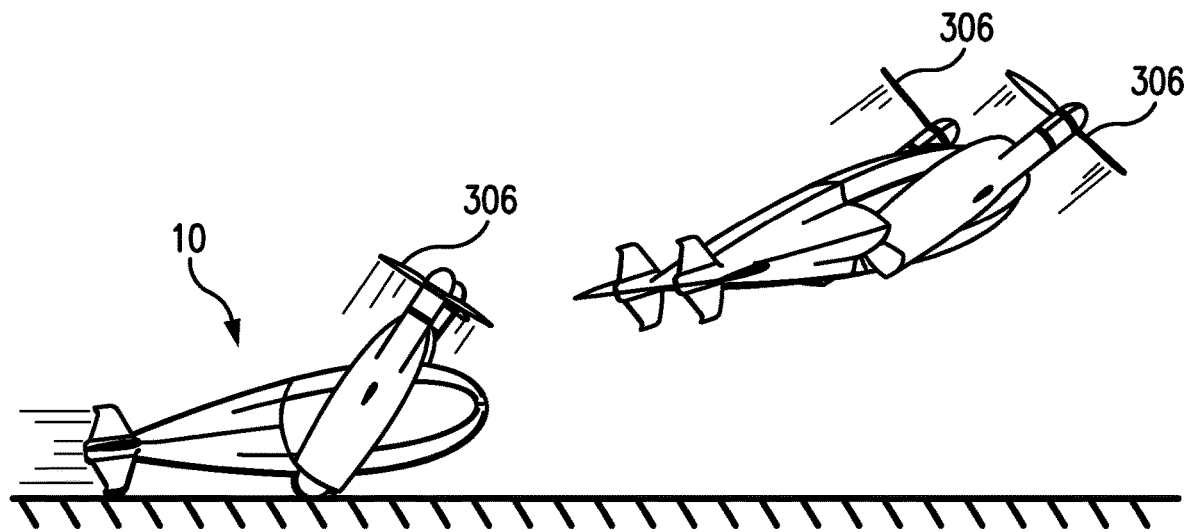
FIG. 25 illustrates a wheeled embodiment of the subject system during take-off roll-out.

FIG. 25 illustrates a wheeled embodiment during take-off roll-out, where the propulsive devices 306 on the nacelles are deployed forward in a mostly (or completely) tractor mode.

Figure 26A:
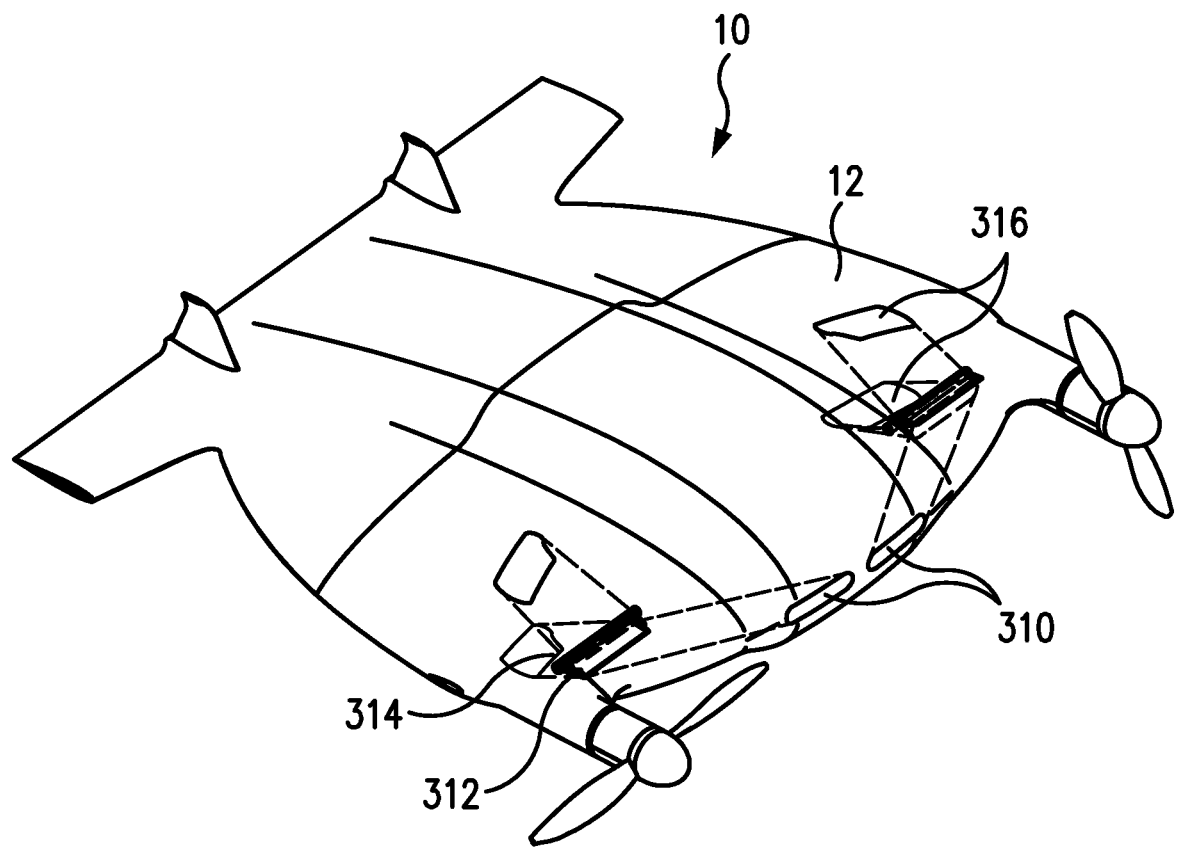
FIGS. 26A-26B illustrate an embodiment of the subject system pertaining to the aircraft shown in FIGS. 1A-1C, with additional fluid thrusters for the surface or the submersed operation.

FIG. 26A illustrates an embodiment pertaining to the all-fixed aircraft disclosed in FIG. 1A, where one or more fluid thrusters for a fluid medium surface or submersed operation are additionally installed internally such that any combination of roll, pitch, and yaw control of the vehicle 10 is possible for amphibious or marine applications. FIG. 26A shows two fluid entry ports 310 with respective internal ducting 312 leading to a valve and thruster apparatus 314 that accelerates and directs the aft exit flow to respective ports 316 located on either face of the lifting body 121.

Figure 26B:
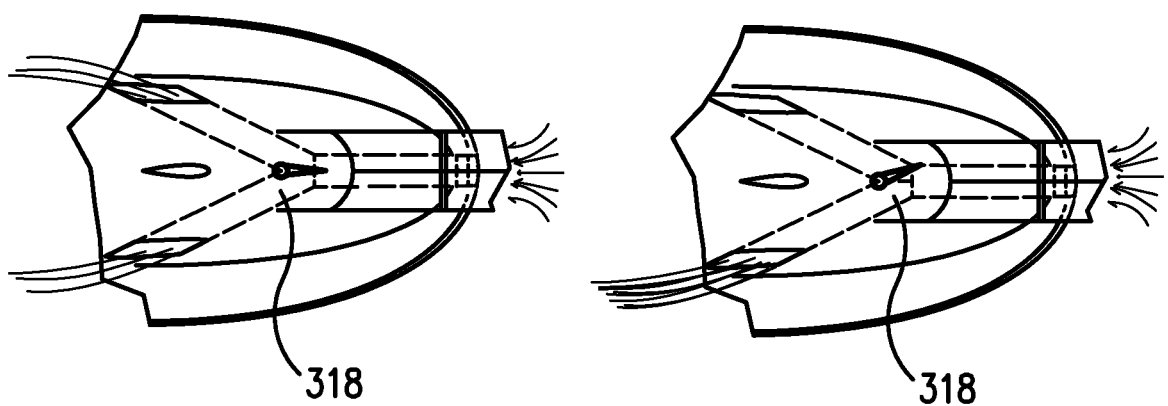

FIG. 26B is a cutaway view of the system shown in FIG. 26B which illustrates the entrance and exit air flows where the valve system 318 allows a balanced exit flow (left) or a singular, top or bottom, path for exit flow (right). It is noted that the fluid thrusting system may include a plurality of entry ports, exit ports, directing valves, and thrusting components. Further, the exiting fluid may result in balanced or unbalanced thrust capable of translation or rotation of the vehicle at various magnitudes about any one or more of its body axis.

Figure 27A:
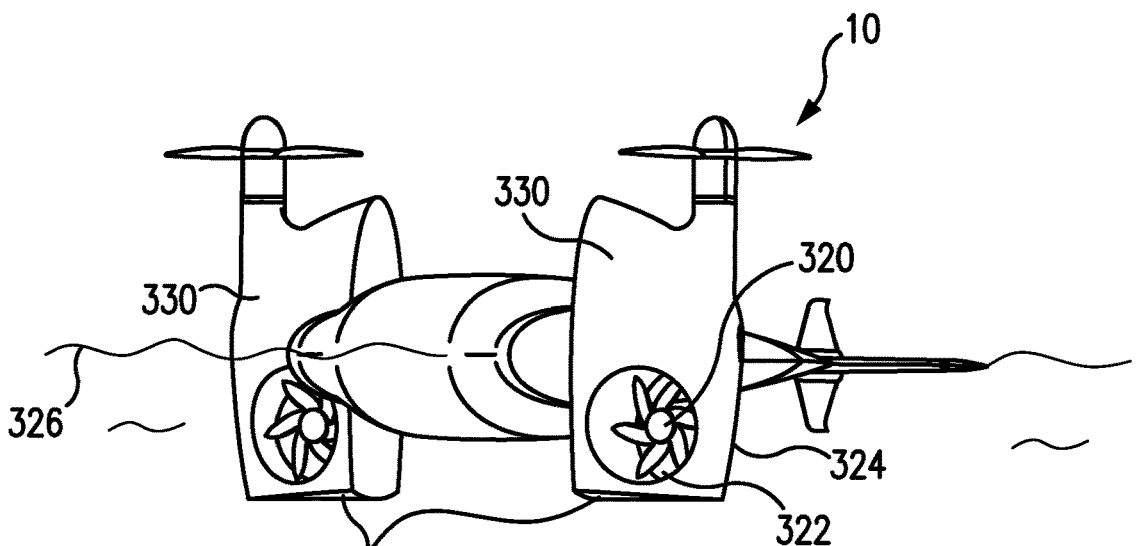
FIGS. 27A-27C illustrate three embodiments of the subject system pertaining to the actuated nacelle concept with additional installed fluid thrusters.
Figure 27B:
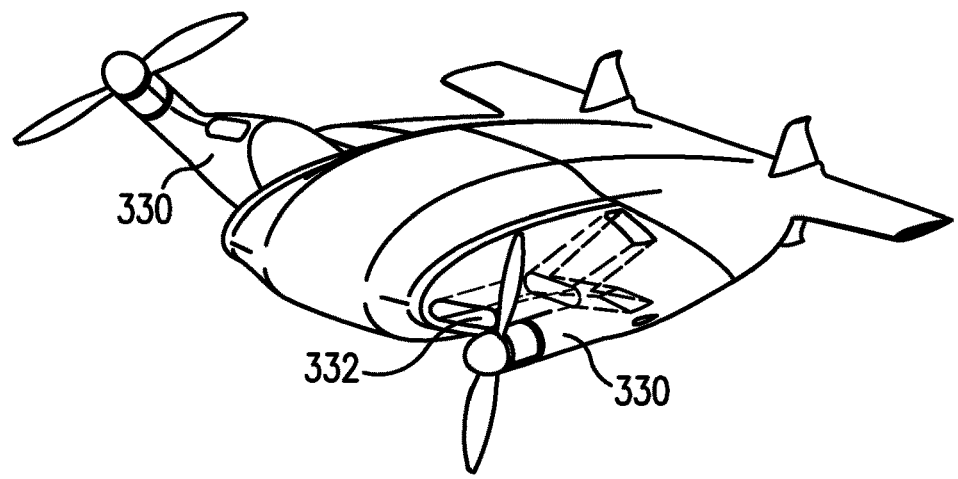
Figure 27C:
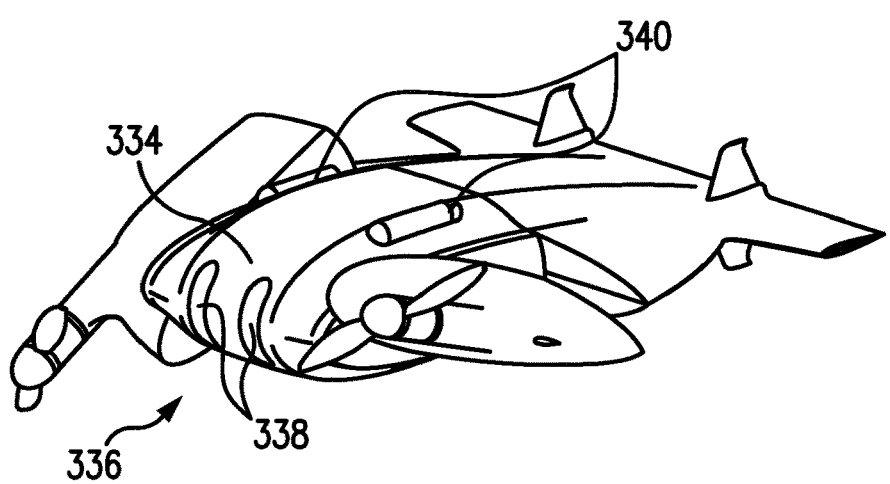

FIGS. 27A-27C illustrate three exemplary embodiments pertaining to the actuated nacelle concept where fluid thrusters are additionally installed to provide any combination of roll, pitch, and yaw control of the vehicle 10 for amphibious or marine applications. FIG. 27A shows a recessed fluid thruster 320 with fluid passing through the entry area 322 and exiting through the exit area 324. FIG. 27A illustrates the vehicle's ability to navigate on or in a fluid medium 326 as the vehicle floats upon its surface, and the aft portion 328 of the nacelles 330 are submerged into the fluid 326.

FIG. 27B shows actuated nacelles 330 further comprising internal pass-through fluid thrusters whereby fluid entry ports 332 with respective internal ducting leading to exit ports 334 located above and below the nacelle surfaces are installed.

FIG. 27C shows the vehicle 10 whose center section 334 further comprises internal pass-through fluid thrusters 336 where the fluid entry ports 338 with respective internal ducting leading to exit the ports 340 located above and below the lifting body surfaces are installed. It is noted that for the applicable embodiments, whether with fixed or actuated nacelle, the activation of the fluid thrusters may further result in submersible capability where the three dimensional maneuverability is attained within the fluid medium supported by provision of at least one (or more) internal (or external) flood tanks which may be additionally utilized to be filled with fluid in order to further manipulate the vehicle's buoyancy.

Figure 28A:
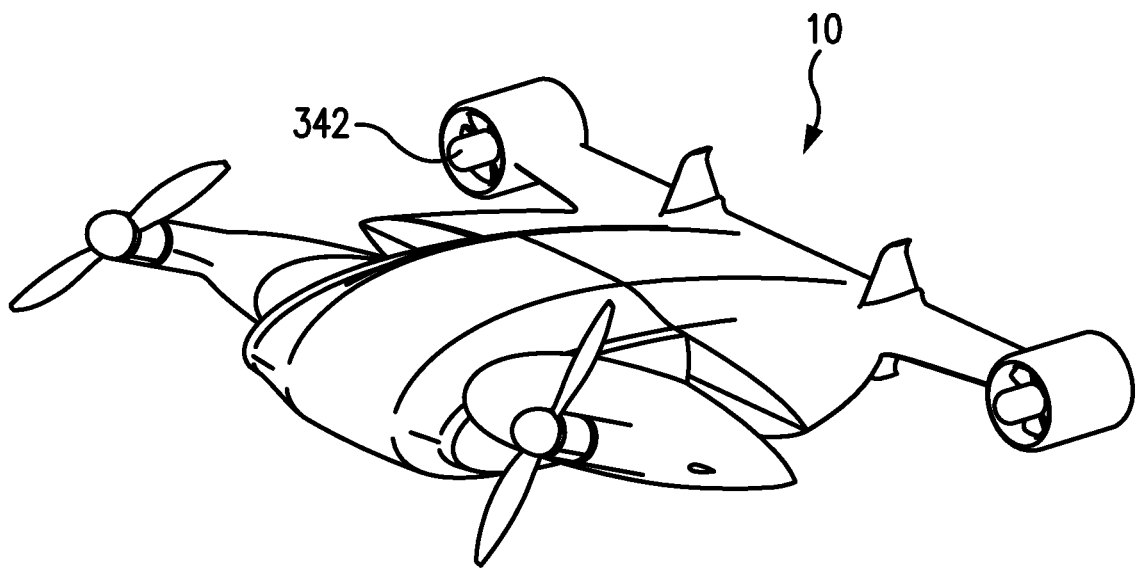
FIGS. 28A-28B illustrate two embodiments of the subject system where fluid jets/thrusters are installed in the rear lifting body section.
Figure 28B:
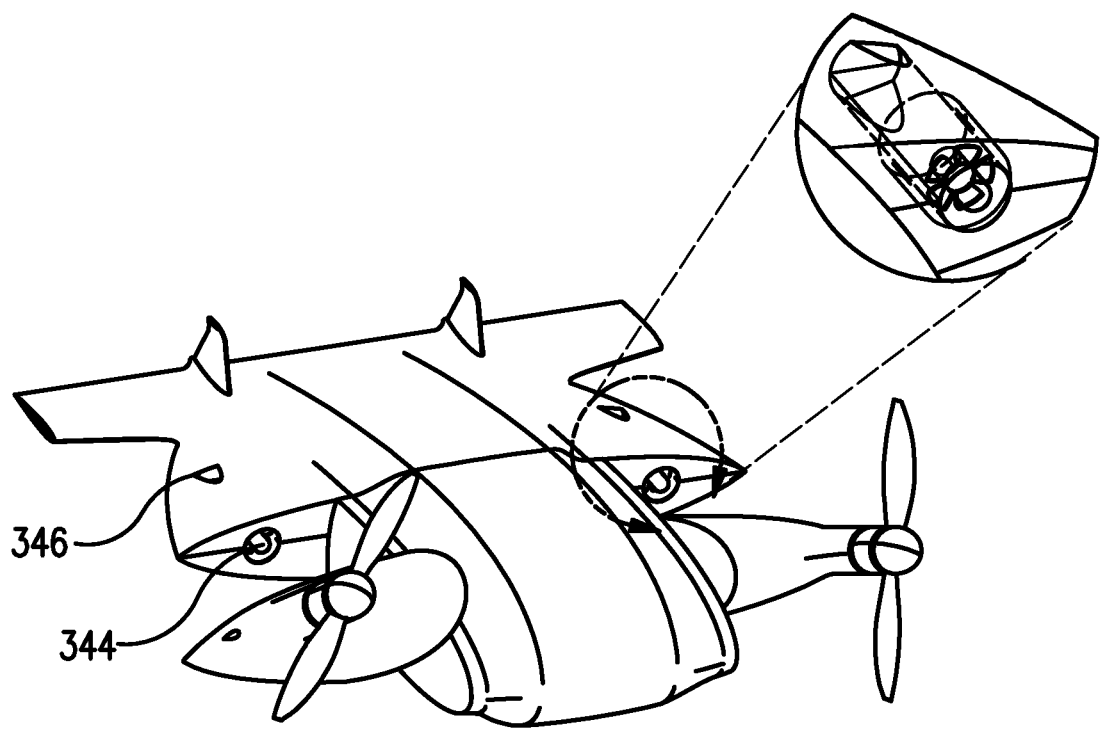

FIGS. 28A-28B illustrate two exemplary embodiments of the subject vehicle where one or more fluid jets or thrusters are installed in the rear lifting body section. FIG. 28A illustrates an embodiment further comprising fluid thrusters 342 (fixed or actuated), installed onto the empennage of the vehicle 10. FIG. 28B illustrates an embodiment further comprising fluid thrusters recessed into the rear lifting body section. The embodiment is designed with a fluid entry port with internal fluid thruster 344 and aft exit ports 346 that may discharge fluid either above or below or the rear lifting body section or both.

Figure 29:
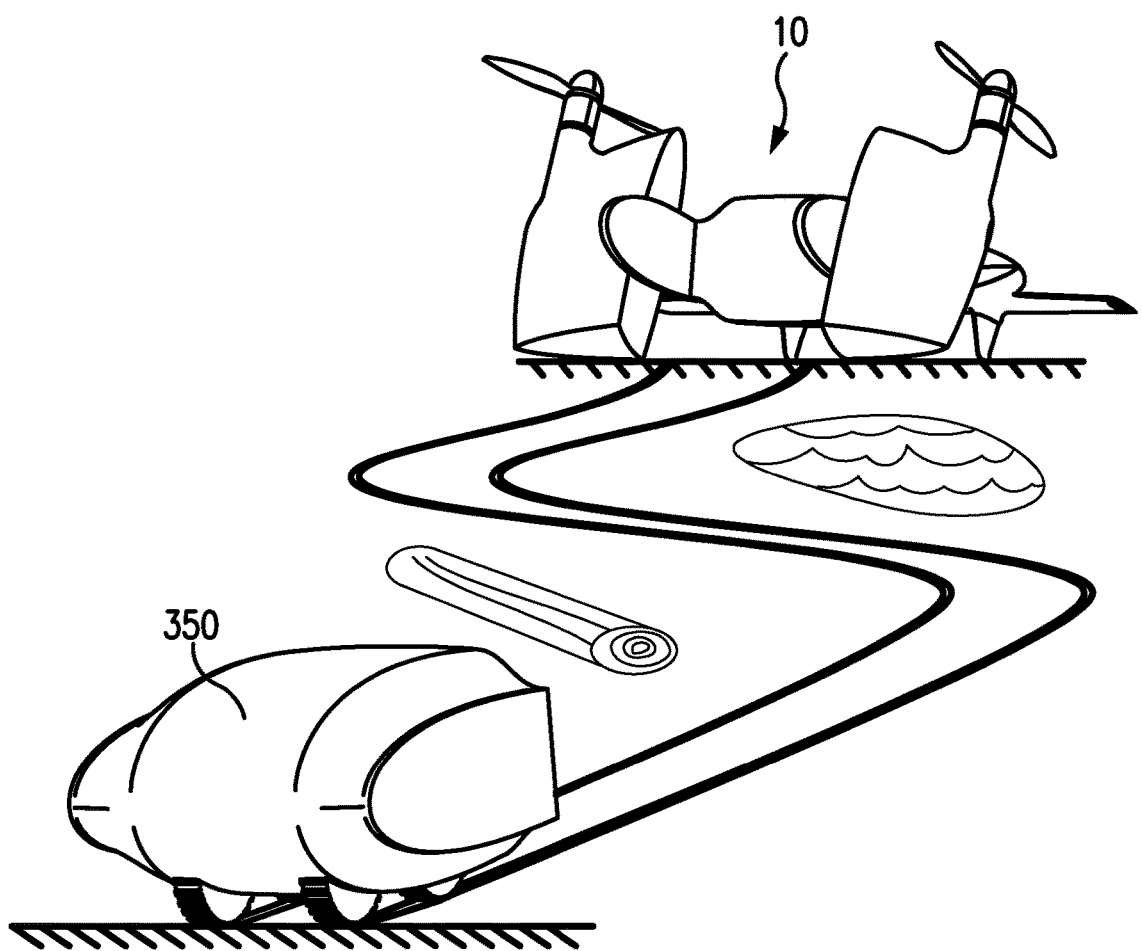
FIG. 29 illustrates an embodiment comprising auxiliary vehicle deployment capability.
Figure 30:
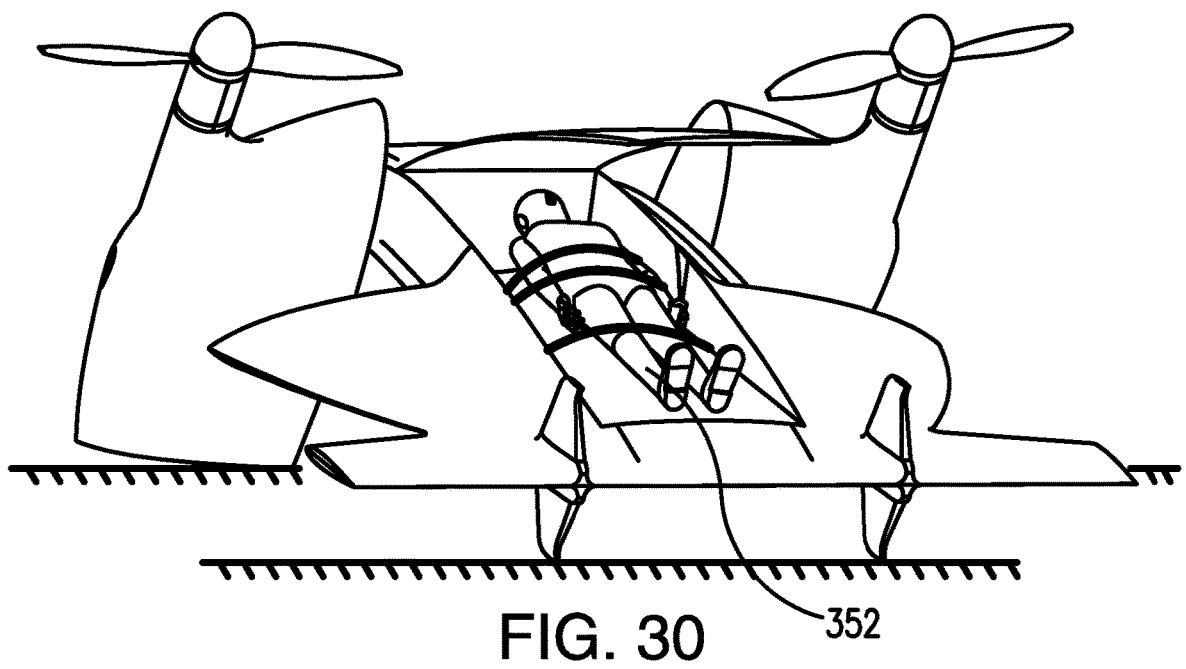
FIG. 30 illustrates an embodiment adapted for carrying people or animals.

FIG. 29 illustrates an embodiment of the subject vehicle 10 further comprising the deployment of at least one auxiliary vehicle 350. It is within the scope of the subject invention that the aerial vehicle 10 is further capable of shedding sub-systems or morphing such that an auxiliary vehicle (or vehicles) 350 with entirely new capabilities is/are deployed. The deployable auxiliary vehicle (or vehicles) 350 may (or may not) be able to reattach such that the aerial vehicle 10 is re-assembled. Further, the least one or more auxiliary vehicles 350 may be capable of attaching to other sub-systems from other components or entirely other vehicles. FIG. 30 illustrates an embodiment of the subject system 10 further comprising the ability to transport at least one occupant 352 who may be incapacitated.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may What is being claimed is:

1. A universal vehicle for uncompromised and balanced air, water and terrain travel in various modes of operation and safe transitioning therebetween, comprising:
   a controller; and
   an aerodynamic contoured lifting body comprising a plurality of cooperating modules, wherein
   at least two of the plurality of cooperating modules of the aerodynamic contoured lifting body are displaceably connected to each other,
   the plurality of cooperating modules comprise a thrust vectoring module and a propulsive mechanism operatively coupled to the thrust vectoring module,
   the thrust vectoring module is dynamically controlled by the controller to affect positioning and actuation of the propulsive mechanism to attain a desired positioning of said vehicle and at least one of a plurality of modes of operation thereof, and
   the thrust vectoring module is configured to support said universal vehicle in a resting position.

2. The universal vehicle of claim 1, wherein the thrust vectoring module comprises a nacelle module carrying the propulsive mechanism thereon and rotatably displaceable about an axis extending sidewise the aerodynamic contoured lifting body.

3. The universal vehicle of claim 2, wherein the lifting body further comprises a central front module and a rear module coupled to the central front module, and
   wherein the thrust vectoring module comprises a nacelle module coupled displaceably to each side of the central front module for symmetric or asymmetric actuation of the propulsive mechanism in a controlled direction.

4. The universal vehicle of claim 3, wherein the nacelle module has a length selected from a group consisting of: corresponding to a length of the central front modules, corresponding to a length of the lifting body, and corresponding to a length ranging between the length of the central front module and the length of the aerodynamic contoured lifting body.

5. The universal vehicle of claim 2, wherein the propulsive mechanism is positioned at the front end of the nacelle module and is tiltably displaceable about an axis of the nacelle module.

6. The universal vehicle of claim 1, further comprising at least one stabilizer module positioned in cooperation with a rear module, and having a vertical, horizontal, dihedral, or anhedral orientation relative thereto,
   wherein the cooperation between the at least one stabilizer module and the rear module is selected from a group of rigidly fixed cooperation and deployable cooperation.

7. The universal vehicle of claim 3, wherein the lifting body module comprises at least one payload compartment formed therein.

8. The universal vehicle of claim 3, further comprising a second propulsive mechanism wherein the propulsive mechanism is controlled to operate in a counter rotation regime relative to the second propulsive mechanism, thus generating the airflows over the lifting body having opposing vorticity flow fields.

9. The universal vehicle of claim 1, wherein the modes of operation affected by the at least one thrust vectoring modules comprise short take-off, short landing, conventional take-off, conventional landing, externally assisted take-off, externally assisted landing, and combinations thereof.

10. The universal vehicle of claim 1, further comprising at least one of vehicle's components selected from a group including avionics system, sensors system, weapon system, navigation and guidance system, communication system, power system, energy storage unit, payload system, payload, propulsion system, fuel cell, landing gear system, docking system, tether system, flight assist system, collision avoidance system, deceleration system, flight termination system, ballast system, buoyancy system, mechanical systems, and electronics, and
    wherein at least one of the plurality of cooperating modules comprises an internal volume defined therein, and
    wherein the at least one vehicle's component is housed in the internal volume.

11. The universal vehicle of claim 1, wherein the thrust vectoring module is configured to control lateral and/or longitudinal positioning of the vehicle by controlling the roll, pitch, and yaw moments thereof.

12. The universal vehicle of claim 1, wherein the thrust vectoring module is controllably deployed to a position corresponding to creating a thrust by the propulsive mechanism resulting in vehicle deceleration.

13. The universal vehicle of claim 1, further comprising a superstructure removably attached to the vehicle,
    wherein the thrust vectoring module is controllably deployed to define a position and direction of rotation of the propulsive mechanism for creation of a thrust force resulting in detachment of the superstructure from said vehicle.

14. The universal vehicle of claim 1, wherein the thrust vectoring module is controllably rotated to a position where the propulsive mechanism strikes at least one module of the vehicle to mitigate disaster in a crisis situation or to intentionally terminate flight.

15. The universal vehicle of claim 3, wherein the nacelle modules are configured for surface maneuverability by alternate actuation of the nacelle modules to actuate prone position crawling mode of operation.

16. The universal vehicle of claim 1, wherein the thrust vectoring module is configured to propel the vehicle in the modes of operation including the motion in flight, on the terrain, sub-terrain, on fluid body, submersed, or combination thereof.

17. The universal vehicle of claim 3, wherein the propulsive devices of the thrust vectoring modules are configured to rotate either in clockwise direction, or in counter-clockwise direction, and in two directions intermittently.

18. A method of operating a universal vehicle for balanced air, water, and terrain travel in various modes of operation and safe transitioning therebetween, comprising:
    configuring a lifting body with a plurality of cooperating modules shaped to provide the lifting body with a substantially aerodynamical contour,
    configuring at least one of the plurality of cooperating modules as a thrust vectoring module operatively coupled with at least one propulsive mechanism, and
    controlling the at least one thrust vectoring module to affect positioning and actuation of the at least one propulsive mechanism to dynamically control positioning and mode of operation of said vehicle, and transitioning between the modes of operation thereof;
    wherein the modes of operation comprise vertical flight, hovering flight, on-station airborne vertical flight, horizontal flight, and vertical take-off, and
    wherein initial and final resting positions of said vehicle include (i) vertical position including resting on a trailing edge of said at least one module of the lifting body, and (ii) horizontal prone crawl position including resting on a predetermined area of the at least one module of said lifting body.

19. The method of claim 18, further comprising:
coupling a motor to the at least one thrust vectoring module, the motor configured to actuate the at least one propulsion mechanism for flying said vehicle, propelling said vehicle on terrain, propelling said vehicle on a fluid medium, and propelling said vehicle in a fluid medium.

20. The method of claim 18, further comprising:
coupling a navigation system to said vehicle; and
navigating said vehicle in flight, the fluid medium, or on terrain using the navigation system.

21. The method of claim 18, further comprising:
coupling a control system to said vehicle; and
controlling said vehicle in flight, through a fluid medium, or on terrain using the control system.

22. The method of claim 18, further comprising:
configuring the at least one thrust vectoring module as a multi-function actuated thrust module;
configuring the lifting body with at least one multi-function central lifting body module, at least one multi-function rear lifting body module, at least one multi-function vertical module, and at least one multi-function horizontal module; and
installing at least one component internally or externally at at least one of the multi-function thrust module, central lifting body module, rear lifting body module, vertical module, and horizontal module, wherein said at least one component includes a component selected from a group including:
payload, weaponization, counter measures system, communication system, ballast system, sensing system, suspension system, braking system, dampening system, airbag, parachute, deceleration apparatus, drive apparatus, steering apparatus, vibration apparatus, landing gear apparatus, charging apparatus, discharging apparatus, electromagnet device, flight assisting device, locomotion assisting device, maneuvering assisting device, docking apparatus with or without electrical connectivity to the respective docking base, anchoring device, gripping device, grappling device, clawing device, floating device, retrieving device, and capturing device, and combinations thereof.

23. The method of claim 22, further comprising:
initiating a loss mitigation mode of operation triggered by a mechanism selected from the group consisting of: pilot triggered, autonomous pilot triggered, observer triggered, sensor triggered, deceleration triggered, acceleration triggered, radar triggered, transponder triggered, traffic controller triggered, impact triggered, and combinations thereof.

24. The method of claim 18, further comprising:
initiating a flight termination mode of operation triggered by a mechanism selected from the group consisting of: pilot triggered, autonomous pilot triggered, observer triggered, sensor triggered, deceleration triggered, acceleration triggered, radar triggered, transponder triggered, traffic controller triggered, impact triggered, and combinations thereof.

25. The method of claim 18, further comprising:
operating said vehicle in at least one of said modes of operation including release, launch, capture, and landing from or onto a stationary or moving platform, wherein said platform includes at least one of a structure, a hitch system, a hook system, a cradle system, a rail system, a netting system, and a trailer installed on a host vehicle, said host vehicle including a surface, a sub-surface, and aerial, amphibious, or marine structures.

26. The method of claim 18, further comprising:
applying proofing treatments to said lifting body selected from a group including: bullet proofing, fragmentation proofing, explosive proofing, heat proofing, fire proofing, and sand proofing.

27. The method of claim 18, further comprising:
installing said at least one propulsive mechanism selected from a group including propellers, turbines, thrusters, fans, and rockets, capable of accelerating in a gas or a fluid medium, combustion, glow, electric, self-contained, fuel cell based, hybrid, pump or geared propulsive mechanisms, installing said propulsive mechanisms at predetermined locations on said lifting body, and
controlling the vehicle roll, pitch, and yaw moments through said propulsive mechanism.

28. The method of claim 18, further comprising:
interacting said vehicle with a fluid body, or a terrain, and performing lifesaving functions, including delivering tools, supplies, nourishment, medical aid finding mines, finding and detonating IEDs or mines, providing communications, navigation, location, assisting as a personal flotation device, deploying a raft, and toning parties under distress to safety.

29. The method of claim 18, further comprising:
controlling stability of the vehicle by manipulation of the vehicle's center of gravity along the lateral axis, the longitudinal axis, or the lateral and the longitudinal axis via translation, rotation, vibration, and combination thereof of internal and/or external masses.

\* \* \* \* \*